United States Patent [19]
Mitani et al.

[11] Patent Number: 5,721,715
[45] Date of Patent: Feb. 24, 1998

[54] CONTROL SYSTEM FOR DISC PLAYING DEVICE

[75] Inventors: Tadahiro Mitani, Matsubara; Keiji Hirao, Moriguchi; Masanao Yoshida, Higashiosaka; Hitoshi Ogata, Sakai, all of Japan

[73] Assignee: Sanyo Electric Co., Ltd., Osaka, Japan

[21] Appl. No.: 692,122

[22] Filed: Aug. 5, 1996

Related U.S. Application Data

[63] Continuation of Ser. No. 234,993, Apr. 28, 1994, abandoned.

[30] Foreign Application Priority Data

Apr. 28, 1993 [JP] Japan ................ 5-103197

[51] Int. Cl.[6] .................... G11B 17/22; G11B 27/00
[52] U.S. Cl. .................... 369/33; 369/37; 369/192
[58] Field of Search .................... 369/33, 34, 36, 369/37, 39, 77.1, 178, 179, 196, 191, 192; 360/98.06, 98.04, 98.01, 92

[56] References Cited

U.S. PATENT DOCUMENTS

| | | | |
|---|---|---|---|
| 3,826,964 | 7/1974 | Byrne | 318/602 |
| 4,039,918 | 8/1977 | Cheng | 318/602 |
| 4,131,840 | 12/1978 | Wiesner | 318/685 |
| 4,138,633 | 2/1979 | Narikiyo et al. | 318/603 |
| 4,271,440 | 6/1981 | Jenkins et al. | 360/92 |
| 4,426,763 | 1/1984 | Hornok et al. | 318/602 |
| 4,674,077 | 6/1987 | Yoshimoto et al. | 369/37 |
| 4,815,057 | 3/1989 | Miller et al. | 369/37 |
| 4,996,680 | 2/1991 | Staar | 369/36 |
| 5,067,116 | 11/1991 | Kadrmas | 369/37 |
| 5,132,949 | 7/1992 | Choi | 369/37 |
| 5,187,695 | 2/1993 | Schindler et al. | 369/37 |
| 5,214,628 | 5/1993 | Langman et al. | 369/37 |
| 5,235,579 | 8/1993 | Ross | 369/37 |
| 5,307,331 | 4/1994 | d'Alayerde Costemore et al. | 369/37 |
| 5,359,476 | 10/1994 | Dalziel | 360/92 |
| 5,555,143 | 9/1996 | Hinnen et al. | 360/92 |

FOREIGN PATENT DOCUMENTS

| | | |
|---|---|---|
| 0263496 | 4/1988 | European Pat. Off. |
| 4-57248 | 2/1992 | Japan |
| 4-177660 | 6/1992 | Japan |
| 8707423 | 12/1987 | WIPO |

*Primary Examiner*—Robert S. Tupper
*Assistant Examiner*—David L. Ometz
*Attorney, Agent, or Firm*—Armstrong, Westerman, Hattori, McLeland & Naughton

[57] ABSTRACT

A control system for a disc playing device which facilitates selection of playing of discs by assigning identification codes comprising consecutive numbers to all disc holding grooves of a magazine. A memory of a microcomputer has a first storage area for storing the identification code of the magazine groove positioned as opposed to a disc insertion-discharge portion or playing portion, and a second storage area for storing the identification code of the groove accommodating the disc to be played. The direction of rotation of the magazine is determined by an arithmetic procedure based on the two identification codes stored in the first and second storage areas and on the difference in position between the insertion-discharge portion and the playing portion around the center of the magazine.

4 Claims, 64 Drawing Sheets

FIG. 35

| DISC NO. | PRESENCE OR ABSENCE OF DISC |
|---|---|
| 1 | "1" |
| 2 | "0" |
| 3 | "1" |
| ⋮ | ⋮ |
| 24 | "0" |

| A | "13" |
|---|---|
| B | "5" |

202

CONTROL SYSTEM FOR DISC PLAYING DEVICE

This application is a continuation of application Ser. No. 08/234,993, filed Apr. 28, 1994, now abandoned.

BACKGROUND OF THE INVENTION

1. Field of the Invention

The present invention relates to a control system for disc playing devices for accommodating a plurality of disclike recording media (hereinafter referred to as "discs") having data recorded thereon to play the desired disc, or to remove the disc and replace it with another disc.

2. Description of the Related Art

Disc playing devices of have been proposed which include the one shown in FIGS. 71 and 72 and comprising a disc magazine 610 rotatably mounted on a base chassis 600. The device has two playing portions 630, 630 and a single inlet-outlet portion 620 which are arranged outside the path of rotation of the magazine 610 (Unexamined Japanese Patent Publication HEI 4-57248).

The magazine 610 has grooves 611, 614 formed along the outer periphery in its bottom and top, respectively, and extending radially toward the center of rotation. Discs D can be accommodated in an upright position in the magazine 610, each with its lower and upper end portions fitted in the grooves 611, 614.

The lower grooved portion 611 is formed at its outer end with a cutout 612, in which a plate spring 613 is provided as partly projected outward therefrom.

The inlet-outlet portion 620 is provided with a kick-out arm 621 pivotally movable in a vertical plane for kicking out the disc from the magazine 610. Each of the playing portions 630, 630 has a kick-out arm 631 for kicking out the disc D to a playing set position 633 and a kick-in arm 632 for kicking the disc D from the playing set position 633 into the magazine 610, these arms 631, 632 being each pivotally movable in a vertical plane.

When the disc D is pushed into the magazine 610 from outside the inlet-outlet portion 620, the disc D is inserted into the magazine 610 by being guided by the grooves 611, 614. In the course of insertion, the disc D moves over the plate spring 613 by depressing the spring, whereupon the spring 613 resiliently restores itself to prevent the disc D from jumping out inadvertently.

When a particular disc selected by the user is to be played, the magazine 610 rotates to position the selected disc as opposed to the empty one of the playing portions 630, 630, and the disc D is kicked out by the kick-out arm 631 to the playing position 633 of the playing portion 630.

On completion of the playing of disc D, the disc is kicked to the original position within the magazine 610 by the kick-in arm 632.

With the disc playing device described, however, the disc, when set in the playing portion 630, is positioned as completely removed from the disc magazine 610. This neccessities making the playing device large-sized.

Accordingly, the present applicant has proposed disc playing devices having novel mechanisms which render the device smaller than conventionally known (Japanese Patent Applications HEI 4-348374, 4-348411, 4-348463 and 4-348500).

Although the foregoing prior-art device has disclosed means for driving its mechanisms, the prior art device fails to disclose the control system for driving these means efficiently.

SUMMARY OF THE INVENTION

The present invention provides a control system for efficiently driving the mechanisms of the foregoing disc playing device with safety.

An object of the present invention is to provide a system for controlling a disc playing device of the type described which is adapted such that when the magazine is to be rotated to position a specified disc holding groove as opposed to disc insertion-discharge means or playing means, the groove is rapidly moved to the desired position by rotating the magazine in a direction in which the angle of rotation thereof is smaller, the direction of rotation being judged based on the identification code of a disc holding groove opposed to the disc insertion-discharge means or the playing means and on the difference in position between the two means.

Another object of the present invention is to provide a system for controlling the disc playing device which is adapted such that when stored data as to the presence or absence of discs is destroyed for one cause or another, the system checks each disc holding groove for the presence or absence of a disc in order to normally perform the subsequent operation.

Another object of the present invention is to provide a system for controlling the disc playing device wherein the disc insertion-discharge means is provided with a door for permitting the disc to move into or out of this means, and the magazine is rotatable only when the door is closed so as to avoid damage to the disc.

Still another object of the present invention is to provide a control system which is adapted so that when the user attempts to load a disc into the desired disc holding groove, the system checks the groove for the presence or absence of a disc therein to discharge the disc if it is present in the groove and to prevent the magazine from being double-loaded with discs.

The disc playing device to be controlled comprises a rotatable magazine having a plurality of disc holding grooves, and disc insertion-discharge means and playing means which are provided for the path of rotation of the magazine and arranged away from each other. The control system comprises judging means which stores an identification code of the disc holding groove positioned as opposed to the disc insertion-discharge means or the playing means, and an identification code of the disc holding groove having accommodated therein the disc to be played. When a specified disc holding groove is to be moved to the position opposed to the disc insertion-discharge means or the playing means by rotating the magazine, the judging means judges the direction of rotation in which the angle of rotation is smaller, based on the two identification codes and on the difference in position between the insertion-discharge means and the playing means. This shortens the time required for the rotation of the magazine.

When the power supply is turned on, error detecting means checks whether the data stored in memory means is destroyed. If the data is destroyed, magazine rotating means intermittently rotates the magazine, thereby moving the disc holding grooves by one pitch at a time, and disc detecting means detects presence or absence of discs. Since new data is prepared in this way, no trouble occurs in the subsequent operation of the playing device. Further upon detection of the disc present, a delivery device is drawn in to collect the disc into the magazine, so that the rotation of the magazine causes no damage to the disc.

Furthermore, the magazine is not rotatable while the door is open by virtue of a signal of the rotation permitting means.

This prevents the magazine from rotating with the door opened and with the disc partly inserted in the magazine, thus obviating damage to the disc.

When the user manipulates input means to insert a disc into a specified disc holding groove, it is somewhat likely that another disc has already been inserted in the groove. In this case, the previous disc is discharged through the disc insertion-discharge means. This eliminates the likelihood that the magazine will be double-loaded with discs.

The door automatically closes when a predetermined period of time set by timer means is elapsed without disc sensor means detecting the disc after the door is opened.

When the disc is to be transferred from the playing means to the magazine, magazine a rotation allowing means permits the rotation of the magazine upon lapse of a length of time set by time setting means after the detection of the disc by the disc detecting means. The magazine becomes rotatable after the disc is accommodated in the magazine. This protects the disc from damage during the rotation of the magazine.

When the disc is to be discharged from the playing device, the disc detecting means detects an outer end portion of the disc projecting from the device body, whereupon delivery device control means stops a delivery device at the disc insertion-discharge side. This eliminates the likelihood that the disc will fall off the playing device body by being excessively forced out by the delivery device.

BRIEF DESCRIPTION OF THE DRAWINGS

FIG. 35 is a diagram showing a table provided in a nonvolatile memory;

FIG. 36 is a diagram showing two storage areas provided in a volatile memory;

DETAILED DESCRIPTION OF THE PREFERRED EMBODIMENTS

Figure 1:
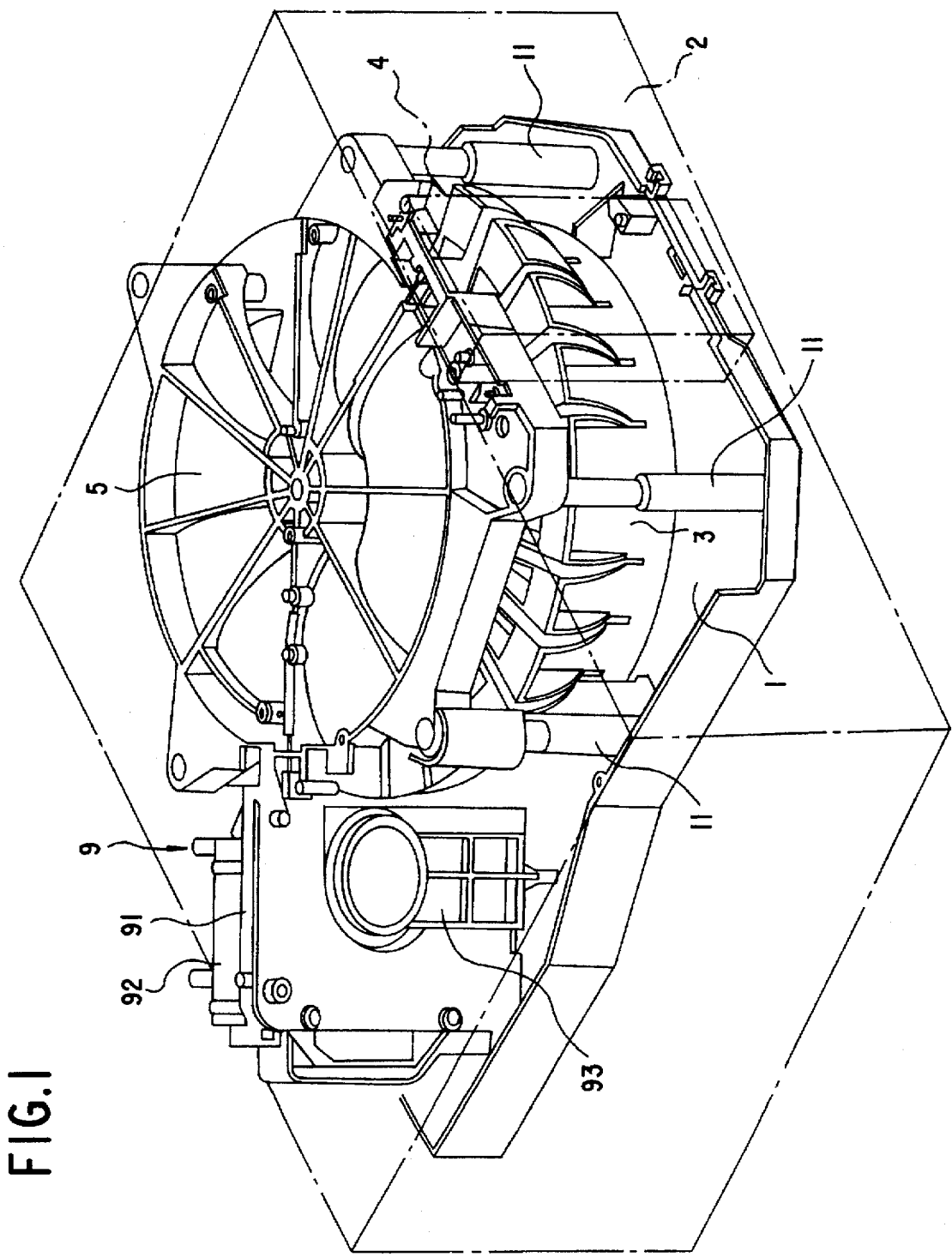
FIG. 1 is a perspective view schematically showing a disc playing device.

The mechanisms and control system of a disc playing device embodying the present invention will be described. Brief Description of the Overall Device (see FIGS. 1 to 3 and 12)

The preferred exemplary embodiment includes a device for playing discs having sound signals recorded thereon using a laser. While discs are available in two different standard sizes, i.e., 12 cm and 8 cm in diameter, the playing device is used specifically for 12-cm discs. However, the present invention is not limited thereto but can be embodied as devices for playing various disclike recording media.

The disc playing device comprises a disc accommodating magazine 3 mounted on a base chassis 1 and rotatable in a horizontal plane, and disc insertion-discharge means 4 and disc playing means 9 which are arranged outside the path of rotation of the magazine 3.

The insertion-discharge means 4 and the playing means 9 are spaced apart by an angle of 135 deg about the center of rotation of the magazine 3 so as to make the overall playing device compact.

The magazine 3 is adapted to accommodate 24 discs D in a radial arrangement. The insertion-discharge means 4 has a delivery device 6 for inserting the disc D into the magazine 3 from outside and discharging the disc D from the magazine 3 to outside.

Figure 12:
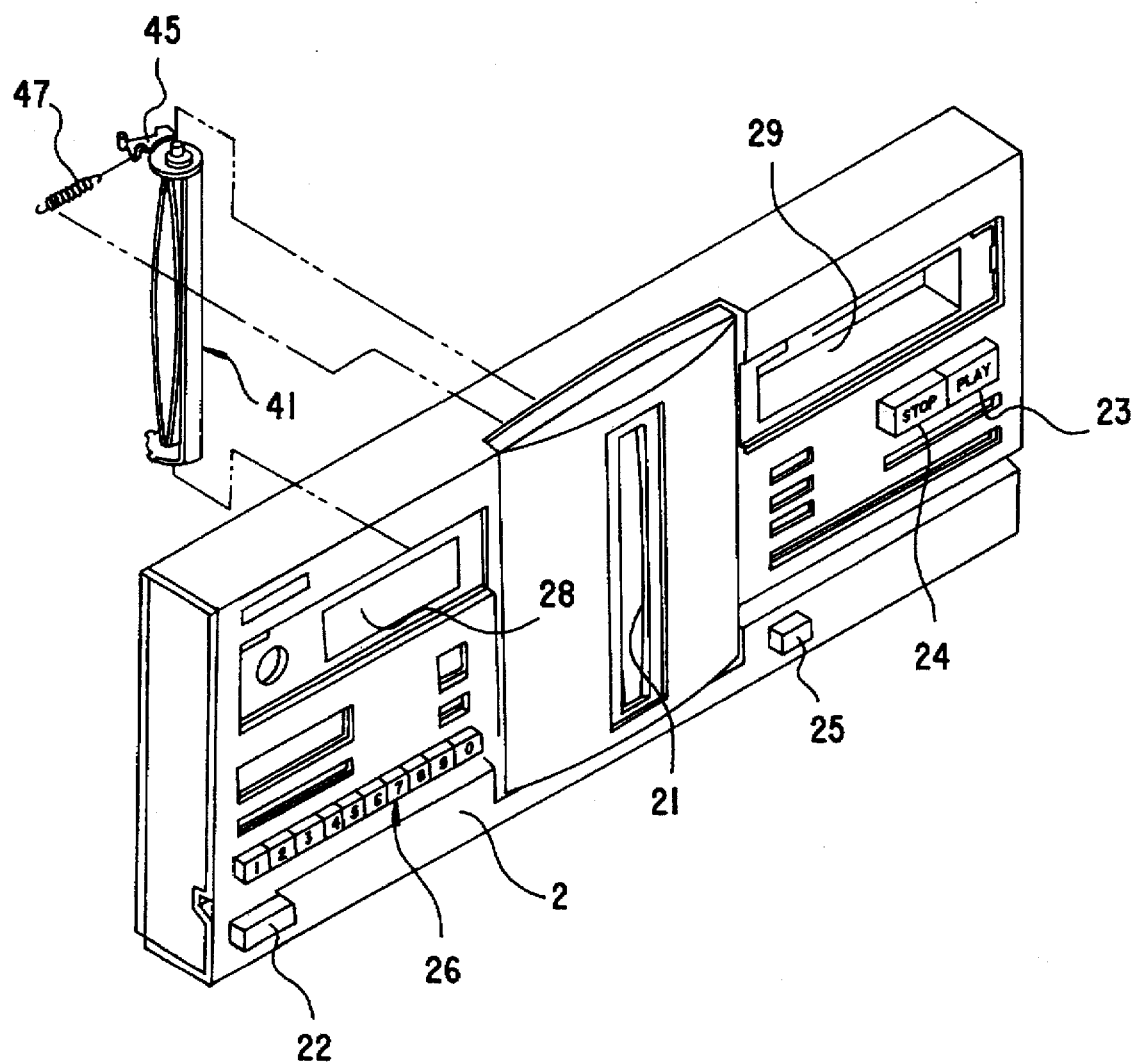
FIG. 12 is a perspective view showing a front panel.

The insertion and discharge of discs D, and selection of playing and cessation of playing are effected by manipulating an ON-OFF button 22, PLAY button 23, STOP button 24, open/close button 25 and 10 number entry keys 26 which are provided on a front panel 2 of the playing device shown in FIG. 12. For example, when the disc to be played is selected by the user, the magazine 3 is rotated to transport the disc to the position of the playing means 9, and a delivery device 6a provided for the means 9 delivers the disc to the playing means 9.

On completion of playing, the disc is returned to its original position in the magazine 3.

The manipulation of the buttons on the front panel 2 will be described later.

Figure 2:
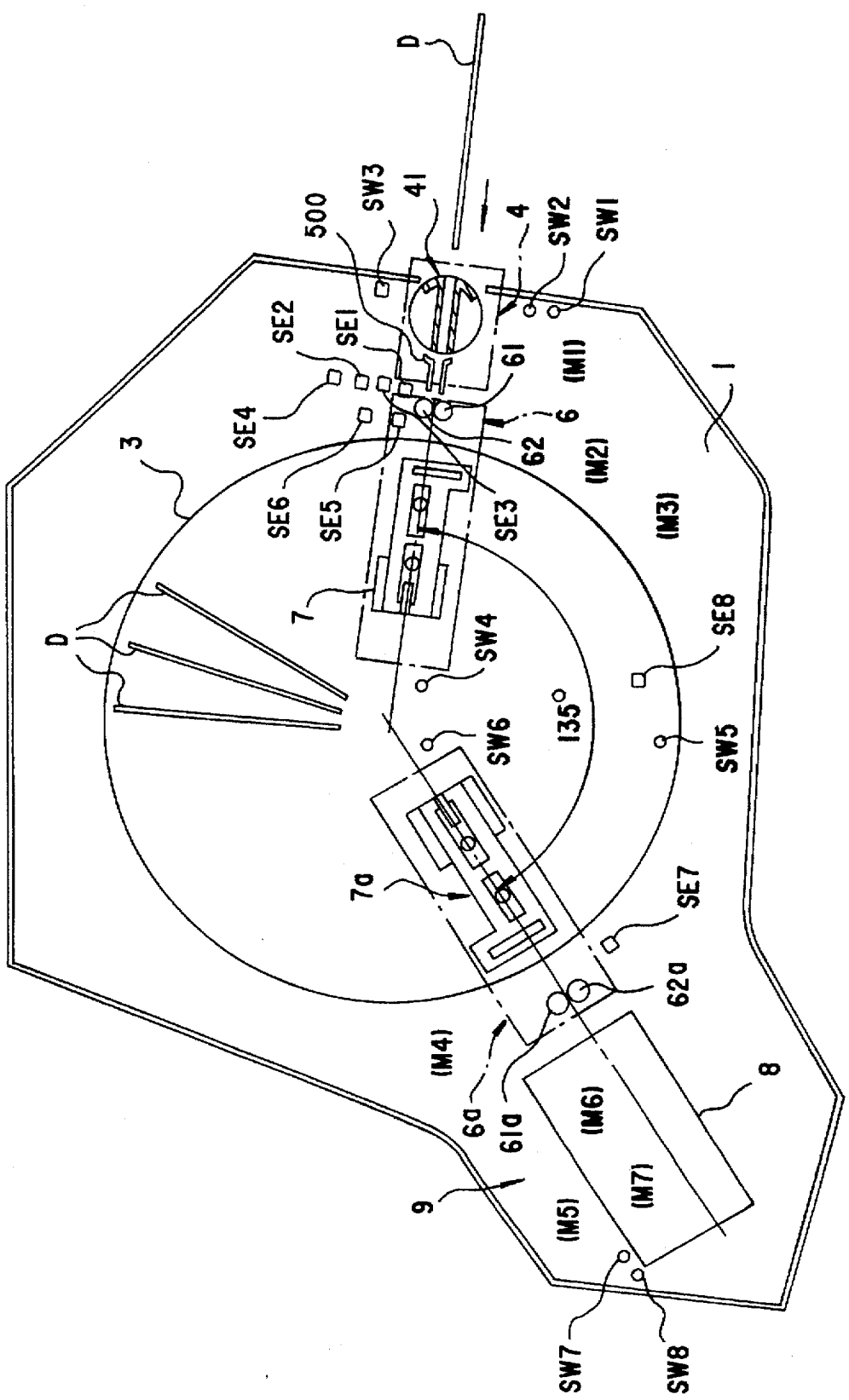
FIG. 2 is a plan view schematically showing the device.
Figure 3:
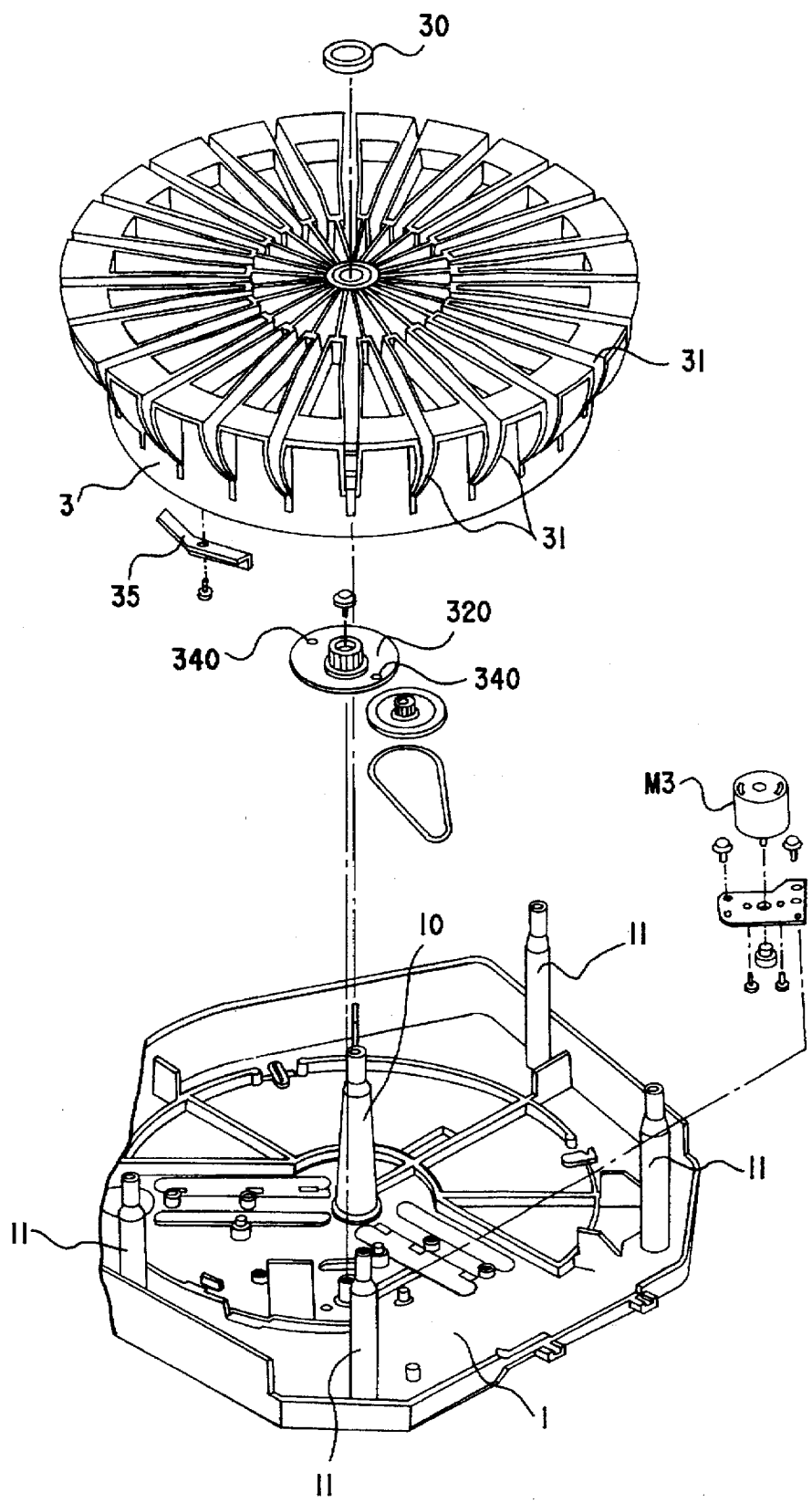
FIG. 3 is a perspective view of a base chassis and a magazine.

With reference to FIG. 2, indicated at M1 to M7 are drive motors for operating mechanisms to be described below, at SW1 to SW8 switches for detecting the position of completion of mechanism operations, at SE1 to SE7 sensors for detecting the size and passage of discs, and at SE8 a sensor for detecting the angle of rotation of the magazine 3. The arrangement of these components is shown in a plane. Magazine 3 (see FIGS. 3 to 5 and 8)

The magazine 3 is in the form of a thick disk prepared from synthetic resin by injection molding, and has at its center a tubular portion 39 which is rotatably fitted to a support post 10 provided upright on the base chassis 1.

The magazine 3 is formed in its upper surface with 24 disc holding grooves 31 arranged generally radially at a spacing. Each of the grooves 31 has an outer end which is opened in an outer peripheral wall of the magazine 3, and a base end terminating at the tubular portion 39.

The number of disc holding grooves 31 is 24 for reasons involved in design, that is, in order to give the smallest possible outside diameter to the magazine 3 while enabling the magazine to accommodate as many discs as possible. However, the number of grooves 31 is not limited to 24.

Figure 69:
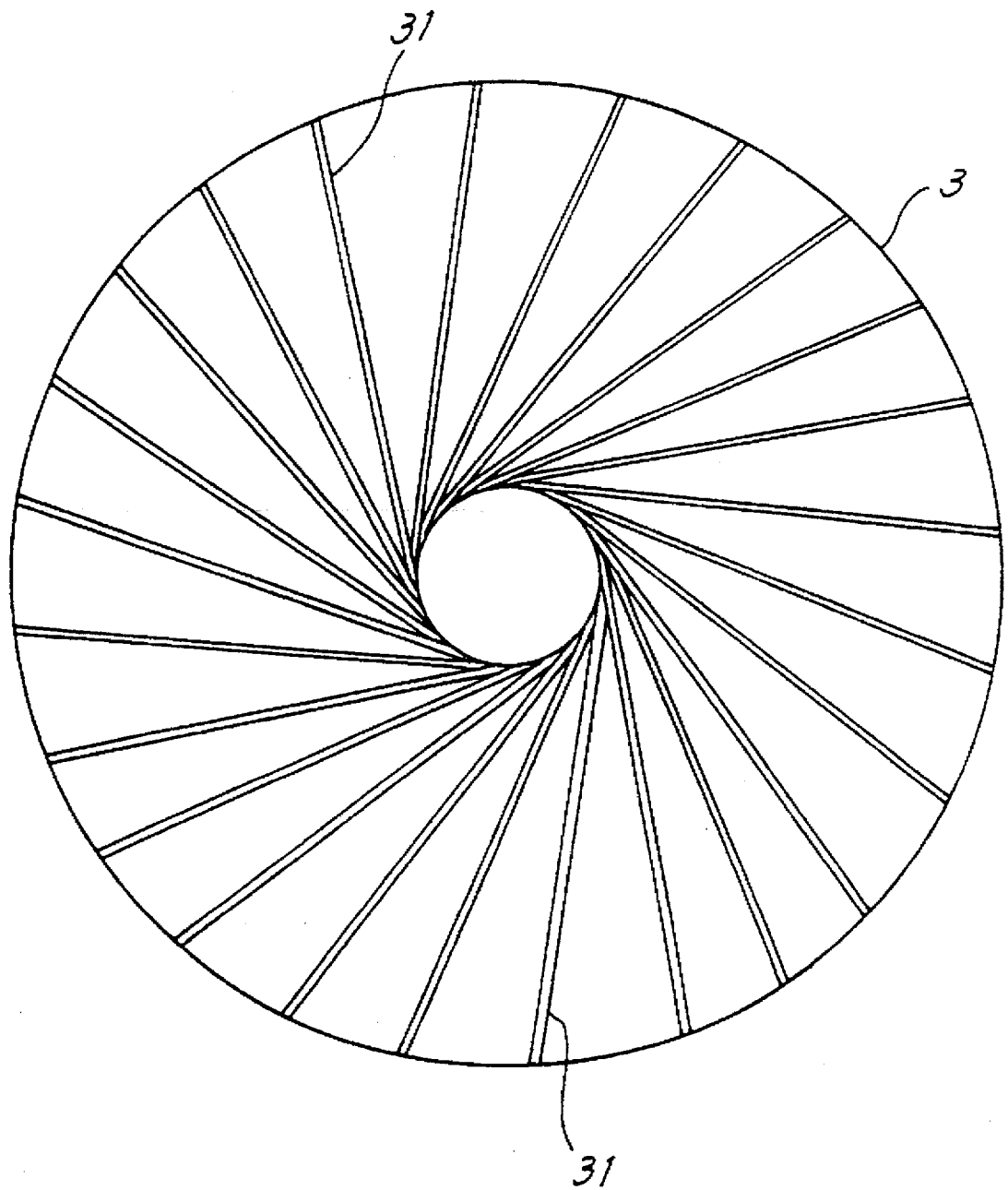
FIG. 69 is a sectional view of another magazine.

Although the disc holding grooves 31 in the preferred exemplary extend radially of the magazine 3, these grooves 31 can be made to extend from the central tubular portion 39 of the magazine 3, for example, tangentially of the portion 39 as seen in FIG. 69. The "generally radial" arrangement of the grooves 31 mentioned above includes the tangential arrangement shown in FIG. 69.

Although the grooves 31 are preferably formed in a plane perpendicular to the base chassis 1, the grooves may be formed slightly inclined with respect to the base chassis 1. The disc will then be accommodated in a slightly inclined upstanding position, with the result that the height of the disc accommodating portion can be diminished.

The upper surface of the magazine 3 is marked with the groove numbers of No. 1 to No. 24 as arranged counterclockwise adjacent to the respective grooves 31.

Figure 8:
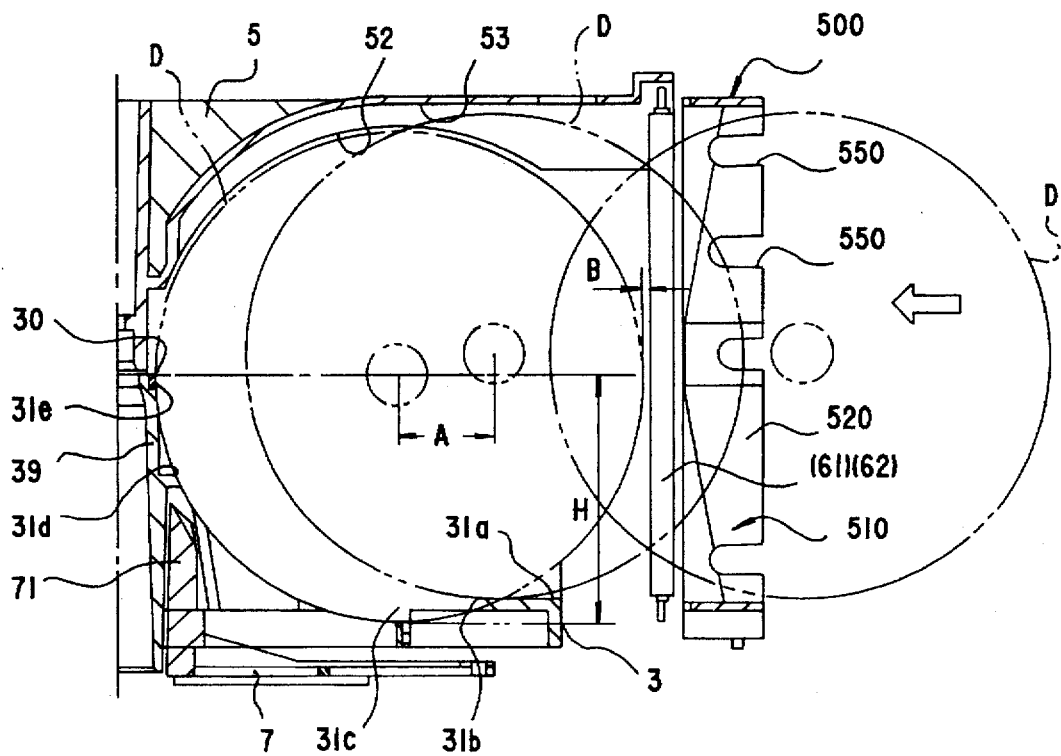
FIG. 8 is a diagram for illustrating how a disc rolls into the magazine.

As shown in FIG. 8, the bottom of the groove 31 has a lengthwise middle portion 31c which is 5 mm lower than the bottom 31a of opened portion in the outer peripheral wall of the magazine.

Over the entire length of each groove 31, the width of the groove 31 gradually decreases toward its bottom and also toward the center of rotation of the magazine 3. Further over the entire length, the width of the groove bottom is slightly larger than the thickness of the disc.

Figure 4:
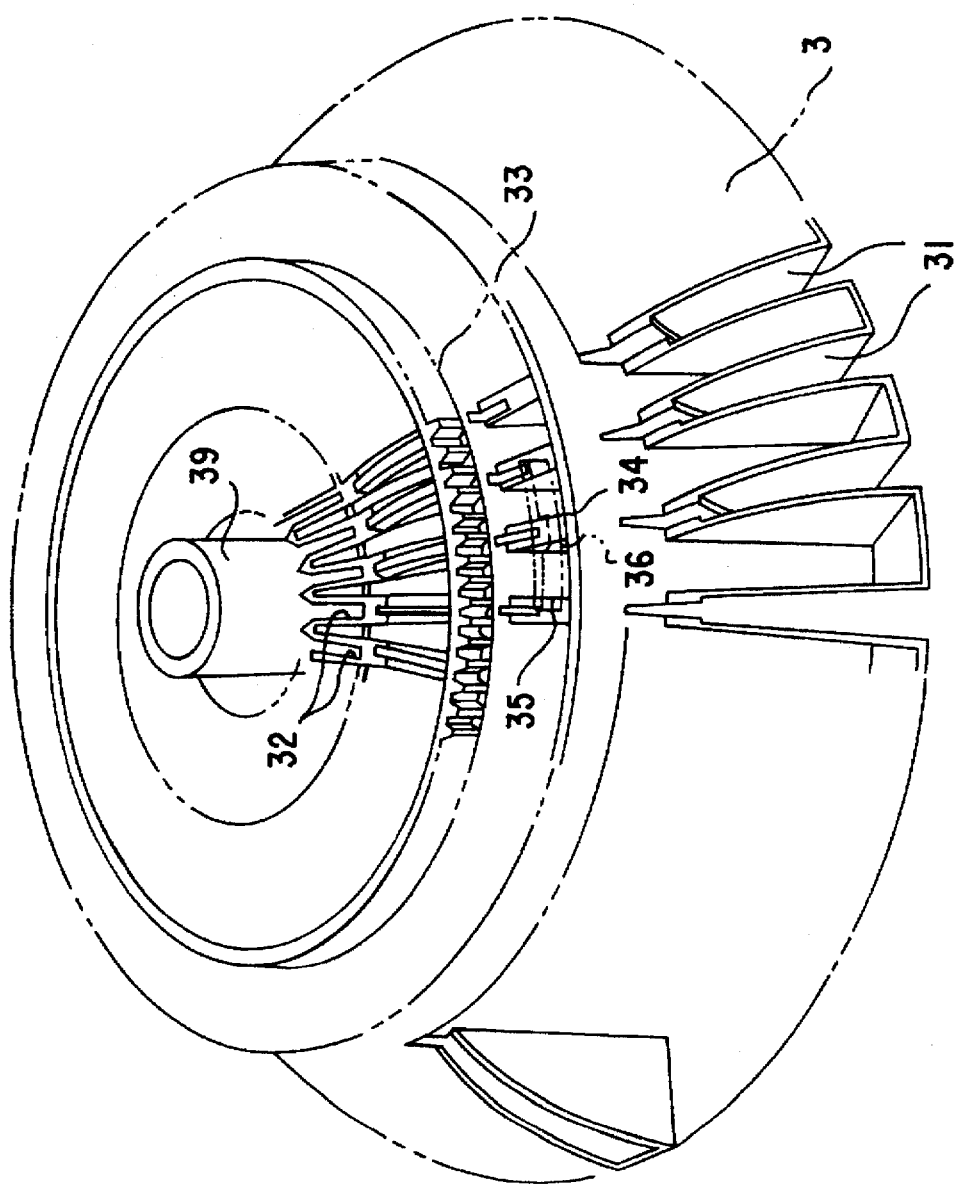
FIG. 4 is a perspective view, of the magazine turned upside down.

FIG. 4 shows the magazine 3 viewed from the rear side thereof. The groove 31 is partly formed with a slit 32 extending through the bottom wall of the magazine 3. As seen in FIG. 8, the disc D as fitted in the holding groove 31 is in contact with the groove bottom at a plurality of locations 31b, 31c, 31d and 31e, where the outer peripheral portion of the disc bearing no signal is held, whereby the disc is supported almost without any backlash, with the signal bearing surface of the disc rendered free of contact with the groove wall.

An annular elastic member 30 is fitted to the upper end outer periphery 31e of the central tubular portion 39 of the magazine 3. The vertical height H from the lowest portion 31c of the bottom of the groove 31 to the upper edge of the elastic member 30 is about 6 cm and approximately equal to the radius of the disc D. Thus, the upper edge 31e at the upper end of the groove 31 is made higher than the lowest portion of the disc supporting groove bottom by an amount approximately corresponding to the radius of the disc, and the disc D can be supported with good stability by being held by the edge 31e.

The annular elastic member 30 prevents the disc D from producing an impulse noise that would occur if the disc come into direct contact with the tubular portion 39 when rolling down the groove 31.

As shown in FIG. 4, the bottom of the magazine 3 has a drivingly rotating toothed ring 33 and an annular rib 34 oriented concentrically with the magazine, and a contact plate 35 for detecting the rotated position of the magazine 3.

Figure 5:
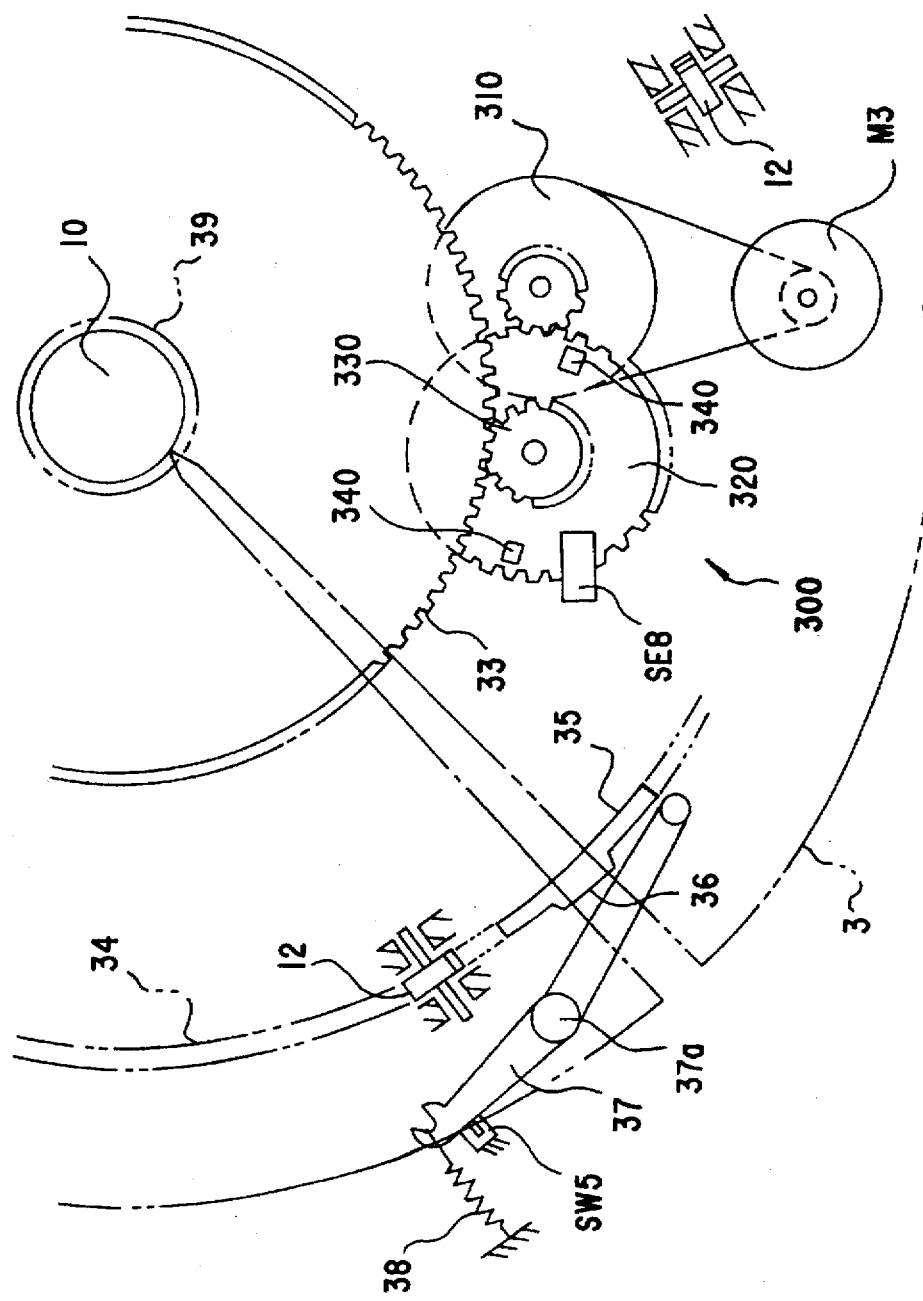
FIG. 5 is a diagram showing means for rotating and positioning the magazine.

As seen in FIG. 5, the rib 34 rests on a plurality of bearing rollers 12 arranged on a phantom circle on the base chassis 1 which circle is concentric with the magazine support post 10, whereby the position of the magazine 3 is determined with respect to the direction of height. With the central tubular portion 39 fitting to the support post 10, the magazine is prevented from lateral deflection.

The magazine 3 is coupled to the motor M3, which is provided for rotating the magazine, by two double gears 310, 320 as shown in FIG. 5.

The double gear 320 has a pinion 330 meshing with the toothed ring 33 of the magazine 3 and a large gear, the outer peripheral portion of which is formed with two through holes 340, 340 diametrically opposed to each other.

The aforementioned sensor (count sensor) SE8 is provided on the base chassis 1 so as to partly cover the large gear of the double gear 320 from above and below for counting the number of times the hole 340 passes.

When the double gear 320 rotates one half turn, the magazine 3 rotates by 15 deg, i.e., one pitch equal to one width of grooves 31.

As shown in FIG. 5, a lever 37 movable about a pivot 37a over a specified range is mounted on the base chassis 1 close to the path of revolution of the contact plate 35 on the magazine 3. The lever 37 is biased by a spring 38 and has a free end positioned in the path of revolution of a protrusion 36 formed on the contact plate 35. The detecting switch SW5 is disposed in the path of movement of the lever 37. The position where the contact plate 35 is attached to the magazine 3 is so determined that such when the lever 37 is pivotally moved by the contact of the free end with the protrusion 36 of the plate 35, actuating the switch SW5, No. 1 disc holding groove 31 of the magazine 3 will be opposed to the disc insertion-discharge means 4 to be described later.

Upon the No. 1 groove 31 reaching the position of the insertion-discharge means 4, one of the two holes 340, 340 formed in the magazine driving double gear 320 is at the position of the count sensor SE8.

When the switch SW5 for detecting the position of disc No. 1 and the count sensor SE8 have functioned at the same time, the No. 1 groove 31 as positioned for the insertion-discharge means 4 is detected.

When the ON-OFF button 22 on the front panel 2 is pressed, the magazine 3 is invariably rotated so as to bring the No. 1 groove 31 to the position opposed to the means 4, followed by subsequent movement. Disc Upper Portion Guide Member 5 (see FIGS. 1, 3 and 6 to 8)

A guide member 5 shown in FIGS. 1 and 6–8 is provided over the magazine 3 for guiding the upper portion of the group of discs accommodated in the magazine 3.

The guide member 5 has a leg 50 at its center and legs 51 at its Outer peripheral portions, the legs 50, 51 projecting downward. The leg 50 in the center is fitted to the upper, portion of the support post 10 mounted on the chassis 1 and extending through the central tubular portion 39 of the magazine 3. The peripheral legs 51 are fitted to and supported by guide member support posts 11 projecting from the base chassis 1. The guide member 5 does not rotate.

Figure 7:
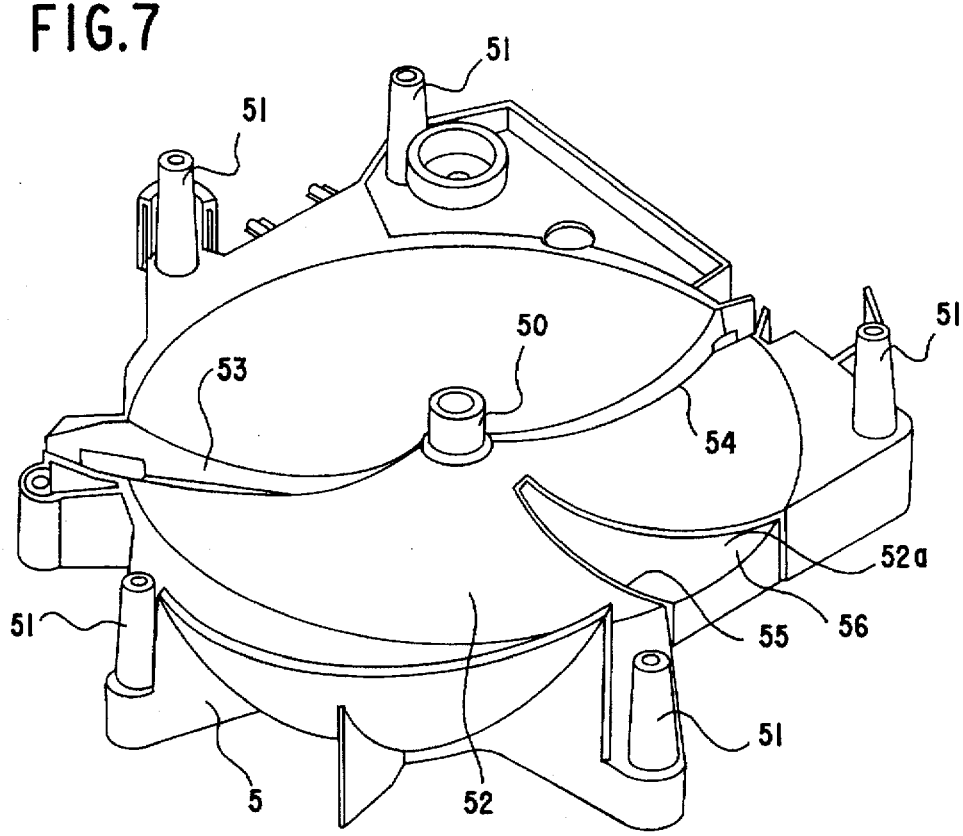
FIG. 7 is a perspective view of the bottom side of the guide member.

With reference to FIG. 7 which is a perspective view showing the guide member 5 turned upside down, the member 5 has an annular guide surface 52 in the form of a large circular-arc bottom surrounding the central leg 50. The curvature of the circular-arc guide surface 52 is approximately equal to the curvature of the outer periphery of the disc D.

As shown in FIG. 8, the guide surface 52 of the guide member 5 covers the disc D in the magazine 3 and is positioned close to the upper portion of the disc, so that the disc is unlikely to fall from the magazine even if the playing device is moved or turned upside down with the disc accommodated in the magazine.

Furthermore, the magazine 3, and the guide member 5 provide a two-component structure for holding the discs D, and only the magazine 3 is rotatable. This makes the magazine 3 compact and lightweight. The magazine 3 is therefore easy to control for rotation. Since the disc holding grooves 31 need to be formed only in the magazine 3, the grooves 31 are easy to make.

As shown in FIG. 7, the annular groovelike guide surface 52 of the guide member 5 has two guide grooves 53, 54 extending radially of the member 5 and spaced apart by the same angle as the angle between the insertion-discharge means 4 and the playing means 9, i.e., by 135 deg about the central leg 50. Each of the guide grooves 53, 54 has an open end in the side edge of the guide member 5.

The guide grooves 53, 54 correspond to the respective positions of the insertion-discharge means 4 and the playing means 9, permitting delivery of the disc to the magazine 3 at each position.

The guide member 5 has a generally triangular cutout 55 extending from a peripheral portion thereof toward the central leg 50 and provided with a removable closure 56. The inner surface of the closure 56 serves as a guide surface 52a continuous with the guide surface 52.

When the closure 56 is removed, the discs can be taken out from the magazine 3 without removing the entire guide member 5. In remedying malfunctions of the playing device, this enables the repairman to promptly withdraw the discs, hand them over to the user and carry the playing device only to the repair shop, hence convenience in avoiding the possible trouble of the disc becoming lost.

Disc Insertion-Discharge Means 4 (see FIGS. 2, 6 and 12 to 17).

FIG. 12 shows a vertical slit 21 formed in a center of the front panel 2 center for passing the disc therethrough.

Disposed in the rear of the slit 21 in the front panel 2 is a rotatable door 41 for opening or closing the slit. As seen in FIG. 2, provided in the rear of the door 41 is an insertion guide member 500, in the rear of which is provided the device 6 for delivering the disc to the magazine 3. These components provide the disc insertion-discharge means 4.

Figure 13:
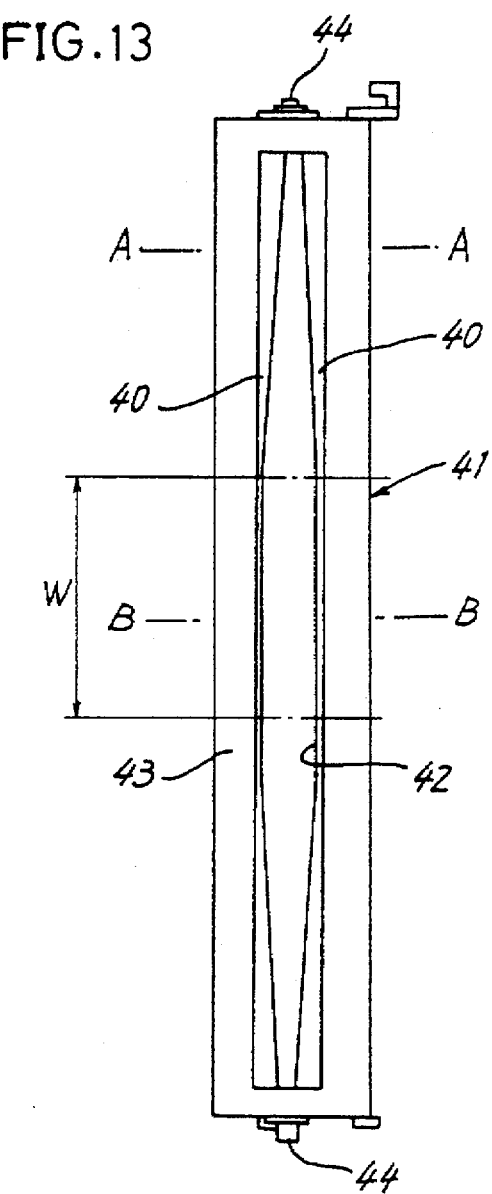
FIG. 13 is a front view showing a rotatable door.

The rotatable door 41 is prepared from synthetic resin by injection molding, and is in the form of a vertically elongated hollow cylinder when seen from the front of the panel as shown in FIG. 13. The door 41 has two plate members 40, 40 in its center. A vertically elongated slit 42 for the disc to pass therethrough is formed between the plate members 40, 40.

To make the door 41 convenient to make, the peripheral wall is omitted on the rear side.

The slit 42 has a length slightly greater than the diameter of the disc.

The slit 42 has a central portion of the largest width over a length of about 15 mm as indicated at W, is tapered from the central portion upward and downward and has upper and lower ends where the disc can be passed almost without any clearance.

Accordingly, even if the disc D passes through the slit 42 in frictional contact with the slit defining side walls, the contact occurs only at the peripheral edge portion of the disc, with the signal bearing portion of the disc held out of contact with the side walls and protected from damage.

The slit 21 in the front panel 2 and a disc insertion guide opening 510 of the insertion guide member 500, to be described later, are also shaped like the slit 42 of the door 41 to hold the signal recorded area out of frictional contact with the side wall.

Figure 15:
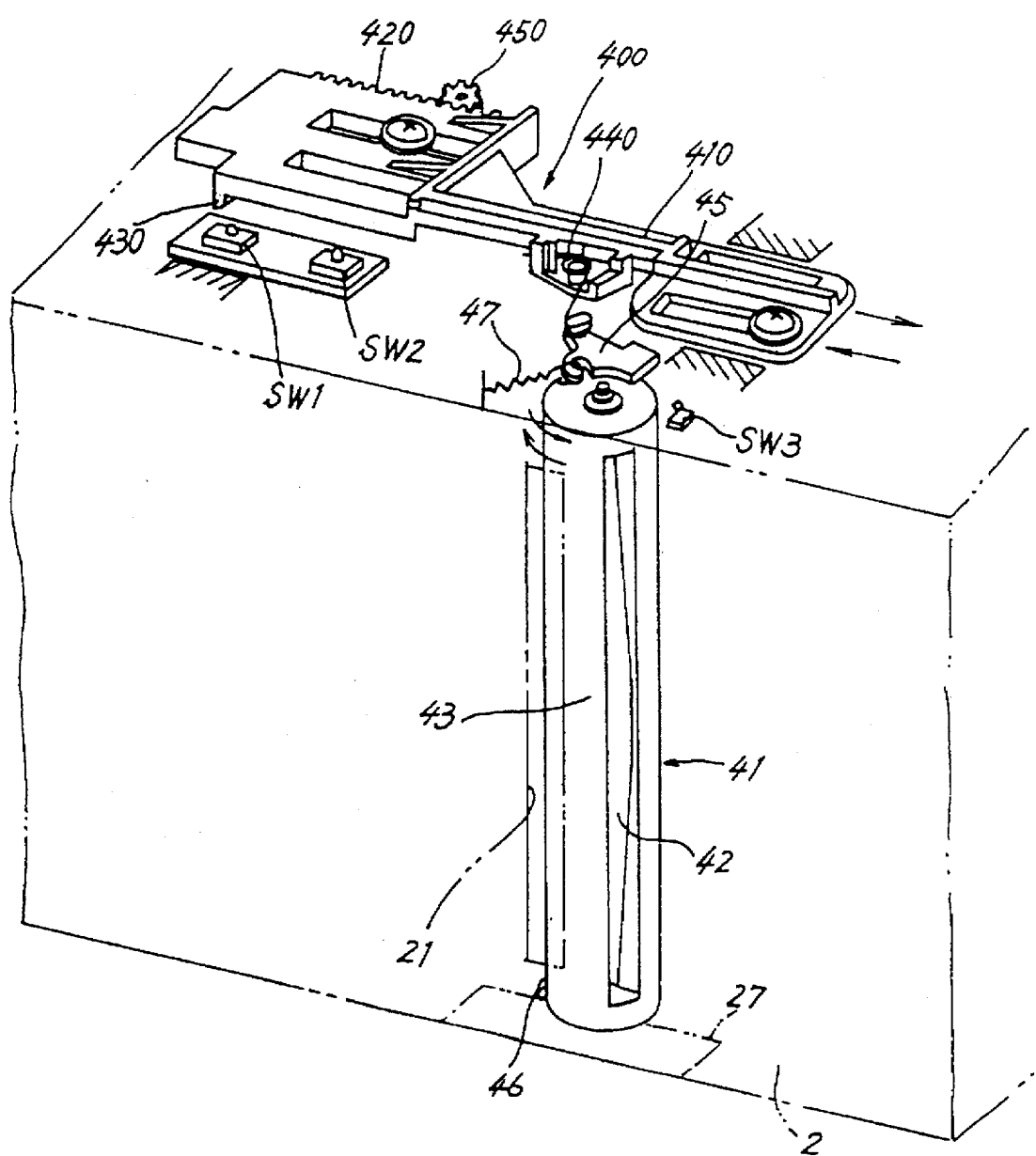
FIG. 15 is a perspective view of means for driving the rotatable door.

The rotatable door 41 has a pivot 44 projecting from the center of each of upper and lower end plates and rotatably supported by a rib (not shown) projecting from the rear side of the front panel 2. As shown in FIG. 15, the door has a circular-arc wall plate 43 which usually faces toward the slit 21 of the front panel 2 to close the slit 21. When the disc is to be inserted or discharged, the door is rotated clockwise through about 60 degrees by the door opening-closing drive device 400, to be described later, to register the slit 42 with the slit 21 in the panel 2.

Figure 14A:
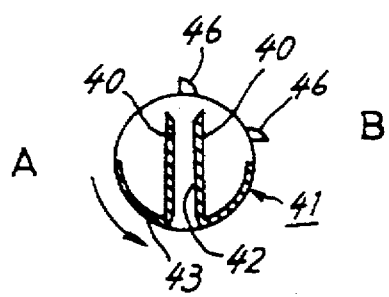
FIG. 14A is a view in section taken along the line A—A in FIG. 13 and showing the door.
Figure 14B:
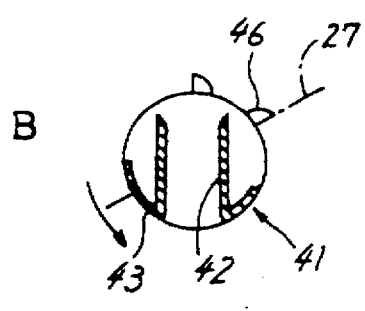
FIG. 14B is a view in section taken along the line B—B in FIG. 13 and showing the door.

As shown in FIG. 14B, the door 41 has stoppers 46, 46 projecting from the lower end thereof for regulating the angle of rotation of the door by coming into contact with a lug 27 on the front panel 2.

Figure 16:
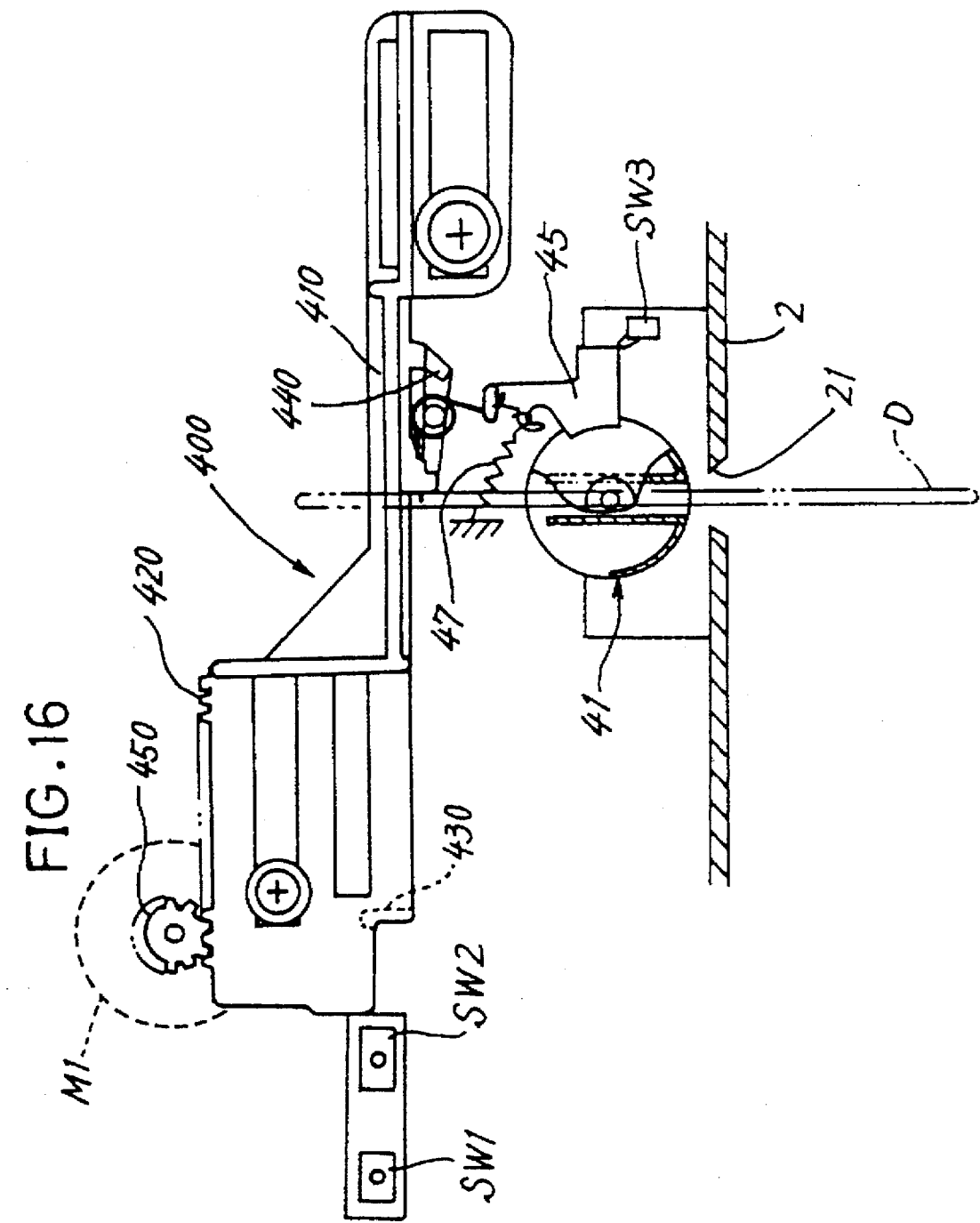
FIG. 16 is a plan view of the door driving means.

With reference to FIG. 16, a hook 45 extends from the upper end of the door 41 integrally therewith. Connected to the hook 45 are a spring 47 having a small force biasing the door in the closing direction at all times, and the door opening-closing drive device 400.

The drive device 400 comprises a torsion spring 440 attached to a slider 410 which is horizontally slidable along the front panel 2. The spring has one end engageable with the hook 45 on the door 41 in bearing contact therewith.

The slider 410 has a rack 420 extending in the sliding direction and meshing with a pinion 450.

Figure 6:
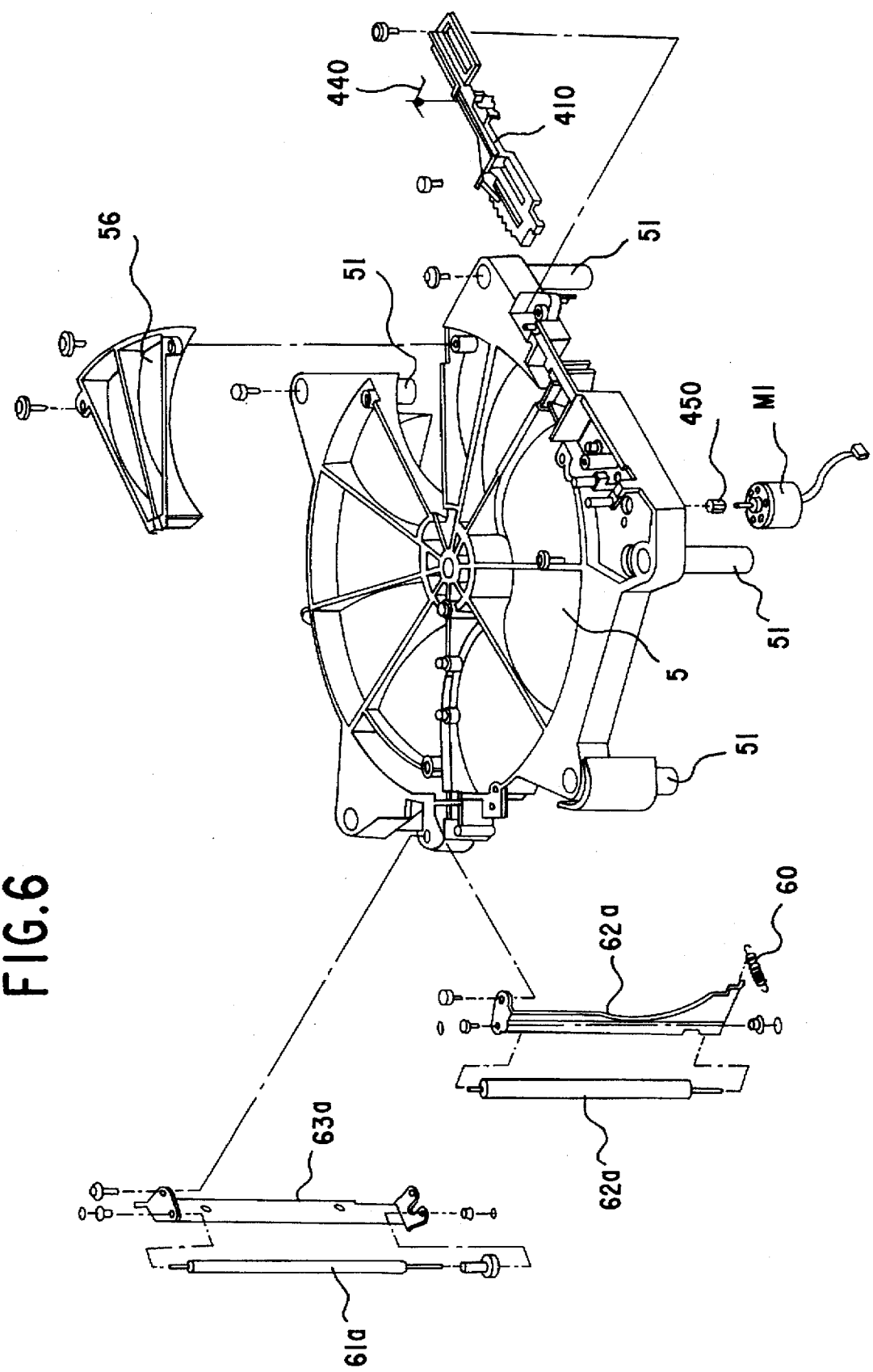
FIG. 6 is an exploded perspective view of a disc upper portion guide member.

As shown in FIG. 6, the slider 410 and the pinion 450 are arranged on the guide member 5. The motor M1, which is provided for opening and closing the door, is mounted on the guide member 5 for driving the pinion 450 to move the slider 410.

When the slider 410 moves rightward in FIGS. 15 and 16, one end of the torsion spring 440 on the slider 410 comes into contact with the hook 45 on the door 41, rotating the door 41 clockwise, i.e., in the opening direction against the force of the spring 47 biasing the door 41 in the closing direction.

When the slider 410 moves leftward, the torsion spring 440 moves out of contact with the hook 45 on the door 41, freeing the door 41 from its biasing force and permitting the spring 47 to rotate the door 41 in the closing direction, i.e., counterclockwise, for the door wall plate 43 to close the slit 21 in the front panel 2.

The switch (fully closed door sensor switch) SW1 and switch (fully open door sensor switch) SW2 are arranged along the path of movement of the slider 410. When the slider 410 is moved leftward where the door is fully closed, a projection 430 on the slider 410 actuates the fully closed door sensor switch SW1 to stop the door opening-closing motor M1. Alternatively when the slider 410 is moved to a position where the door is fully opened, the projection 430 actuates the fully open door sensor switch SW2 to stop the motor M1.

As described above, the slider 410 and the rotatable door 41 are not interconnected by a rigid body, but the torsion spring 440 is provided for opening the door 41, and the spring 47 of lower force acts to close the door 41. Should the slider 410 move with the disc held in the door 41, causing the spring 47 to exert its force on the door 41 in the closing direction, the door 41 stops rotating with the disc engaged therein without breaking the disc since the spring force is small.

Further provided on the rear side of the front panel 2 is the switch (disc engagement sensor switch) SW3 which comes into contact with the hook 45 of the door 41 for detecting the door 41 as fully opened.

As stated above, the slider 410 and the door 41 are not interconnected by a rigid body, but are merely connected by the torsion spring 440, so that the slider 410 is likely to move in the door closing direction to actuate the fully closed door sensor switch SW1, with the disc engaged in the door 41. In view of this likelihood, the subsequent movement is not effected while the switch SW3 is detecting the door in the fully opened state to ensure improved safety.

Close to the door 41 in the rear thereof, the aforementioned insertion guide member 500 is fixedly provided to extend from the chassis 1 to the guide member 5.

Figure 17:
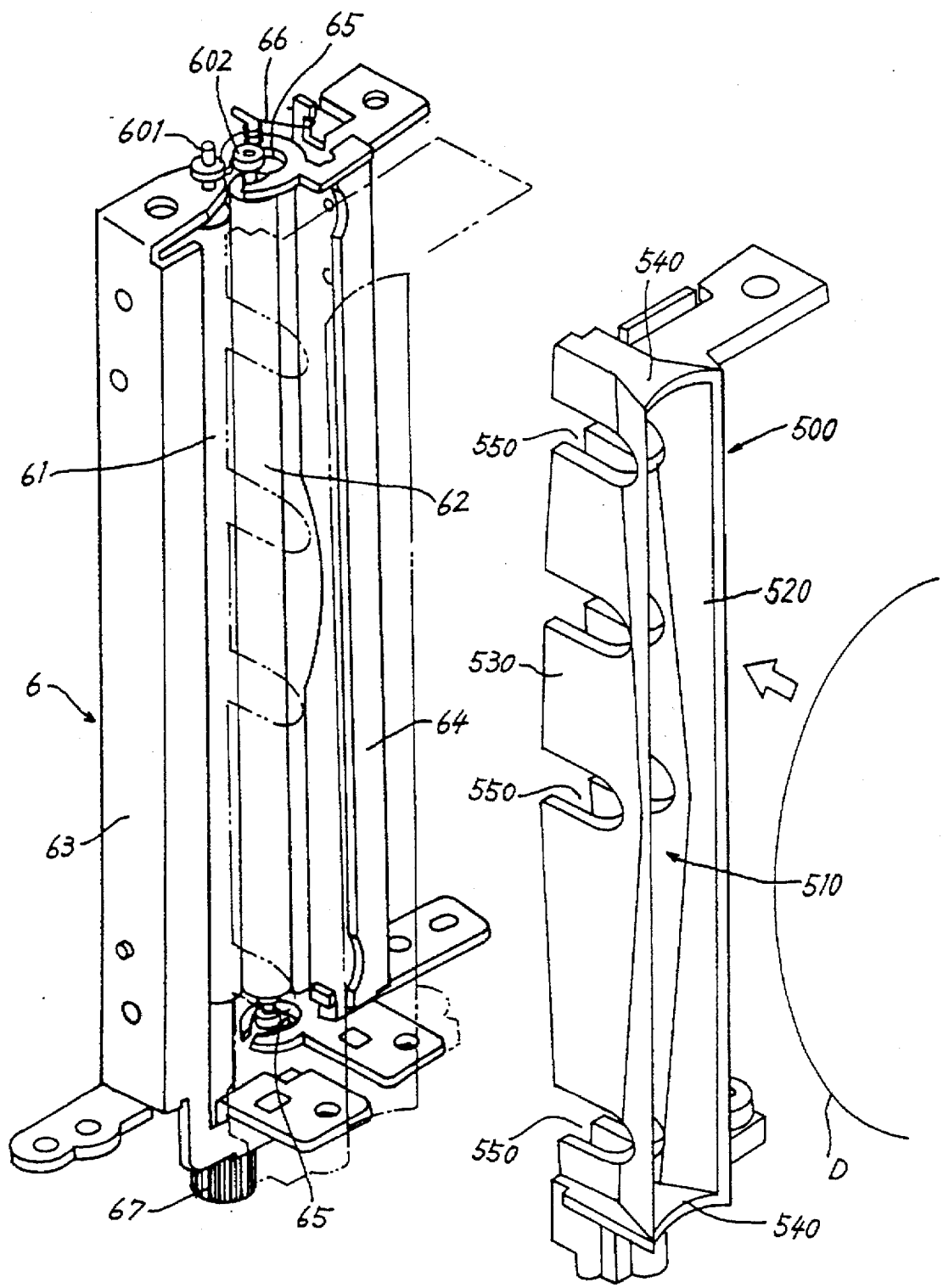
FIG. 17 is a perspective view of a disc delivery device.

As seen in FIG. 17, the insertion guide member 500 comprises two plates 520, 530 interconnected at each of their upper and lower ends by an end plate 540. Like the slit 21 in the door 41, the plates 520, 530 define therebetween a disc insertion guide opening 510 which is shaped not to contact the signal recorded area of the disc.

The plates 520, 530 are each formed with four cutouts 550 in opposed relation. The cutouts are formed in corresponding relation with the respective positions of the first to fourth sensors SE1 to SE4 among the six sensors SE1 to SE6 for detecting the size of discs, permitting the passage of sensor beams therethrough.

Disc Delivery Device 6 (see FIGS. 2, 8 and 17 to 22)

The delivery device 6 is disposed behind the insertion guide member 500.

The device 6 comprises a pair of rollers 61, 62 arranged close to the member 500 for transporting the disc D as held therebetween, and a kick-out member 7 slidably provided on the base chassis 1 in the rear of the rollers 61, 62 shown in FIG. 8 for kicking out the disc D from the magazine 3 toward the rollers 61, 62.

As shown in FIG. 17, the two rollers 61, 62 have shafts 601, 602 projecting from their upper and lower ends and rotatably supported by support members 63, 64, respectively. The roller support members 63, 64 are fixedly provided and extend from the base chassis 1 to the guide member 5.

The left roller 61 shown in FIG. 17 is held in a fixed position where the roller contacts the surface of the disc passing through the center of width of the insertion guide opening 510 of the insertion guide member 500, and carries a drive gear 67 at its lower end.

The other roller 62 has its shaft 602 loosely fitted in a cutout 65 in each end of the support member 64 so as to be movable toward or away from the roller 61 of the pair, and is biased toward the roller 61 by a spring 66 into contact with the roller 61 at all times.

The cutout 65 of the roller support member 64 has a side opening with a width which is smaller than the diameter of the shaft 602, for preventing the roller shaft 602 from slipping off.

Figure 18:
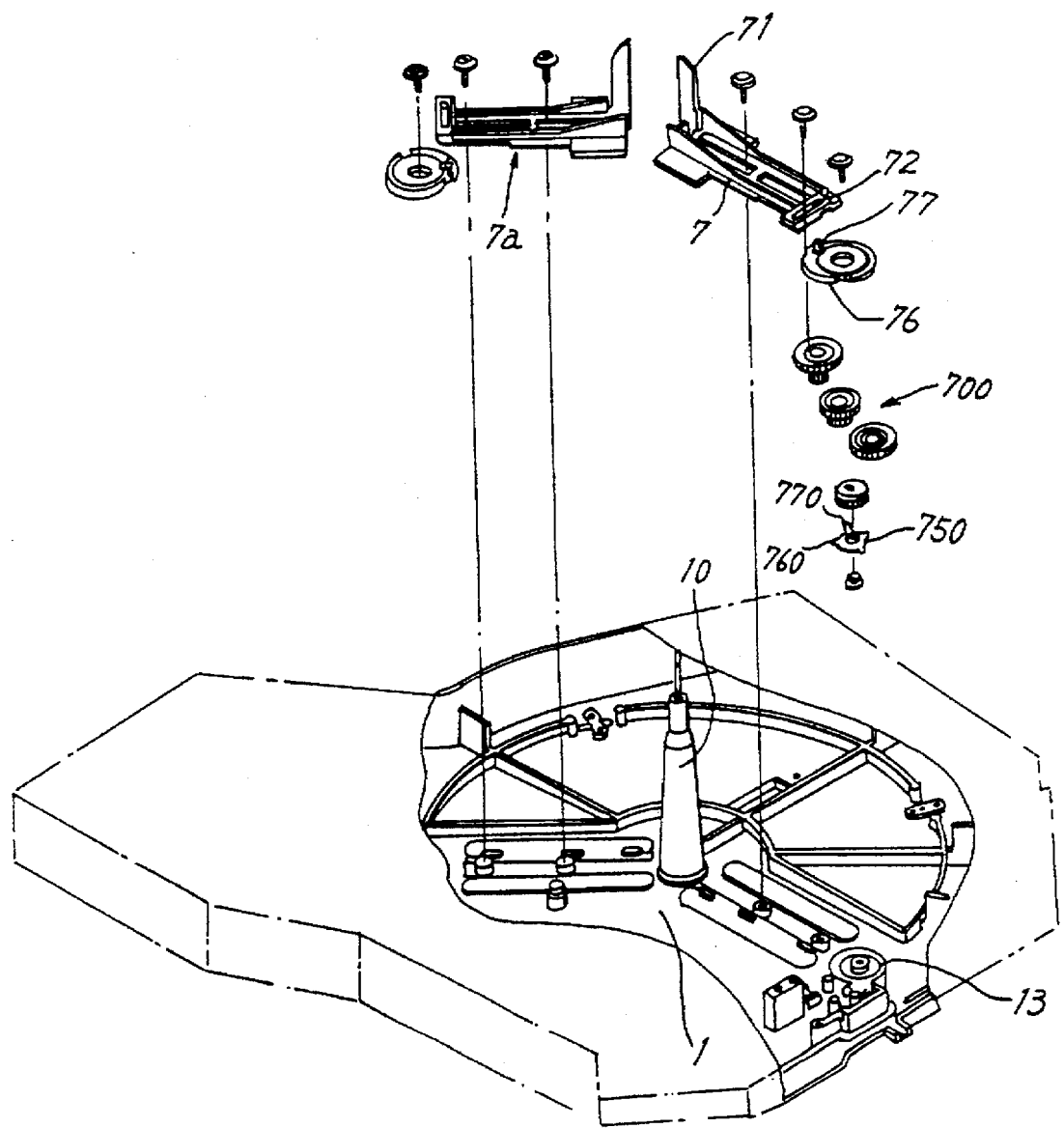
FIG. 18 is a perspective view of the base chassis and kick-out members.

With reference to FIG. 18, the kick-out member 7 is provided on the base chassis 1 and slidable from the support post side toward the position between the rollers 61, 62. The kick-out member 7 has a pushing piece 71 projecting upward from its rear end and movable into the bottom slit 32 of the magazine 3 to kick out the disc toward the rollers 61, 62, and a guide slot 72 formed in its front portion and orthogonal to the direction of sliding movement of the member 7.

The roller 61 fixedly positioned and the kick-out member 7 has a common drive device 705 coupled thereto.

Figure 19:
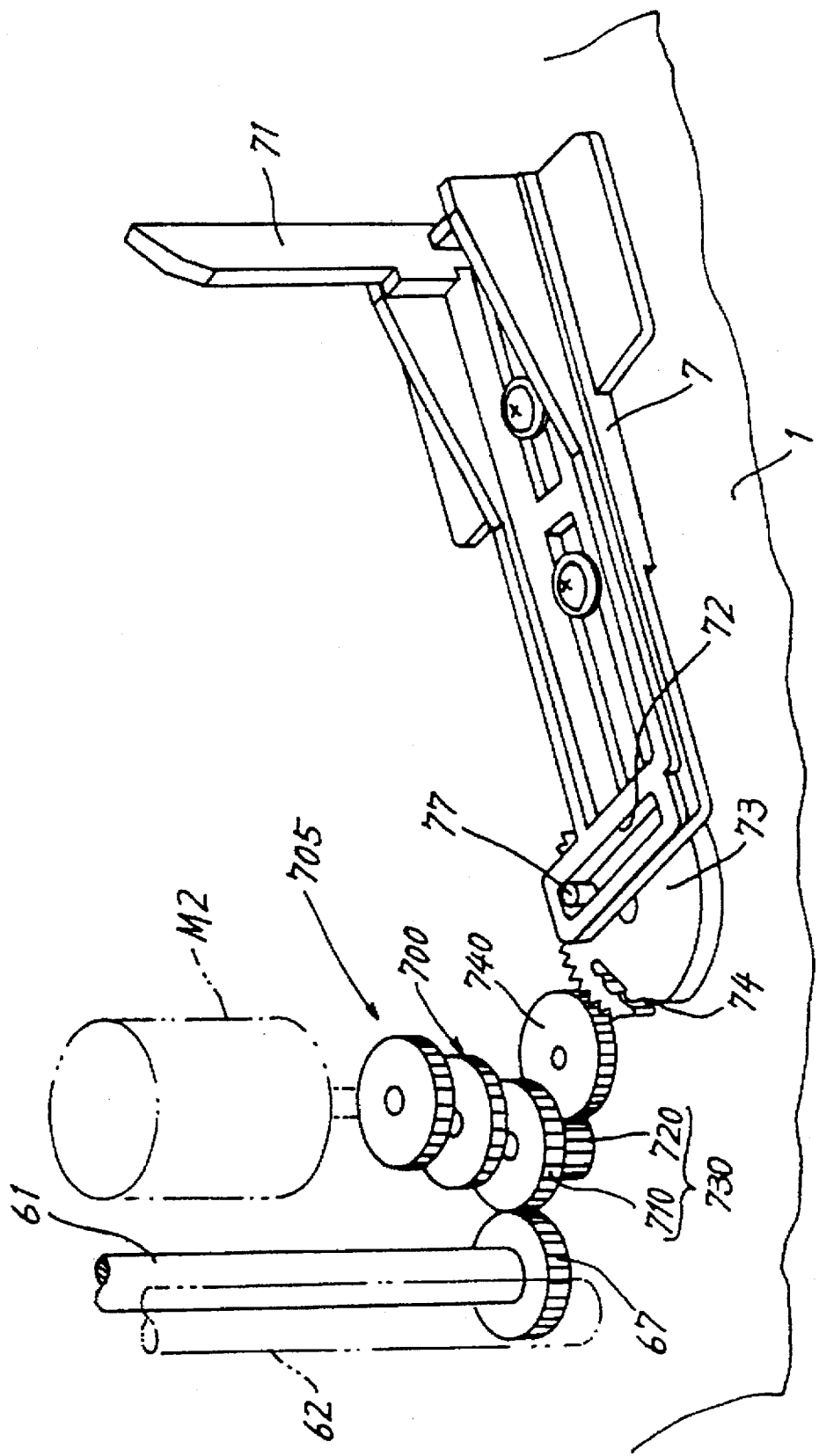
FIG. 19 is a perspective view of a system for driving a slide member.

With reference to FIG. 19, the drive device 705 comprises the aforementioned motor M2 which is an insertion-discharge side loading motor mounted on the base chassis 1, and a gear train 700 coupled to the motor M2 and including a double gear 730 at a downstream position of the train. The double gear 730 has a large gear 710 meshing with the gear 67 at the lower end of the roller 61, and a small gear 720 in mesh with an intermediate gear 740, which in turn is in mesh with a control gear 73. A pin 77 projecting from the control gear 73 is slidably fitted in the guide slot 72 of the kick-out member 7. The gears of the drive device 705 and the gears included in the mechanisms of the present embodiments are all made of synthetic resin.

Figure 20:
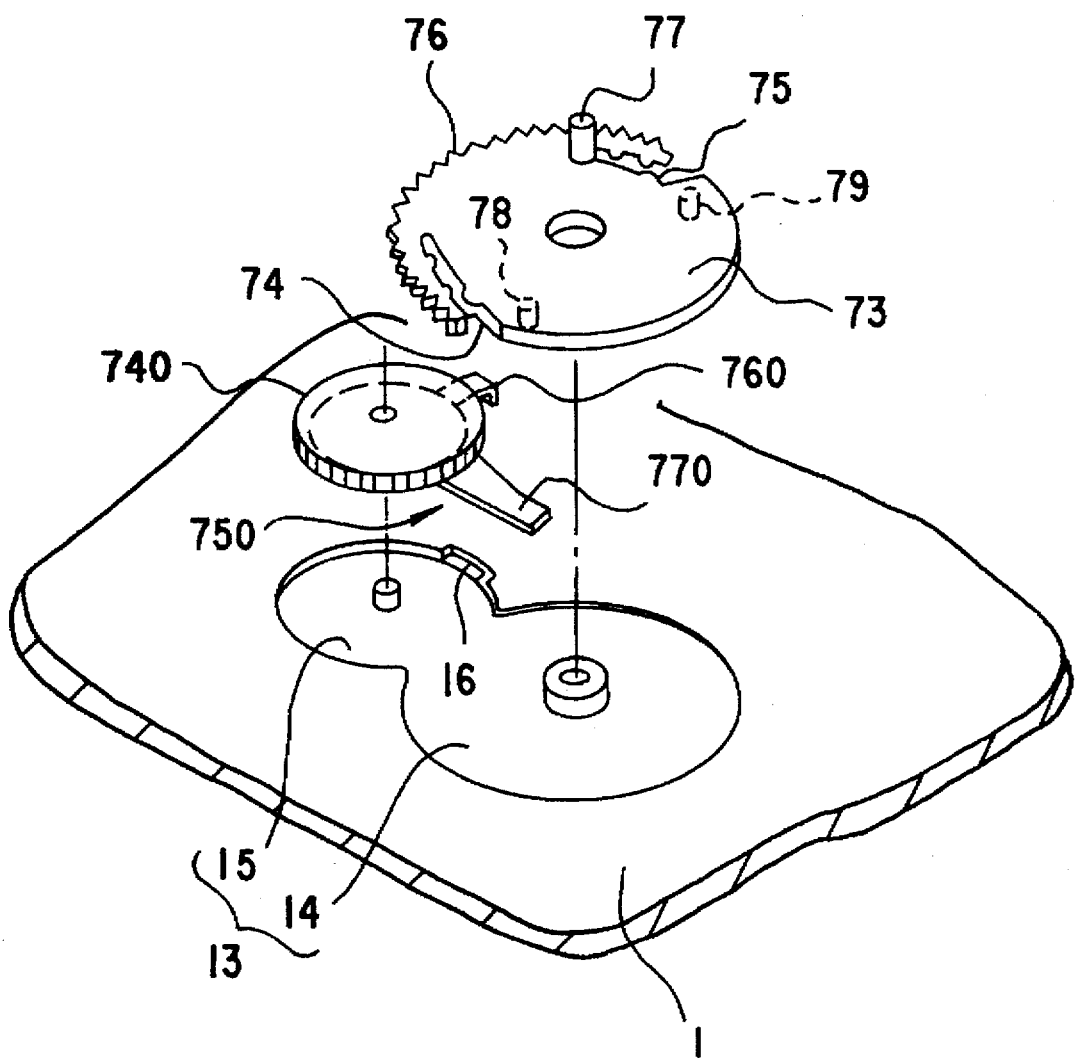
FIG. 20 is an exploded fragmentary perspective view of the slide member driving system.

As seen in FIG. 20, the intermediate gear 740 and the control gear 73 are rotatably fitted in a cavity 13 formed in the base chassis 1. The cavity 13 comprises a small circular recess 15 having the intermediate gear 740 fitted therein, and a large circular recess 14 continuous with and partially lapped over the recess 15 for fitting the control gear 73.

Attached to the underside of the intermediate gear 740 is a latch plate 750 rotatable with the gear 740 when free of load or slipping relative to the gear 740 when subjected to a load.

A rotation restraining lug 760 having a downwardly bent outer end and an arm 770 laterally extends in a V-shaped arrangement from the outer periphery of the latch plate 750.

The small circular recess 15 formed in the base chassis 1 and having the intermediate gear 740 fitted therein is provided with an arcuate aperture 16 having the bent end of the restraining lug 760 fitted therein loosely. The lug 760 is revolvable by an amount corresponding to an allowance included in the aperture.

The arm 770 is positioned inside the large circular recess 14 having the control gear 73 fitted therein.

The control gear 73 has a toothed portion 76 along part of its periphery and cutouts 74, 75 extending from opposite ends of the toothed portion 76 along this portion 76 toward each other to give resiliency to opposite sides of the toothed portion 76.

The pin 77 fitting in the guide slot 72 of the kick-out member 7 is provided on the upper side of the control gear 73, the underside of which is provided with contact pieces 78, 79 close to the outer periphery of the gear and to the respective cutouts 74, 75.

Figure 21:
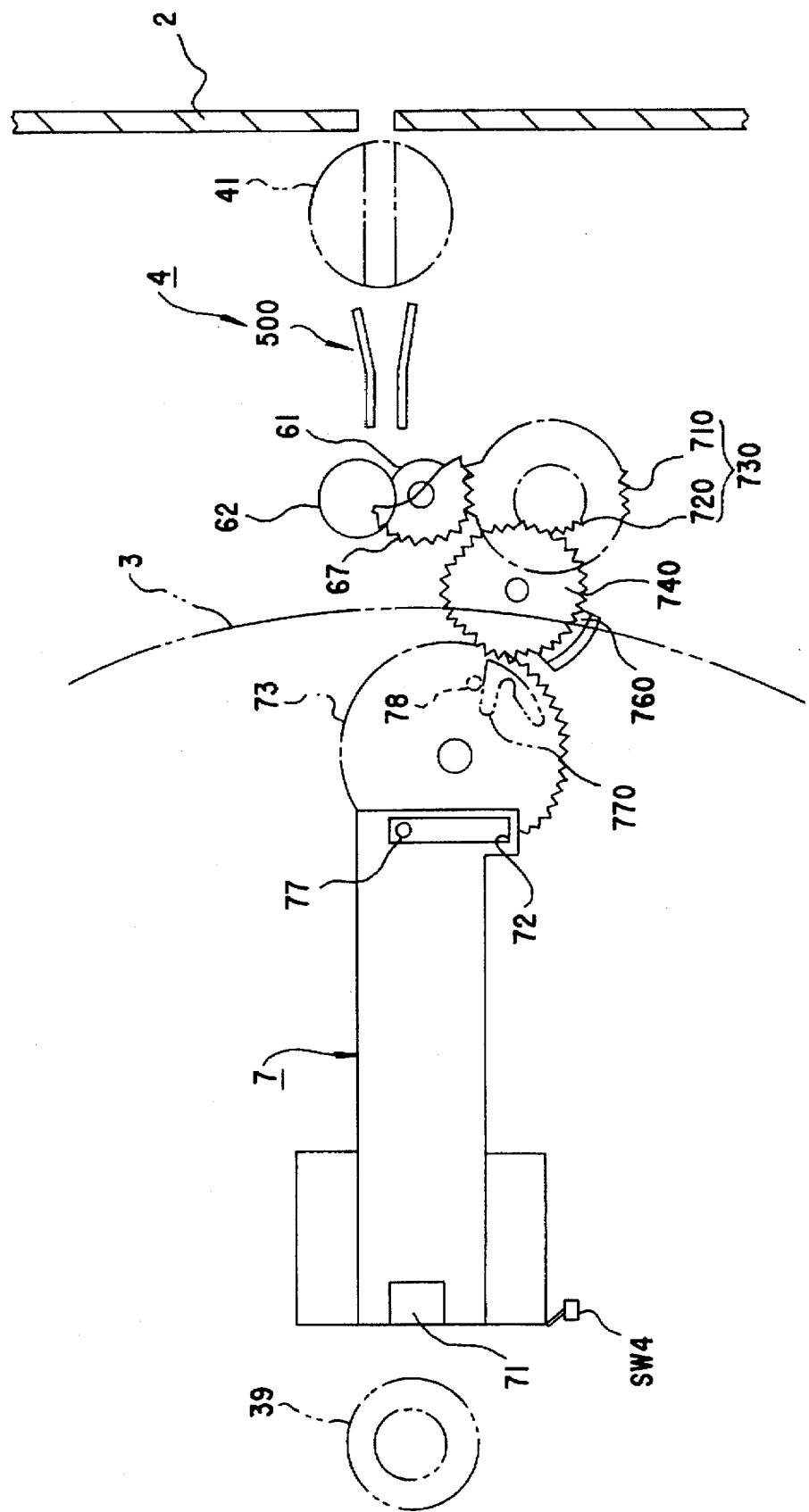
FIG. 21 is a plan view of the driving system.

With reference to FIGS. 19 and 21, the insertion-discharge side loading motor M2 operates when the disc is to be accommodated in the magazine 3, rotating the double gear 73 in a direction to draw the disc inward.

The intermediate gear 740 meshing with the small gear 720 of the double gear 730 rotates counter-clockwise to rotate the control gear 73 clockwise and move the kick-out member 7 rearward. (FIG. 21 shows the kick-out member in a retracted position.)

The latch plate 750 beneath the intermediate gear 74 rotates to follow the counterclockwise rotation of the intermediate gear 740 until the bent end of the rotation restraining lug 760 strikes on an end of the arcuate apertured portion 16, whereupon the intermediate gear 740 only further rotates.

With the retraction of the kick-out member 7, the pushing piece 71 on the member 7 moves out from the disc holding groove 31 of the magazine 3, rendering the disc insertable into the holding groove 31 free of trouble.

After the kick-out member 7 has reached the limit position of its retraction, the double gear 730 continues to rotate, causing the fixedly positioned roller 61 to rotate continuously to continuously draw the disc inward. The loading motor M2 stops a predetermined period of time after the passage of the disc over the roller 61 by the disc sensors SE1 to SE6 to be described later, i.e., 0.5 second thereafter in the case of the present embodiment. As shown in FIG. 8, the disc reaches the inner portion of the holding groove 31 of the magazine 3 upon moving past the rollers 61, 62, such that the disc falls into the groove 31 the moment it leaves the rollers 61, 62.

With reference to FIG. 8, the distance A the disc rolls along under gravity is greater than the distance B between the disc falling into the groove 31 and the roller 61.

Although the intermediate gear 740 continues rotating while the double gear 730 is in rotation, the cutout 74 of the control gear 73 is opposed to the intermediate gear 740 upon the kick-out member 7 reaching its retracted limit position as shown in FIGS. 19 and 20, permitting the intermediate gear 740 to rotate idly without delivering its torque to the gear 73. This obviates any possible damage to the mechanism.

Figure 22:
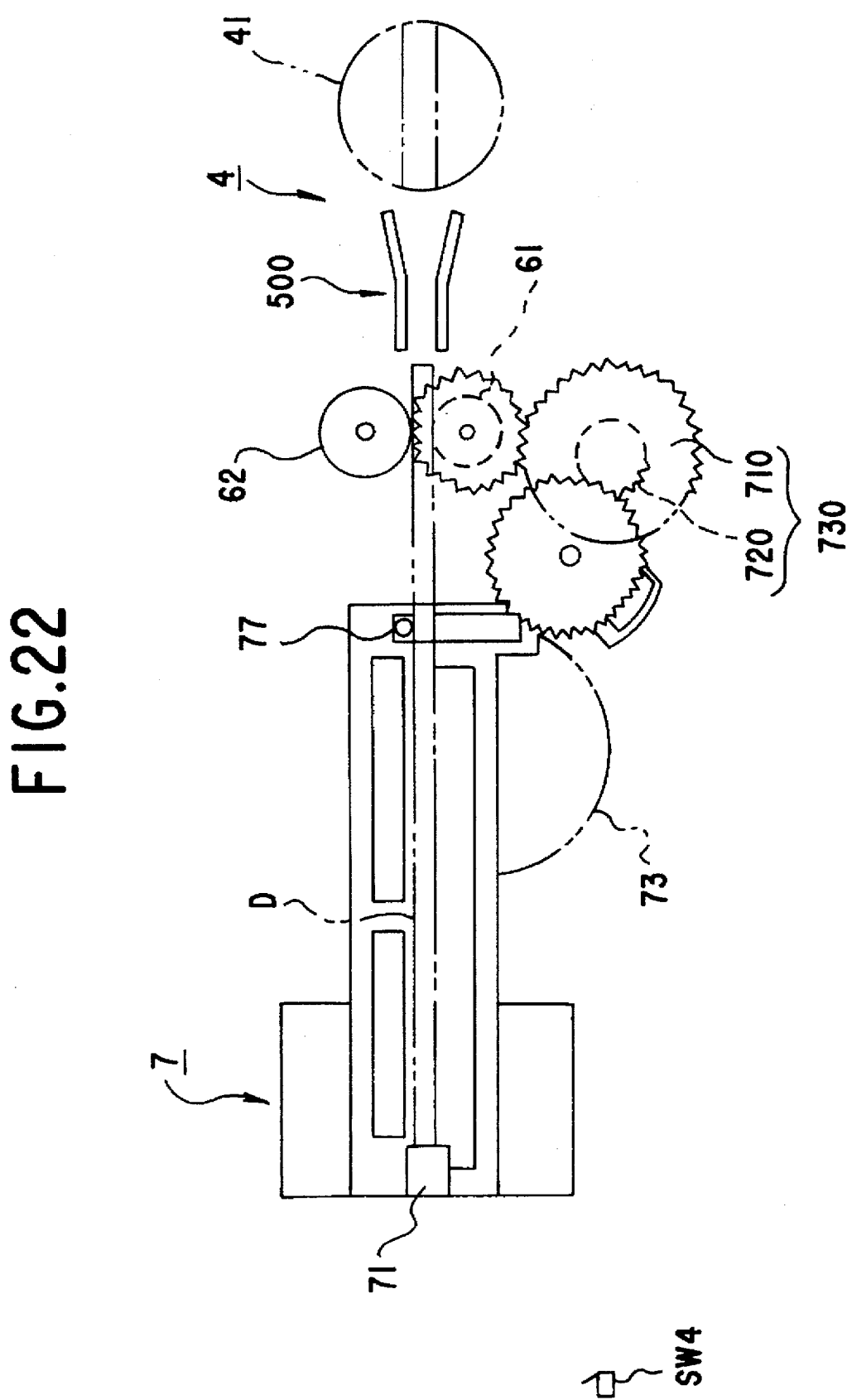
FIG. 22 is a plan view showing the driving system in operation.

When the disc is to be discharged from the magazine 3 toward the rollers 61, 62, the insertion-discharge loading motor M2 rotates in a direction opposite to the above, rotating the double gear 730 counterclockwise to rotate the rollers 61, 62 in such direction as to discharge the disc as shown in FIG. 22.

The intermediate gear 740 rotates clockwise along with the latch plate 750, causing the arm 770 to kick the contact piece 78 on the underside of the control gear 73 to rotate the gear 73 counterclockwise slightly.

The slight counterclockwise rotation of the control gear 73 meshes the toothed portion 76 of the gear 73 with the intermediate gear 740, which in turn drives the control gear 73 counterclockwise.

Although the latch plate 750 beneath the intermediate gear 740 rotates, following the clockwise rotation of the gear 740, the plate stops rotating upon the bent end of the rotation restraining 760 coming into contact with the end of the arcuate apertured portion 16. The intermediate gear 740 continues rotating.

Figure 70:
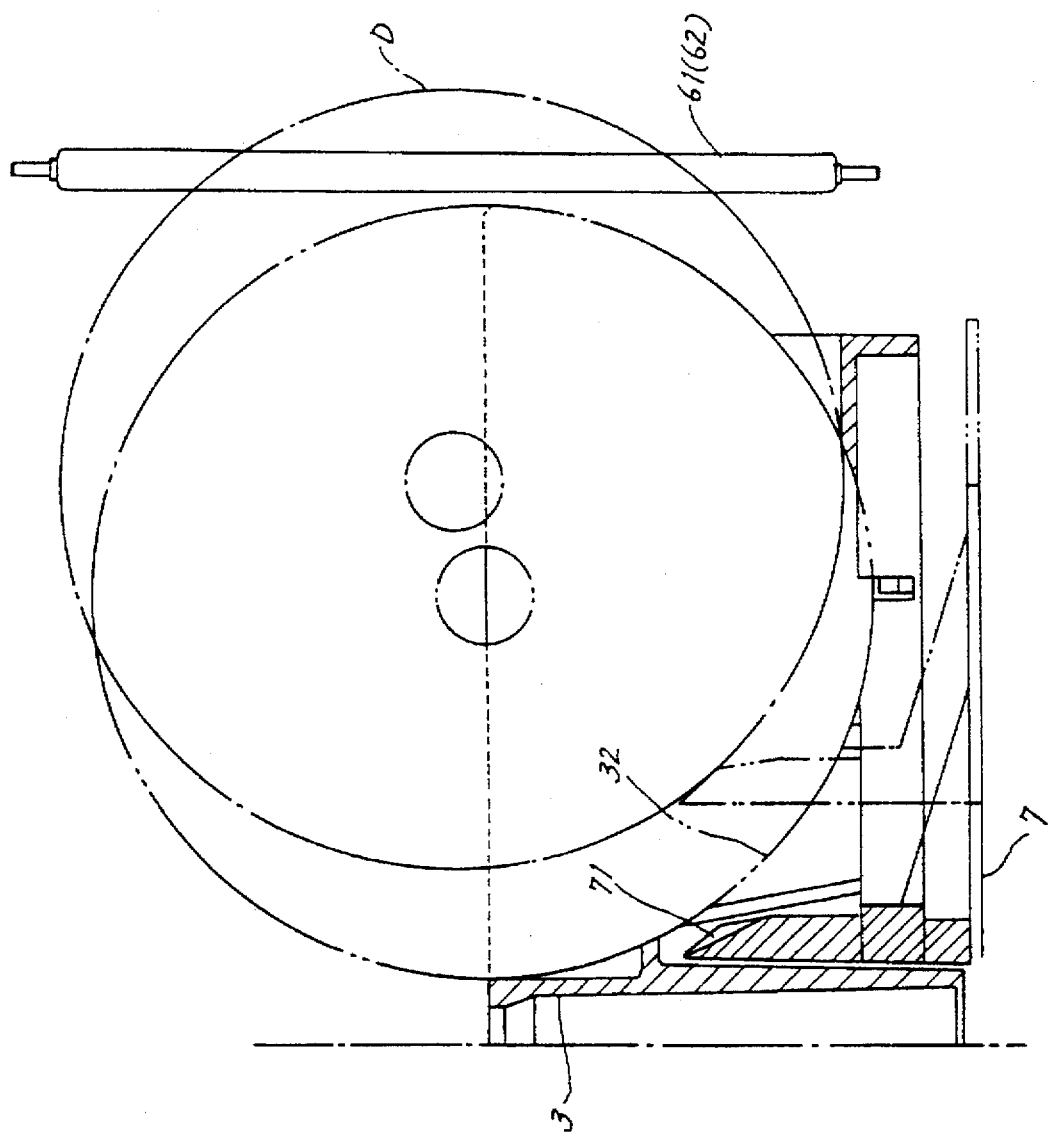
FIG. 70 is a diagram showing the path of transfer of the disc.
Figure 71:
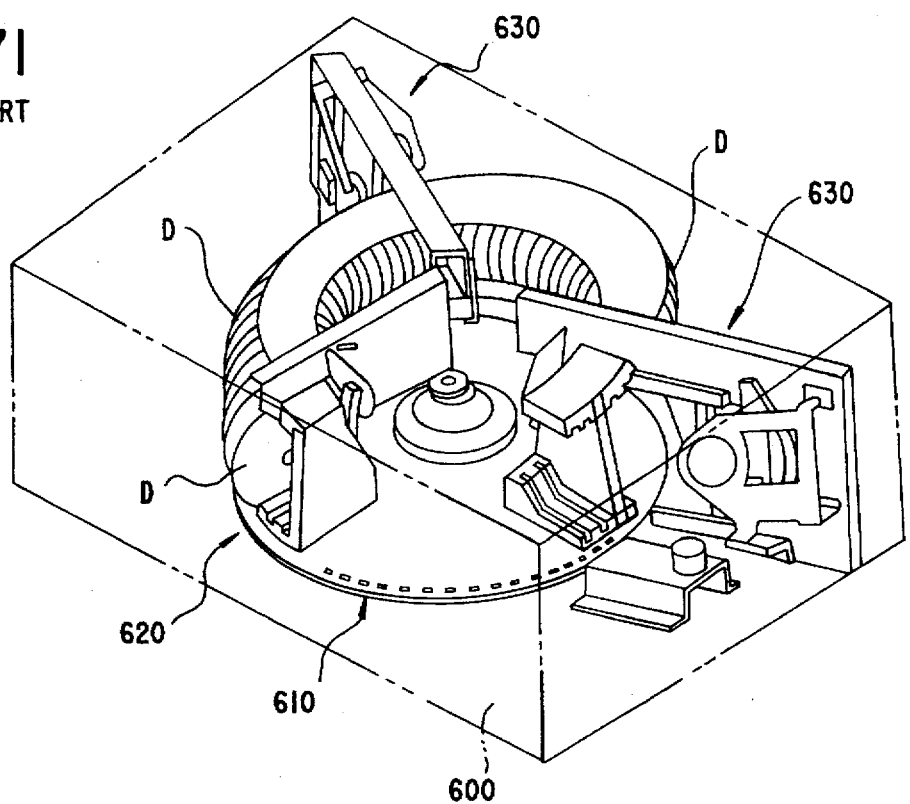
FIG. 71 is a perspective view of a conventional disc playing device.
Figure 72:
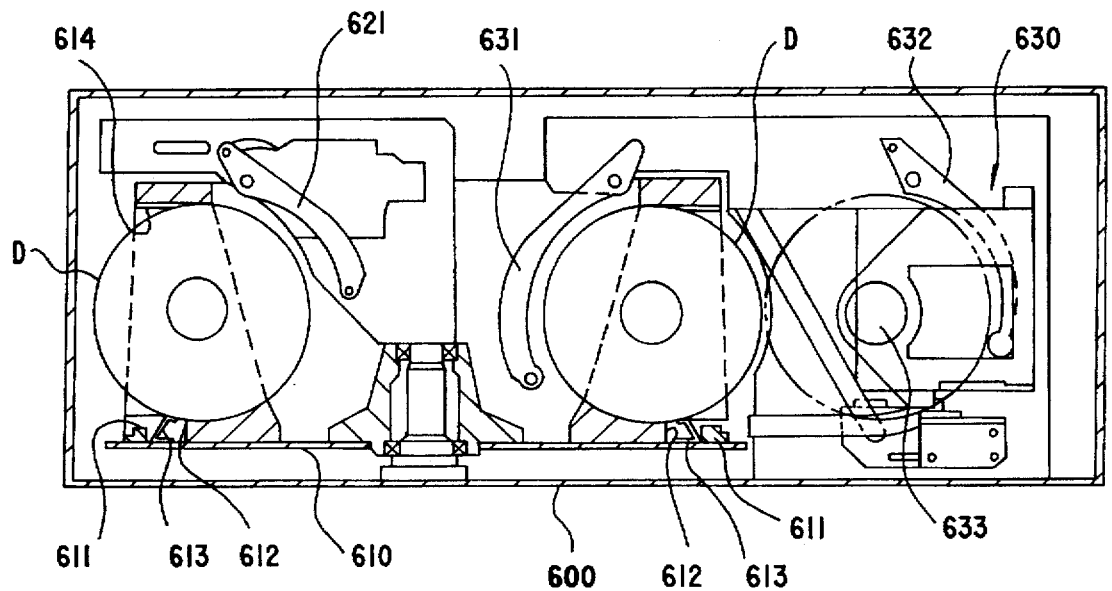
FIG. 72 is a sectional view of the conventional device.

The counterclockwise rotation of the control gear advances the kick-out member 7, moving the pushing piece 71 into the bottom slit 32 of the magazine 3 to kick out the disc in the groove 31 until the disc is nipped by the rollers 61, 62. (FIG. 22 shows the kick-out member 7 in a kickout completed position, while FIG. 70 shows the path of movement of the disc D.)

Upon the delivery of the disc to the rollers 61, 62 by the action of the kick-out member 7, the cutout 75 of the control gear 73 is opposed to the intermediate gear 740, whereby the rotation of the control gear 73 is discontinued. The intermediate gear 740, although continuously rotating, causes no damage to the mechanism.

When the disc D has moved past the rollers 61, 62, the disc sensors to be described later function to stop the loading motor M2.

When the disc is to be accommodated in the magazine 3 again, the loading motor M2 operates to rotate the double gear 730 clockwise and rotate the roller 61 in the disc drawing-in direction.

The intermediate gear 740 meshing with the small gear 720 of the double gear 730 rotates counter-clockwise. At this time, the latch plate 750 rotating counterclockwise with the intermediate gear 740 kicks the contact piece 79 on the underside of the control gear 73 with its arm 770, slightly rotating the control gear 73 clockwise to mesh the toothed portion 76 of the gear 73 with the intermediate gear 740.

The same operation as described above thereafter follows.

The switch SW4 for detecting the retracted position of the kick-out member 7 is provided for the insertion-discharge side in corresponding relation with the retracted position of the member 7. While the kick-out member 7 in its retracted position is not detected by the switch SW4, the magazine rotating motor M3 remains de-energized. This prevents the rotation of the magazine 3 with the pushing piece 71 of the kick-out member 7 fitting in the slit 32 of the magazine as shown in FIG. 35.

Figure 9:
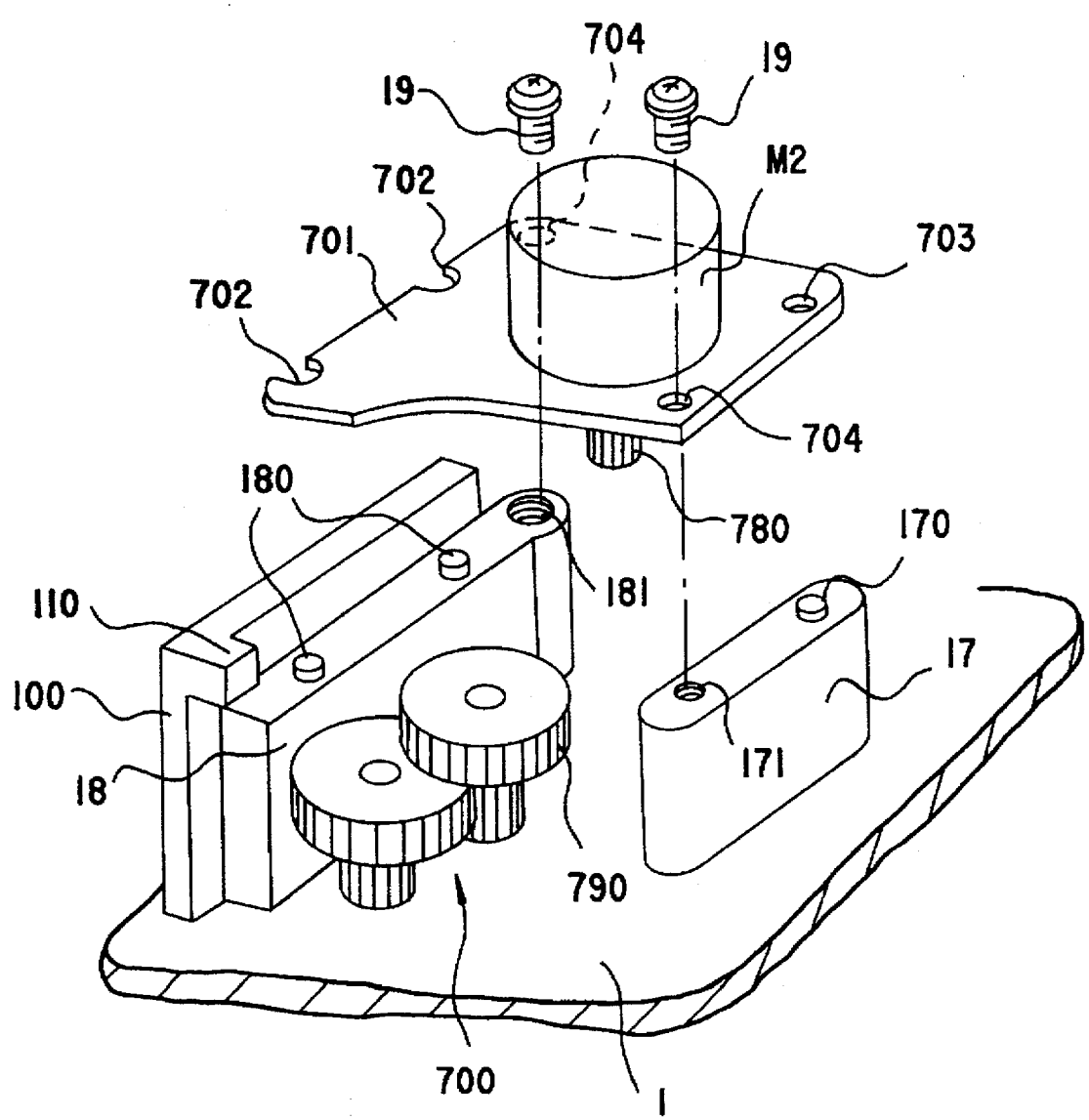
FIG. 9 is an exploded perspective view of a motor mount portion.
Figure 10:
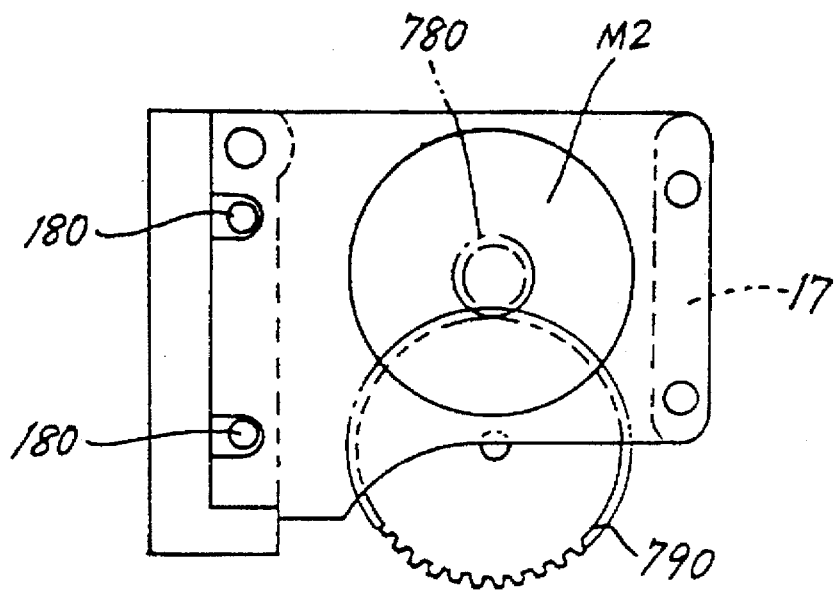
FIG. 10 is a plan view of the motor mount portion.
Figure 11:
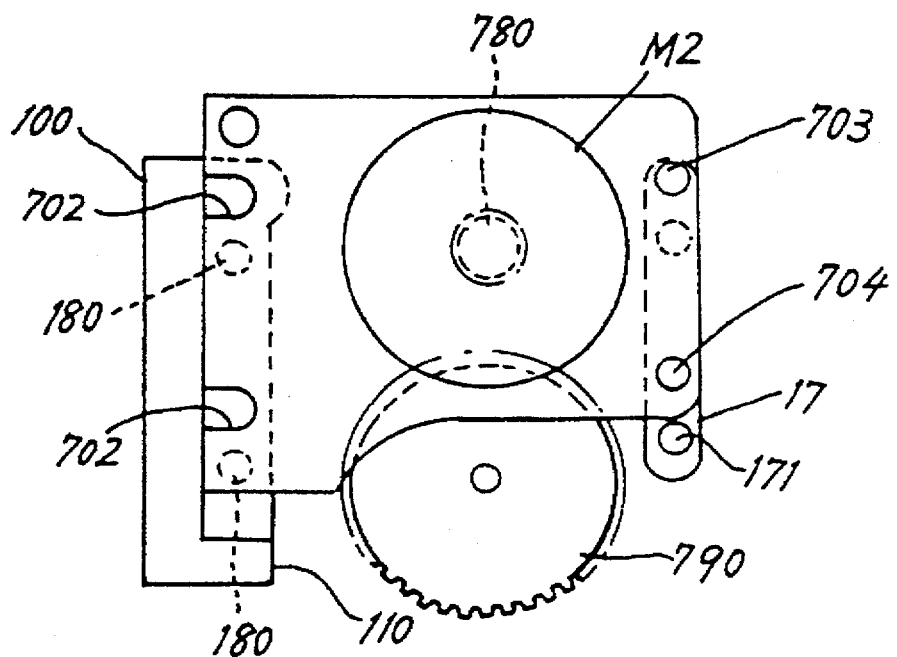
FIG. 11 is a plan view showing a motor before it is mounted in place.

Motor Mounting Structure (FIGS. 9 to 11)

The insertion-discharge side loading motor M2 is mounted on a plate 701, which is fastened to a support plate 18 provided inside a side wall 100 of the base chassis 1 and to a boss 17 provided on the chassis 1, with screws 19.

A gear 780 fixed to the motor shaft extends downward through the plate 701.

The plate 701 is formed with positioning cutouts 702, 702, 703 and screw holes 704, 704.

The support plate 18 and the boss 17 on the base chassis 1 are provided with projections 180, 180, 170 fittable respectively in the cutouts 702, 702, 703 of the plate 701 when the motor shaft gear 780 is in mesh with a gear 790 at an upstream end of the gear train 700. The plate 18 and the boss 17 have screw bores 181, 171 corresponding to the scew holes 704, 704.

Projecting from the side wall 100 of the base chassis 1 is an interference piece 110 which interferes with the plate 701 when the plate 701 is to be positioned for the projections 180, 180 and the screw bores 171, 181 immediately from thereabove.

The upper ends of the projections 180 are vertically spaced from the lower surface of the interference piece 110 by a distance greater than the thickness of the plate 701.

Accordingly, to fix the plate 701 carrying the loading motor M2 and the gear 780 to the base chassis 1, the plate 701 must be positioned as placed under the interference piece 110 sideways to clear the piece 110 as illustrated in FIG. 11, with the result that the motor gear 780 is brought into meshing engagement with the gear 790 sideways. This obviates damage to some teeth that would occur if the gear 780 is brought into striking contact with the gear 790 from above.

The motor mounting structure is used for mounting the other motors included in the present embodiment.

Figure 23:
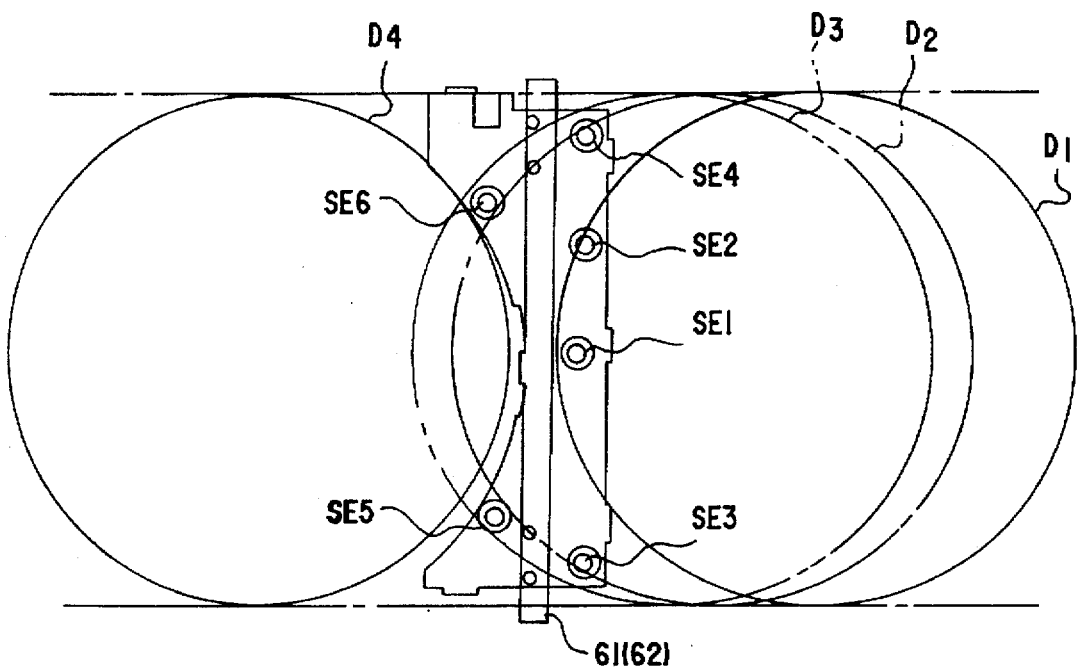
FIG. 23 is a view for illustrating an arrangement for detecting a 12-cm disc.
Figure 24:
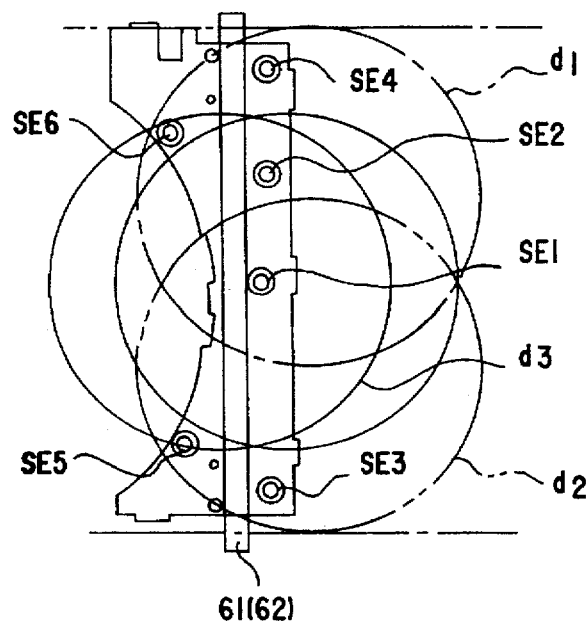
FIG. 24 is a view for illustrating an arrangement for detecting an 8-cm disc.

Detection of Disc (FIGS. 23 and 24)

With reference to FIG. 23, the disc insertion-discharge means 4 is provided with the six sensors SE1, SE2, SE3, SE4, SE5 and SE6 for detecting the size and passage of discs. Each of the sensors comprises a light-emitting element and a light-receiving element which are arranged on opposite sides of the path of movement of the disc and opposed to each other.

On the outer side of the rollers 61, 62, the first to fourth sensors SE1 to SE4 are arranged in a vertical row. On the inner side of the rollers 61, 62, the fifth sensor SE5 and sixth sensor SE6 are arranged. FIG. 24 is a diagram showing the position of the 8-cm disc relative to the sensors when the disc is inserted in error.

The first sensor SE1 is located at a position where the center of the 12-cm disc passes, the second sensor SE2 is located at a position slightly outward from the upper portion of the 8-cm disc d3 when the disc passes through the lower portion of path of movement as illustrated in FIG. 24, the third sensor SE3 is located at a position where the passage of the lower ends of discs is detected, and the fourth sensor SE4 is located at a position where the upper portion of the 12-cm disc is detected. The fifth sensor SE5 is positioned between the first sensor SE1 and the third sensor SE3, and the sixth sensor SE6 is positioned between the second sensor SE2 and the fourth sensor SE4, the fifth sensor SE5 and the sixth sensor SE6 being so positioned that when the 8-cm disc passes approximately through the midportion of the path of travel of the 12-cm disc, at least one of the fifth sensor SE5 and sixth sensor SE6 is capable of detecting the disc.

In the following description of operation, the sensors SE1 to SE6 become active on upon transmission of light.

Playing Side Delivery Device 6a (see FIGS. 2, 18 and 25 to 27)

Figure 25:
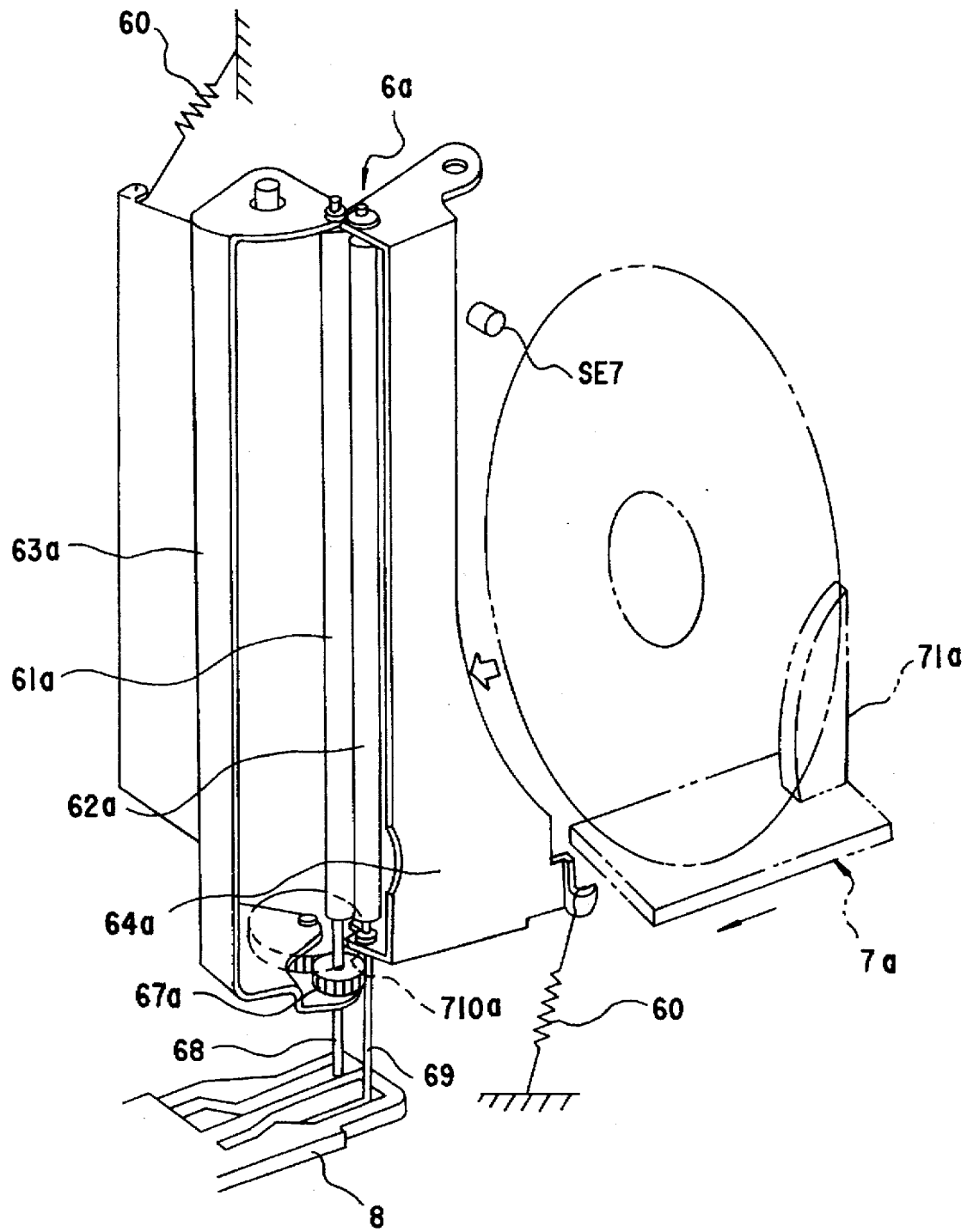
FIG. 25 is a perspective view of a delivery device included in playing means.
Figure 27:
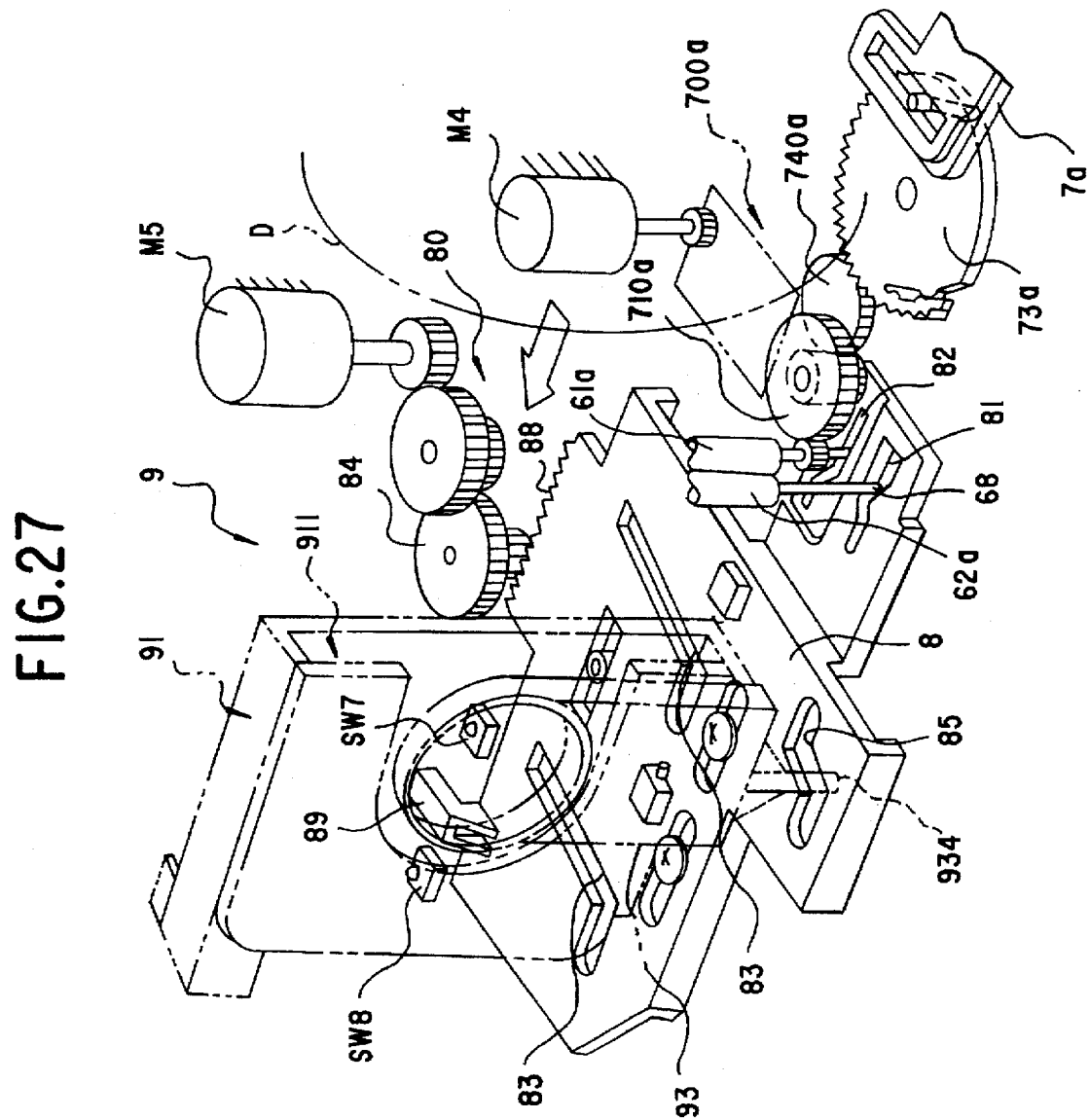
FIG. 27 is a perspective view of the playing means.

As seen in FIGS. 25 and 27, the playing side delivery device 6a is provided for the playing means 9 for delivering the disc from the magazine 3 to the playing means 9 or from the playing means 9 to the magazine 3.

Like the delivery device 6 for the disc insertion-discharge means 4 described above, the delivery device 6a comprises a kick-out member 7a slidable on the base chassis 1 for kicking out the disc from the magazine 3, a pair of transport rotatable rollers 61a, 62a for transporting the disc as held therebetween, playing side loading motor M4 for driving the kick-out member 7a and the rollers 61a via a gear train 700a, intermediate gear 740a disposed between the kick-out member 7a and the gear train 700a, control gear 73a, latch plate 750a attached to the underside of the intermediate gear 740a, etc.

As shown in FIG. 2, the switch SW6, which is adapted to detect the retracted position of the kick-out member 7a, is provided for the retracted limit position of the kick-out member 7a. The magazine rotating motor M3 remains de-energized unless the member 7a is detected by the switch, that is, unless it is recognized that the member 7a is in its retracted position and has not advanced into the magazine 3.

The kick-out member 7a has a pushing piece 71a, which functions in the same manner as the pushing piece 71 already described with reference to the disc insertion-discharge side delivery device. More specifically, when the pushing piece 71a has advanced into the slit 32 in the bottom of the magazine 3 to completely kick out the disc D into nipping engagement with the rollers 61a, 62a, the sensor SE7 (playing side disc sensor) stops the loading motor M4 for driving the kick-out member 7a, whereupon the pushing piece 71a remains in the slit 32, preventing the magazine 3 from rotating inadvertently during disc playing.

When the disc is to be delivered by one of the delivery device 6a and the device 6 for the means 4, the other device may be electrically so controlled that the pushing piece 71 or 71a of the kick-out member 7 or 7a of thereof is advanced into a bottom slit 32 of the magazine to an extent such as not to project the corresponding disc. The magazine 3 can then be prevented from inadvertently rotating during the delivery of the disc to damage the disc.

The difference between the playing side delivery device 6a and the insertion-discharge side delivery device 6 is as follows. Of the two rollers 61, 62 of the device 6 for the insertion-discharge means 4, the drive roller 61 remains immovable from its fixed position, while the other roller 62 only moves to releasably nip the disc, whereas as seen in FIG. 25, the rollers 61a, 62a of the playing side device 6a move toward or away from the path of delivery of the disc to releasably nip the disc.

The rollers 61a, 62a are rotatably supported at their upper and lower ends by two support members 63a, 64a, which are pivotally movably supported in a fixed position between the base chassis 1 and the disc upper portion guide member 5.

The roller 61a carries at its lower end a drive gear 67a meshing with a gear 710a at a downstream end of the gear train 700a, and revolves around the gear 710a with the pivotal movement of the support member 63a, with the gear 67a in mesh with the gear 710a.

The two roller support members 63a, 64a are biased by springs 60, 60, respectively, in such directions that the rollers 61a, 62a are pressed against each other.

The rollers 61a, 62a have shafts 68, 69 projecting from the center of their lower ends and fitting in cam grooves 82, 81, respectively, which are formed in a slide plate 8 close to the inner end thereof. The slide plate 8 is provided on the base chassis 1 and slidable on an extension of the path of sliding movement of the kick-out member 7a.

Figure 26A:
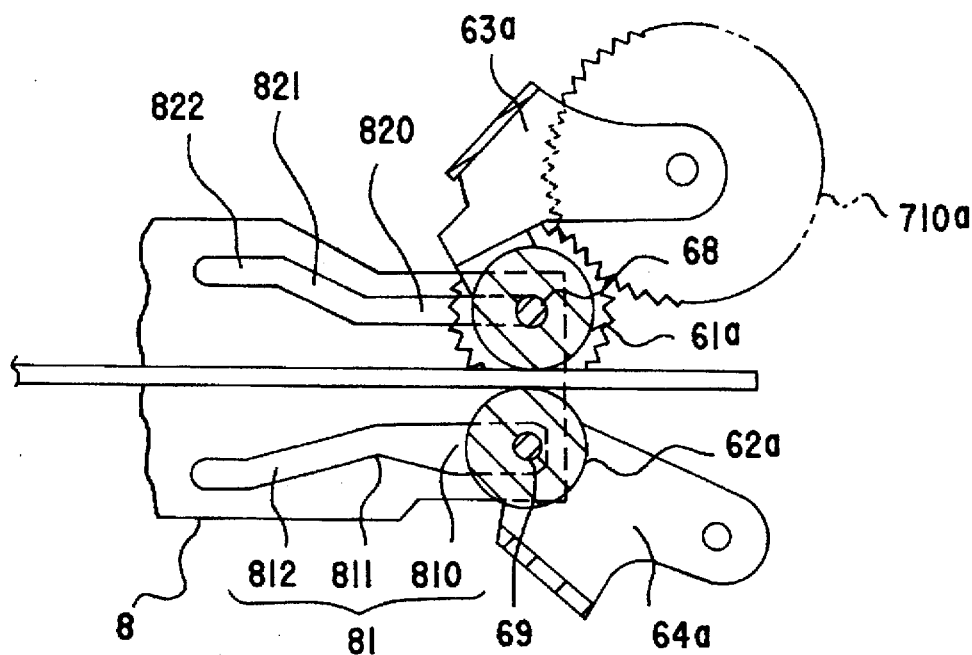
FIG. 26A is a plan view showing a disc while it is being transported by rollers of the delivery device of the playing means.
Figure 26B:
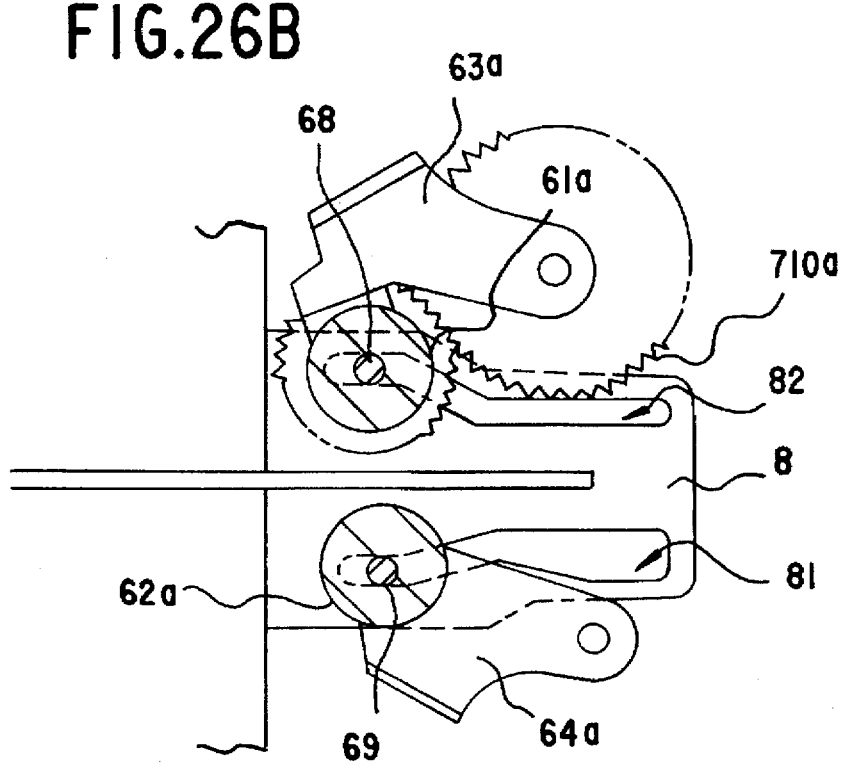
FIG. 26B is a plan view showing the disc as released from the rollers.

As shown in FIG. 26, the cam grooves 81, 82 in the slide plate 8 have,as arranged from the kick-out member 7a toward the playing means 9, parallel portions 810, 820 close to each other, outwardly slanting portions 811, 821 and parallel portions 812, 822, the portions of each groove being continuous with one another. When the slide plate 8 moves toward the kick-out member 7a, the rollers 61a, 62a are moved away from each other to release the disc. When the slide plate 8 moves away from the member 7a, the rollers 61a, 62a move toward each other to hold the disc therebetween.

With reference to FIG. 27, the slide plate 8 is further formed with head side opening-closing cam grooves 83, 83 and a clamp side opening-closing cam groove 85, and has a rack 88 along one side edge thereof in the direction of sliding movement.

The motor M5 for clamping the disc and also for moving the rollers toward or away from each other is coupled to a gear train 80, which includes at a downstream end thereof a gear 84 meshing with the rack 88.

Playing Means 9 (FIGS. 2 and 25 to 33)

Figure 30:
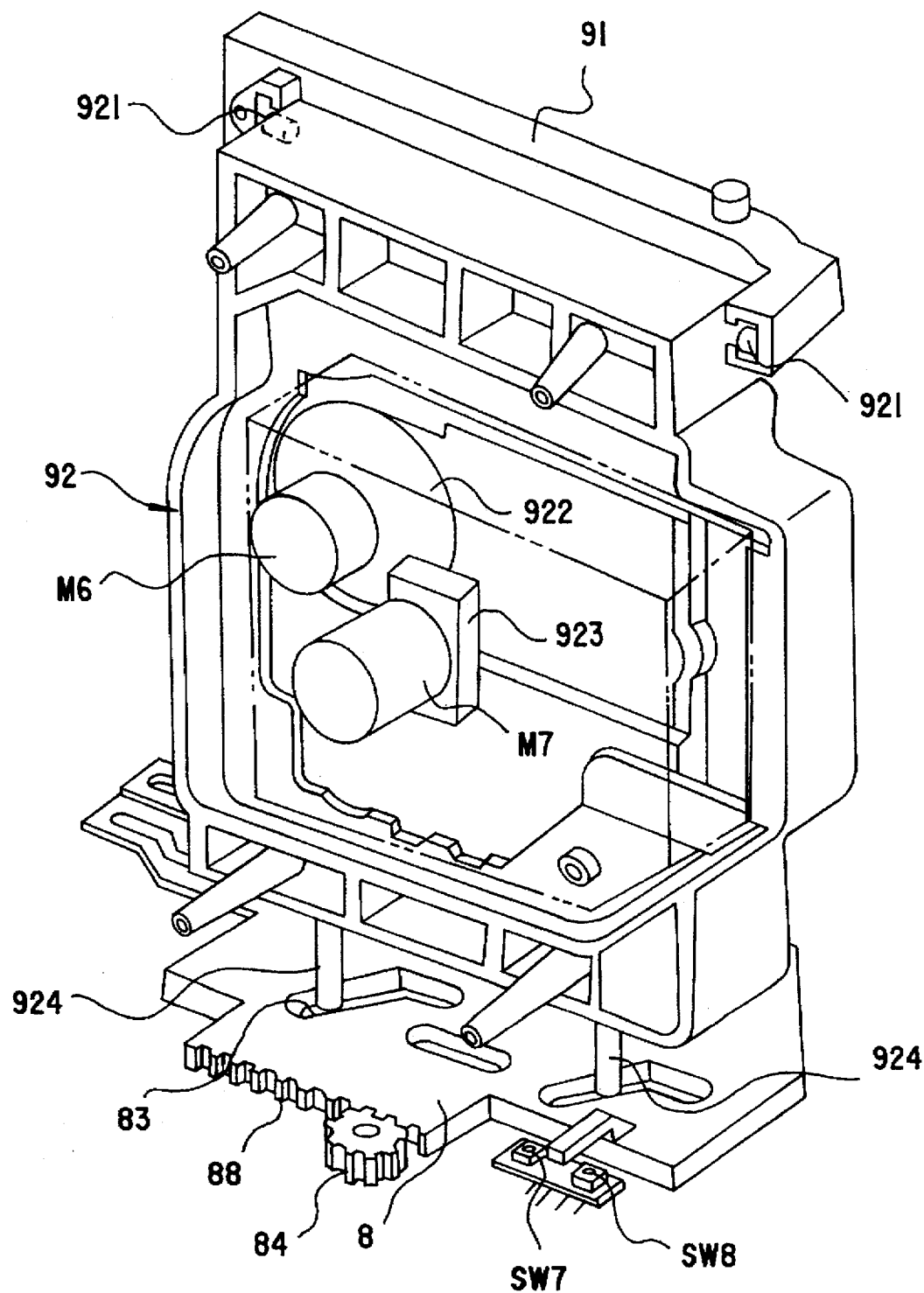
FIG. 30 is a perspective view showing the rear side of the head mount assembly.

With reference to FIGS. 27 and 30, the playing means 9 comprises a case 91 for containing the disc supplied from the magazine 3, and a head mount assembly 92 and a clamp 93 which are provided on the respective sides of the case 91 and movable toward each other for rotatably clamping the disc inside the case.

Figure 28:
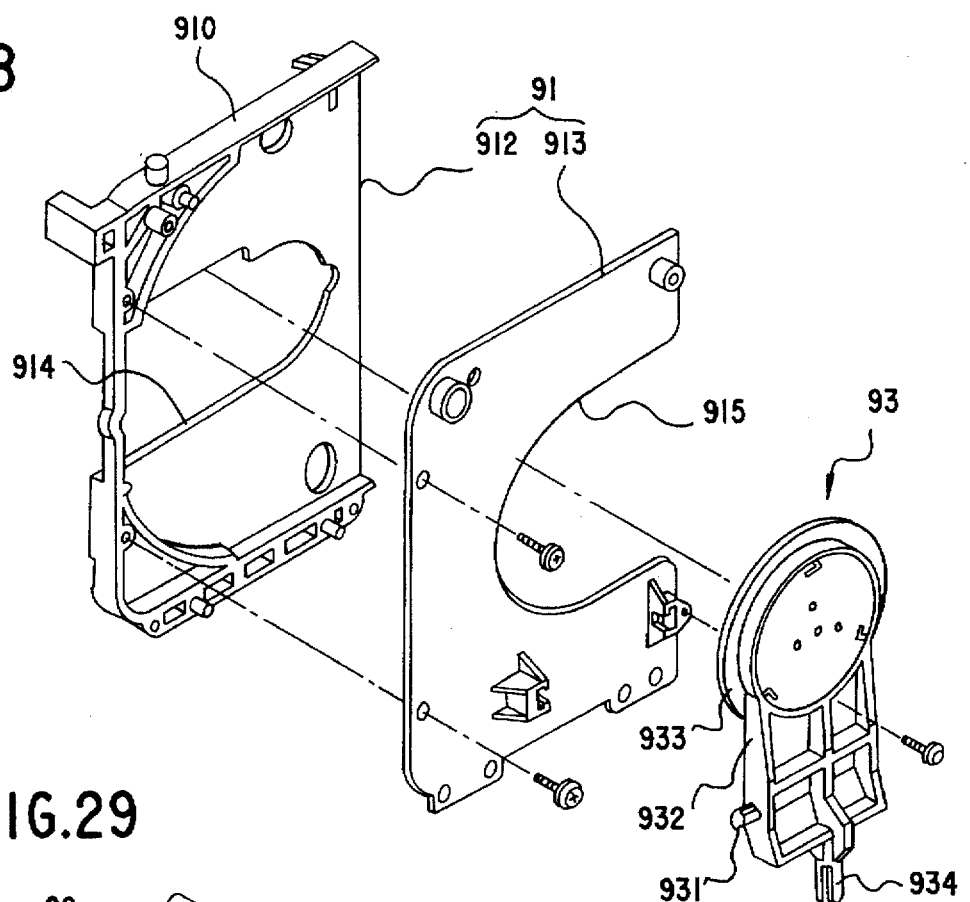
FIG. 28 is an exploded perspective view of a disc containing case and a clamp.
Figure 29:
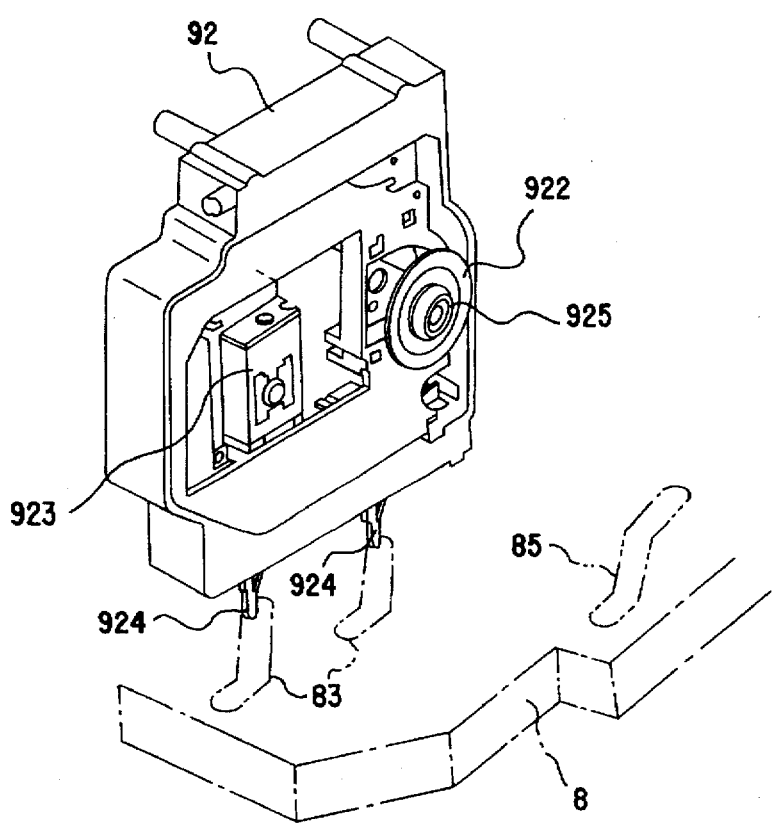
FIG. 29 is a perspective view of a head mount assembly.

As shown in FIG. 28, the disc containing case 91 comprises a plate member 912 having a peripheral plate 910 along three sides thereof other than a disc inlet side, and a plate member 913 joined to the plate member 910, and has a vertically elongated flat form with an opening formed in the disc inlet side.

The case 91 has its opening directed toward the nip of the rollers 61a, 62a and positioned close to the rollers, is located above the path of sliding movement of the slide plate 8 and is fixed to the base chassis 1.

When the disc is contained in the case 91, the disc partly projects beyond the opening toward the magazine 3, with a portion thereof fitting in the magazine 3.

The interior of the case 91 has a small allowance above and below the disc and in a direction orthogonal to the path of advance of the disc.

The plate members 912, 913 of the case are formed with cutouts 914,915 for permitting a turntable 922 on the head mount assembly 92 and a disk 933 of the clamp 93 to enter the case therethrough, respectively.

As shown in FIG. 30, the head mount assembly 92 comprises the turntable 922 for drivingly rotating the disc, disc rotating motor M6 for driving the turntable 922, head mount 923 having a reading head, and head sliding motor M7 for horizontally driving the head mount 923 by means of a rack and a pinion.

The head mount assembly 92 has pivots 921, 921 projecting from opposite sides of its upper end and rotatably supported by the upper portion of the case 91.

The head mount assembly 92 has two leg pins 924, 924 projecting from the lower end thereof and slidably fitting in the head side opening-closing cam grooves 83, 83 formed in the slider plate 8.

As shown in FIG. 28, the clamp 93 comprises a frame 932 pivotably supported by pivots 931, 931 on the lower portion of the disc containing case 91, and the disk 933 incorporating a magnet as opposed to the turntable 922 and loosely fitted in the frame 932.

The frame 932 has a leg pin 934 projecting from its lower end and slidably fitting in the clamp opening-closing cam groove 85 formed in the slide plate 8.

As seen in FIG. 27, the cam groove 85 and the cam grooves 83, 83 pivotally move the head mount assembly 92 and the clamp 93 about the pivots 921 and 931 toward each other when the slide plate 8 slidingly moves toward the magazine 3, or move the assembly 92 and the clamp 93 away from each other when the slide plate 8 moves away from the magazine 3. Thus, the cam grooves 83, 83, 85 are inclined with respect to the direction of sliding movement of the slide plate 8 so as to effect these movements. However, the clamp opening-closing groove 85 is shaped so as to effect the following movement. The clamp 93 pivotally moves in a direction to clamp the disc and reaches a position where the disc is clamped between the clamp and the turntable 922 at the center of internal width of the case 91 (state shown in FIG. 32). The clamp 93 thereafter slightly pivotally moves toward the right for the disc 933 to permit the rotation of the turn-table while being attracted to the turntable 922.

Figure 31:
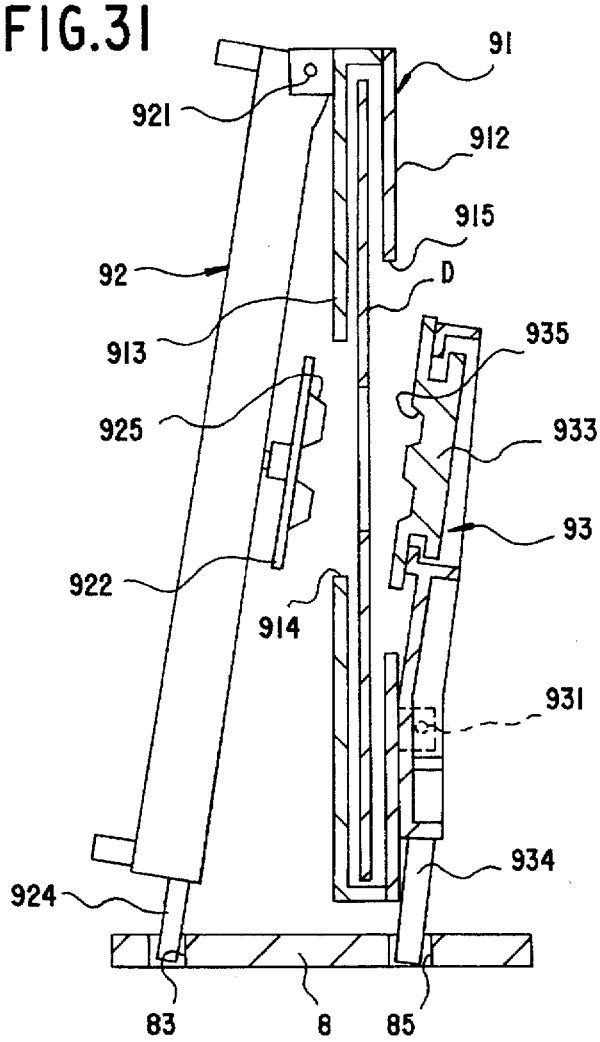
FIG. 31 is a sectional view showing the head mount assembly and the clamp before the disc is clamped.
Figure 32:
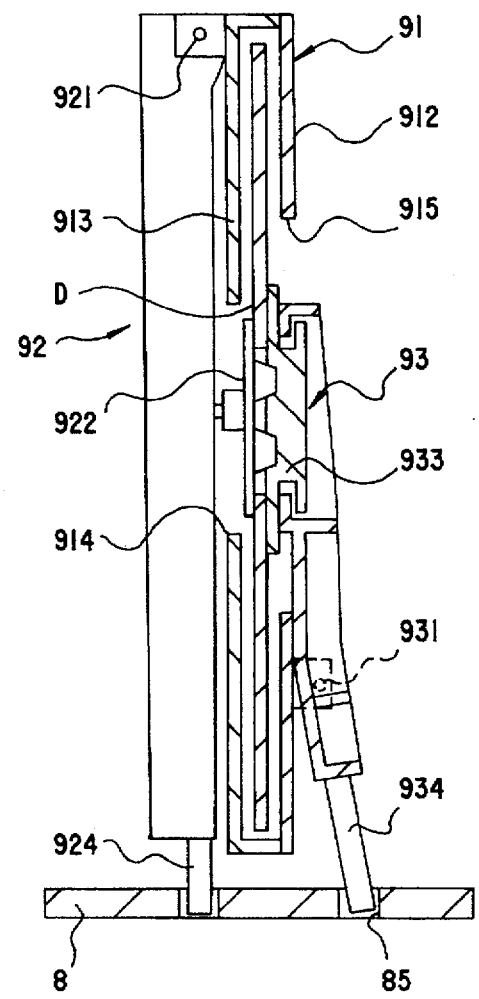
FIG. 32 is a sectional view showing the disc as held by the mount assembly and the clamp.

With reference to FIG. 31, the turntable 922 is centrally provided with a conical projection 925 fittable in the disc hole, and the disk 933 of the clamp 93 is formed with a conical recess 935 for the projection 925 to fit in. The turntable 922 and the disk 933 move toward the disc accommodated in the case 91 as stated above to fit the conical projection 925 into the conical recess 935. At this time, the hole defining edge of the disc slide along the conical projection 925 of the turntable 922, and the disc is pressed by the turntable 922, whereby the turntable 922 and the disc can be reliably positioned concentrically. In this state, the clamp is slightly rotated rightward as stated above to free the disk 933 from the pressure, whereas the disk 933 remains held to the turntable 922 without shifting the center of the disc. Furthermore, the disc D can be clamped while being held out of contact with the inner surface of the case 91.

The operation to play the disc D as clamped in position is known and therefore will not be described.

The rollers 61a, 62a are opened or closed, that is, moved toward or away from each other, and the disc is clamped by the turntable 922 and the clamp 93 by the cam grooves 83, 83, 85 and the roller opening-closing cam grooves 81, 82 in the following timing relation. The rollers 61a, 62a deliver the disc D to the case 91, and the disc is completely clamped by the turntable 922 and the clamp 93, whereupon the rollers 61a, 62a are moved away from each other to relieve the disc of the pressure. When the disc D is to be returned from the playing means 9 to the magazine 3 after playing, the rollers 61a, 62a are moved toward each other to hold the disc, and the disc D is thereafter released from the turntable 922 and the clamp 93. Thus, the disc is held between the rollers 61a, 62a or between the turntable 922 and the clamp 93 always when to be delivered. The disc can therefore be delivered reliably even if the playing device should be inclined as by being lifted during the delivery.

The rollers 61a, 62a are moved toward or away from each other, and the disc is clamped by the turntable 922 and the clamp 93 and released therefrom, by the common slide plate 8 as described above. This ensures reliable trouble-free operation that unaffecting by timing differences.

Although the disc is played as positioned between the rollers 61a, 62a of the delivery device 6a, the rollers are out of contact with the disc and away from the path of delivery of the disc at this time, so that the disc is freely rotatable.

As shown in FIG. 27, the switch SW7 (clamping completion switch) and the switch SW8 (unclamping switch) are arranged along the path of movement of the slide plate 8.

When the slide plate 8 advances toward the magazine 3, a projecting piece 89 on the plate 8 is detected by the clamping completion switch SW7 to stop the clamping motor M5 until the disc is completely clamped.

When the slide plate 8 retracts, the projecting piece 89 is detected by the unclamping switch SW8 to stop the clamping motor M5 until the disc is released from the clamp.

Operation of Sensor SE7

Figure 33:
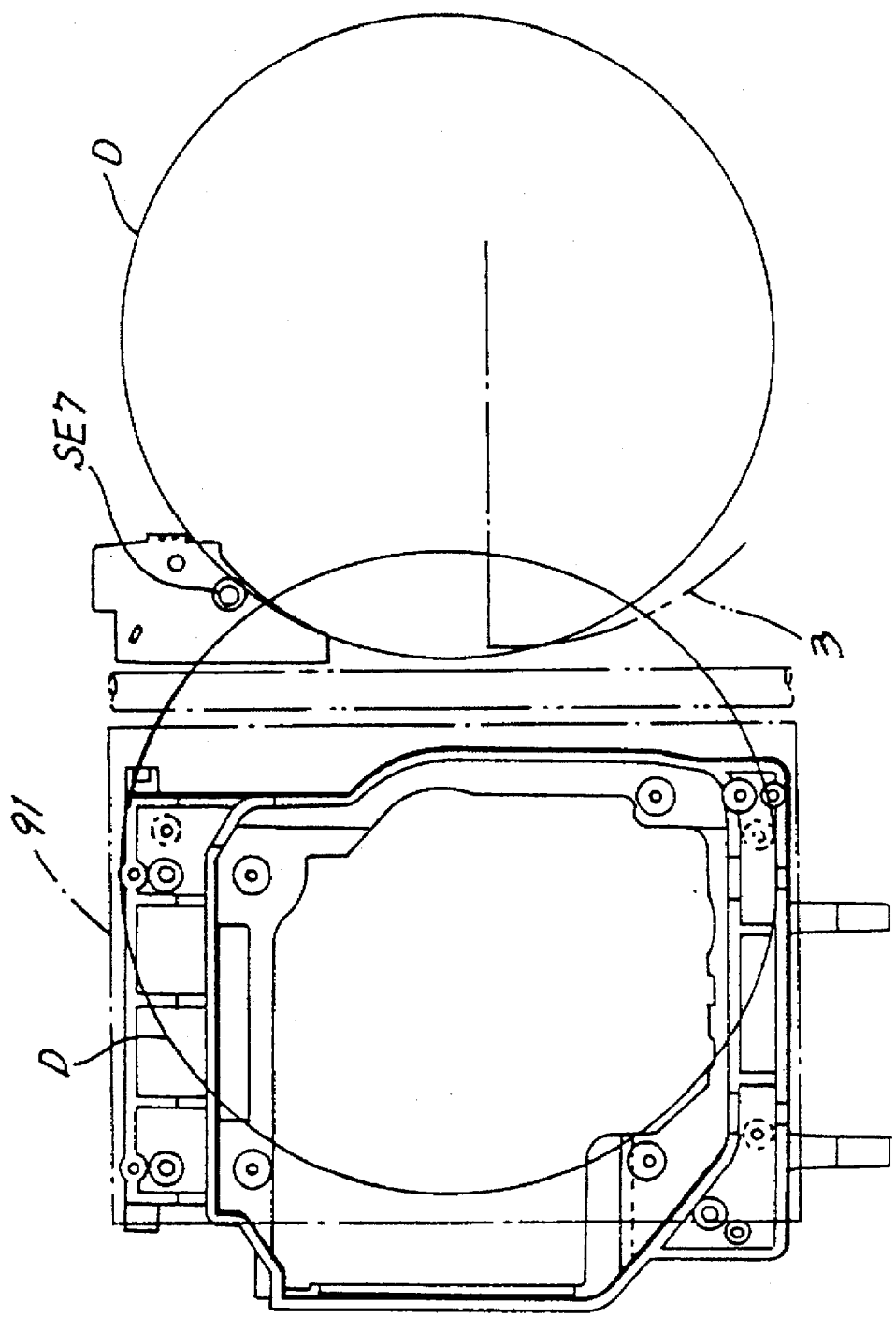
FIG. 33 is a diagram for illustrating a disc sensor in operation for the playing means.

As shown in FIG. 33, the seventh sensor SE7, like those provided for the disc insertion-discharge means, is disposed close to the rollers 61a, 62a of the delivery device 6a on the inner side of the. rollers.

The seventh sensor SE7 is disposed in a position where the passage of disc D between the rollers 61a, 62a can be detected and which is outward from the disc as brought to the inner portion of the case 91.

When the disc D is to be played, the seventh sensor SE7 detects the passage of the disc D, i.e., completion of transport of the disc to the playing position. If otherwise, the operation to be performed next is not initiated.

Further when the disc D is returned from the playing position to the magazine 3, the seventh sensor SE7 detects the passage of the disc D, i.e., completion of accommodation of the disc in the magazine 3. If otherwise, the subsequent operation is not started.

As previously described, the disc is played as partly positioned in the magazine 3. The present playing device can therefore be made smaller than those wherein the disc is played as completely brought out of the magazine.

Data is recorded on only one side of the disc, so that if the disc is accommodated in the magazine 3 with the front side thereof facing toward the reverse direction, the signal reading head is unable to read TOC (Table of Contents). If the disc is loaded onto the playing means 9 with the wrong side facing the head, the disc is detected as being unreadable, whereupon the disc is returned to the magazine 3.

The disc returned is transported to the position of the disc insertion-discharge means 4 by rotating the magazine 3, whereupon the disc is discharged. This can be accomplished under the control of the control system to be described later. In the case where a plurality of discs are successively played, the control system can be caused to store the position of the reversely oriented disc D, such that when the discs have been all played, the reverse disc D is transported to the discharge means 4 for discharge to the outside.

Front Panel and Manipulation Buttons (FIGS. 2 and 12)

With reference to FIG. 12, the front panel 2 has the disc insertion-discharge slit 21 in the center, display 28 at the left upper portion, see-through window 29 at the right upper portion, ON-OFF button 22, PLAY button 23, STOP button 24, open/close button 25 and ten number entry keys 26 in the form of ten key buttons bearing the numbers of 0 to 9, respectively.

The display 28 shows various indications in accordance with different modes of the playing device. The see-through window 29 is used for checking the discs in the magazine 3 for the state of accommodation and rotation therethrough. With an illumination lamp (not shown) provided inside the device, the discs shine in rainbow colors to produce an esthetic effect. Control System (see FIGS. 34 to 59)

Figure 34:
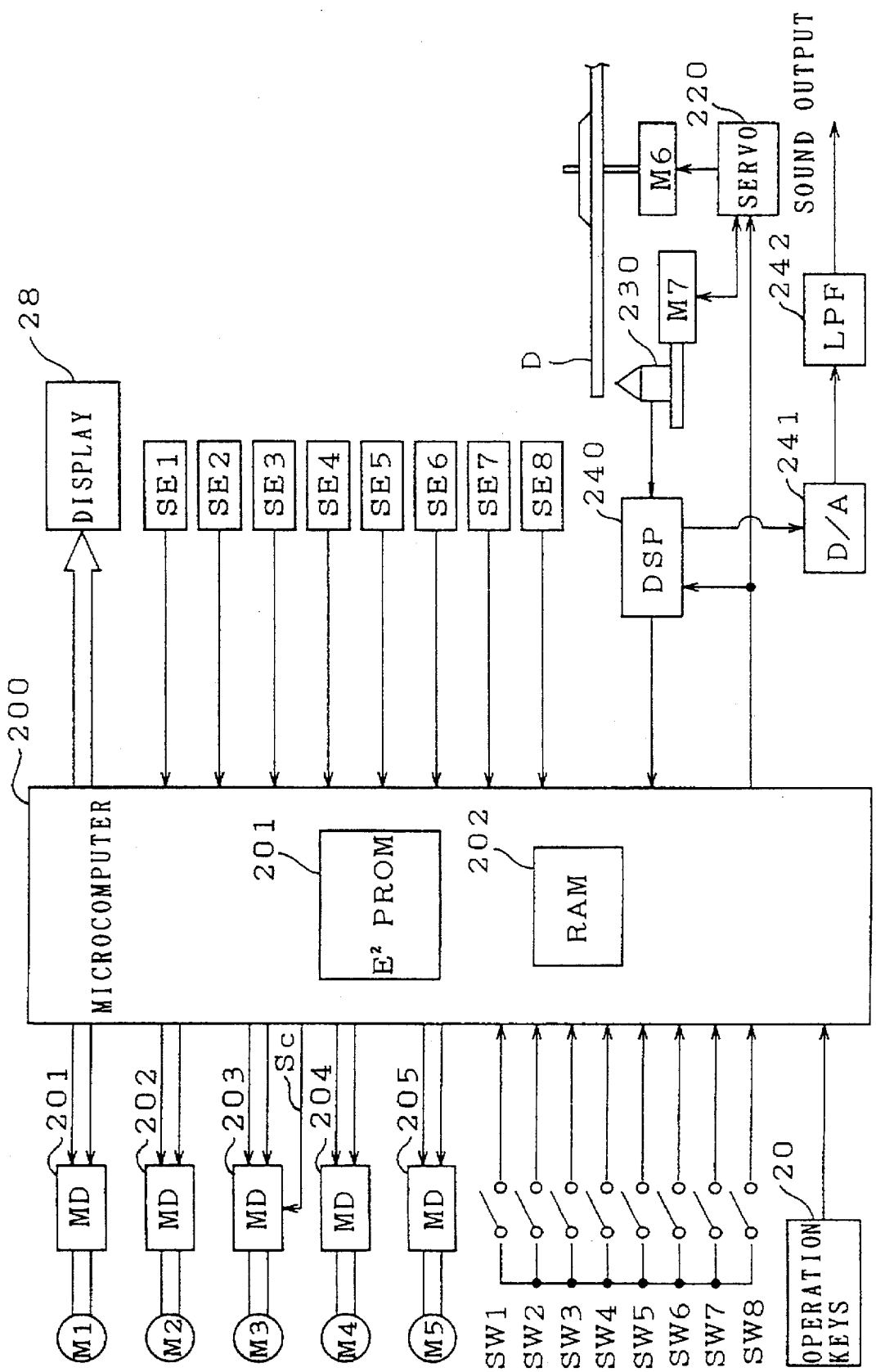
FIG. 34 is a block diagram showing the construction of a control system.

FIG. 34 shows the construction of a control system for driving and controlling the mechanisms of the disc playing device described.

The eight switches SW1 to SW8 and eight sensors SE1 to SE8 are connected to input ports of a microprocessor 200. The microprocessor 200 has incorporated therein a nonvolatile memory 201 comprising an E2PROM and a volatile memory 202 comprising a RAM. The control program to be described later is stored in the nonvolatile memory 201.

The microprocessor 200 is provided with output ports having connected thereto the door opening-closing motor M1, insertion-discharge side loading motor M2, magazine rotating motor M3, playing side loading motor M4 and clamping motor M5 by way of motor drive circuits 201 to 205, respectively. The microprocessor 200 feeds to each motor drive circuit rotation control signals with respect to forward and reverse two directions, whereby the rotation of the motor is controlled. Further fed by the microprocessor 200 to the drive circuit 203 for the magazine rotating motor M3 is a control signal Sc for changing the rotational speed of the motor to a high speed or low speed alternatively.

The disc rotating motor M6 and the head slide motor M7 are controlled by a servo circuit 220 for rotation. The signal read by a signal reading head 230 is fed to a digital signal processor 240 and thereby converted to a digital sound signal, which is further converted to an analog sound signal by a D/A converter 241. The signal is output to outside via a low-pass filter 242. These signal reproduction circuits are well-known in the prior art, so that no detailed description will be given of the construction or operation thereof.

The foregoing group 20 of various operation keys and the display 28 are connected to the microprocessor 200. Modes are set by manipulating the group of keys 20, and data as to the mode set is shown on the display 28.

A table is prepared in the nonvolatile memory 201 of the microprocessor 200 for recording therein the presence or absence ("1" or "0") of the disc for each of the disc numbers (1 to 24) of the magazine as shown in FIG. 35. Prepared in the volatile memory 202 are a storage area for the disc number A of the magazine opposed to the disc insertion-discharge means 4, and a storage area for the disc number B of the specified disc to be loaded or ejected as shown in FIG. 36. The disc number A is calculated by the sensor switch SW5 and the count sensor SE8.

Figure 37:
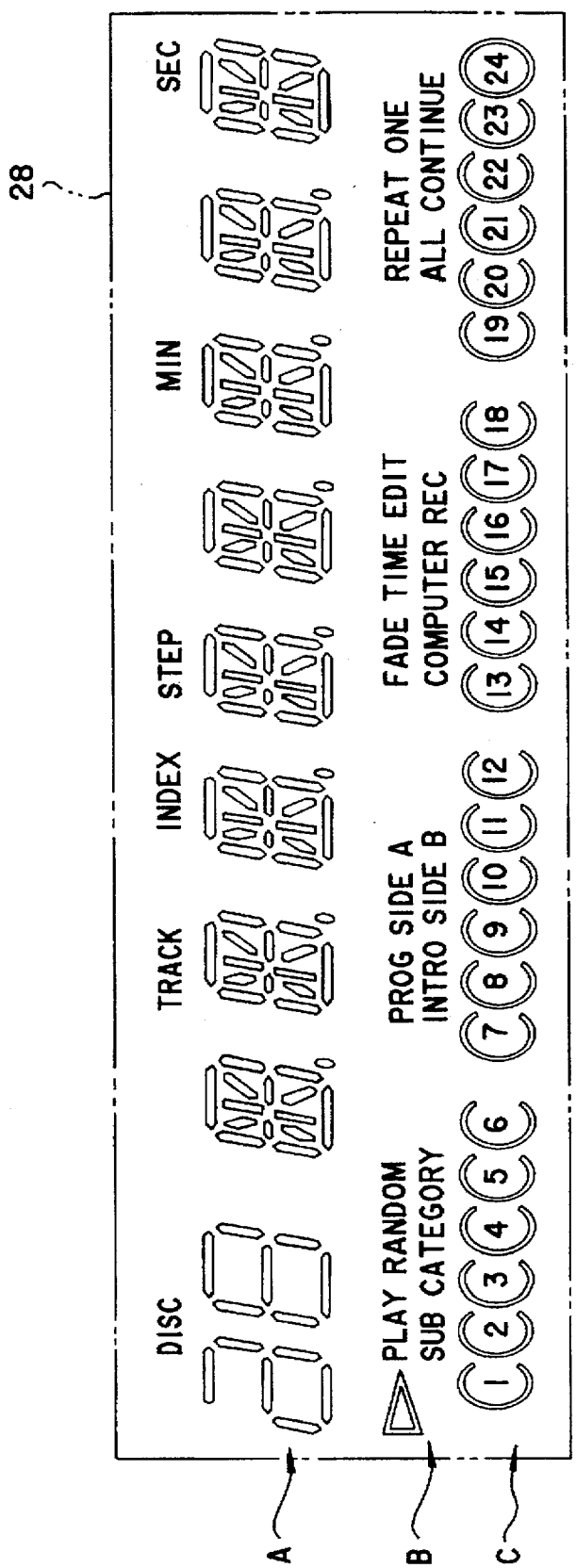
FIG. 37 is a front view showing an arrangement on the screen of a display.

FIG. 37 shows an arrangement on the screen of the display 28. Provided in the upper row is an indicator A of data relating to the disc to be handled such as disc number and track number, in the middle row is an indicator B relating to operation modes such as play mode, random play mode and the like, and in the lower row is a disc calendar indicator C comprising circular-arc disc contours surrounding the respective disc numbers No. 1 to No. 24. The disc number and the disc contour of the calender indicator C go on, flicker or go off to thereby indicate the presence or absence of the disc concerned, or the state of the disc as loaded or ejected.

In response to the manipulation of keys, the disc playing device operates in the manner to be described below.

1. Power On

The ON-OFF button 22 shown in FIG. 12 is depressed, whereby the power supply is turned on.

The magazine rotating motor M3 is started, rotating the magazine 3 until the holding groove 31, No. 1 is brought to the position of the disc insertion-discharge means 4.

2. Playing Disc

There are two kinds of manipulation procedures, i.e., procedure (1) and procedure (2).

Playing procedure (1)

The ten-key arrangement 26 is manipulated to select the desired disc. For example, the keys 26, "1" and "4" are pressed to select the disc No. 14.

Next, the PLAY button 23 is pressed, whereupon the magazine rotating motor M3 rotates to transport the disc of the specified number to the playing means 9.

By the operation previously described in "Playing Means," the disc is delivered from the magazine 3 to the playing means 9 and played. On completion of playing, the disc is accommodated in the original groove of the magazine 3.

The direction of revolution of the disc is controlled so as to minimize the needed angle of rotation. Detection of the direction of rotation will be described later.

When the disc is to be revolved, the switches SW4 and SW6 detect the pushing pieces 71, 71a of kick-out members 7, 7a of both the insertion-discharge side delivery device 6 and the playing side delivery device 6a, as positioned in their retracted positions. If otherwise, the magazine rotating motor M3 remains unenergized as previously described. This eliminates the likelihood of the magazine 3 rotating with the pushing pieces 71, 7a fitting in bottom slits 32 of the magazine 3 to break the mechanism concerned.

Playing procedure (2)

The PLAY button 23 is pressed without specifying a particular disc number.

The disc number shown on the display 28 at this time is the number of the disc which was handled, for example, for playing or accommodation immediately before the current playing procedure. The magazine 3 rotates until the disc number indicated on the display 28 is positioned at the playing means 9, and the disc is played.

3. Insertion and Discharge of Disc

There are two kinds of manipulation procedures (1) and (2).

Insertion-discharge procedure (1)

The desired disc number is specified by the ten-key arrangement 26, and the open/close button 25 is pressed.

The magazine 3 rotates to position the disc holding groove 31 of the specified number as opposed to the disc insertion-discharge means 4.

When the disc is present in the groove 31 of specified number, the door opening-closing motor M1 operates to open the rotatable door 41, and the insertion-discharge side loading motor M2 operates the delivery device 6 to discharge the disc concerned.

In the absence of the disc in the groove 31 of specified number, the motor M1 operates to open the door 41 in preparation of insertion of disc.

Insertion-discharge procedure (2)

The open/close button 25 is pressed without specifying a particular disc number.

The magazine 3 rotates to position the groove 31 of the number shown on the display 28 as opposed to the insertion-discharge means 4, and the door 41 is opened.

When the disc D is present in the groove 31 of the number shown on the display, the disc D is discharged. In the absence of disc D, the door prepares for the insertion of disc.

4. Interruption of Playing

When the STOP button 24 is pressed, playing of disc is discontinued, and the magazine 3 is returned to the original position.

To assure safely in the present device during the foregoing operation, the following measures are taken using electric circuits (some measures are previously described).

1. In Connection with Magazine (1) The magazine 3 does not rotate unless the disc D moves past the sensor recognizing the transport of disc to the magazine 3, and further unless closing of the door 41 is detected.

(2) The magazine 3 does not rotate unless inward withdrawal of the kick-out members 7, 7a from slits 32 of the magazine 3 is detected.

2. In Connection with Door (1) The rotatable door 41 closes after the disc has moved past the sensor recognizing transport of the disc to the magazine 3.

(2) The door 41 opens after the magazine 3 has stopped rotating, and remains closed during the rotation of the magazine 3.

3. In Connection with Disc Discharge (1) When the disc in the playing means 9 is to be accommodated in the magazine 3 by the STOP button 24 or the open/close button 25, the magazine is likely to be filled up by accommodating the disc. If another disc is to be inserted into the insertion-discharge means 4, the fixedly positioned roller 61 for the delivery means 6 rotates in the discharge direction to automatically discharge the disc.

Incidentally, the disc can be prevented from being drawn in by stopping the rotation of the roller 61.

(2) When the disc is loaded onto the playing means 9 with the front side facing toward the wrong direction, this disc is discharged from the magazine 3 upon recognizing that TOC is not readable.

The nonvolatile memory 201 of the microprocessor 200 has stored therein a program for executing the foregoing operations. The functions programmed will be described with reference to the flow charts of FIGS. 38 to 59. In the following description, the state of the sensors SE1 to SE8 permitting passage of light will be referred to as "on," and that of the sensors blocking the light as "off." The number of a particular disk is identical with the nurser assigned to the groove 31 for holding that disc. For example, the term "disc No. 5" refers to the disc accommodated in the disc holding groove 31, No. 5.

Disc Loading (see FIGS. 38 to 42)

When a disc is to be loaded onto the position of desired disc number of the magazine 3, the ten-key arrangement 26 is manipulated with the power supply turned on by the ON-OFF button 22 to enter the desired disc number, followed by depression of the open/close button 25. The disc holding groove 31 corresponding to the desired disc number is moved to the position shown in the disc insertion-discharge means 4. This movement will be described with reference to the flow charts of FIGS. 38 to 42.

Upon the microprocessor 200 detecting the depression of the open/close button (eject/load key) 25, the disc number at the disc inlet is stored in the storage area A of the volatile memory 202, and the disc number specified by the key arrangement 26 is stored in the storage area B (step S2).

Next the value of A is compared with the value of B (S3, S4). When A=B, step S23 follows to open the rotatable door 41. If A<B, an inquiry is made as to whether the value (B−A) is greater than 12 (S5). When the answer is affirmative, the magazine is set for leftward rotation (S7). If otherwise, the magazine is set for rightward rotation (S8). When A>B, an inquiry is made as to whether the value (A−B) is greater than 12 (S6). If the answer is negative, the magazine is set for leftward rotation (S9). If otherwise, the magazine is set for rightward rotation (S10).

In the above procedure, the direction of rotation of the magazine 3 is determined based on whether the difference between A and B is less than 12 in order to rotate the magazine 3 in the direction in which the amount of rotation is smaller when bringing the position of the specified disc number to the disc inlet, because a half turn of the magazine 3, which is adapted to accommodate 24 discs, corresponds to the magazine portion for holding 12 discs.

Next, an inquiry is made as to whether the amount of movement of the position of specified disc number to the position opposed to the disc inlet corresponds to one pitch of disc holding grooves 31 of the magazine 3 (S11). When the answer is "NO," the magazine is driven at a high speed by the magazine rotating motor M3 (S12). If the answer is "YES," it is driven at a low speed (S13).

An inquiry is thereafter made as to whether an ON signal input is given by the magazine rotation count sensor SE8 (S14). When the answer is "YES," an inquiry is made as to whether the direction of rotation determined in the foregoing steps S7 to S10 is rightward (S15). If it is rightward, the value A is incremented by 1 (S16). If it is leftward, the value A is decremented by 1 (S17). When the value A is to be incremented, the value next to 24 is 1. When it is to be decremented, the value next to 1 is 24.

When A and B are found to be equal on comparison (S18), a flag "1" is set which indicates that the position of the disc holding groove 31 corresponding to the specified disc number has shifted to the position of the disc insertion-discharge means 4 (S19), whereupon the magazine 3 is stopped (S20). On the other hand, if A and B are found unequal, an inquiry is made as to whether the difference there-between is 1 (S21). If the answer is "YES," the magazine 3 in rotation is slowed down (S22), followed by step S14 again. If the answer is "NO," the sequence returns to step S14 without changing the speed of rotation of the magazine 3.

In the process of foregoing sequence in which the groove 31 of the specified disc number moves to the position one groove pitch before the position opposed to the disc inlet, a rapid movement is effected by the high-speed rotation of the magazine 3, and the desired groove 31 is accurately positioned by the low-speed rotation of the magazine 3 for the subsequent one-pitch movement.

Figure 40:
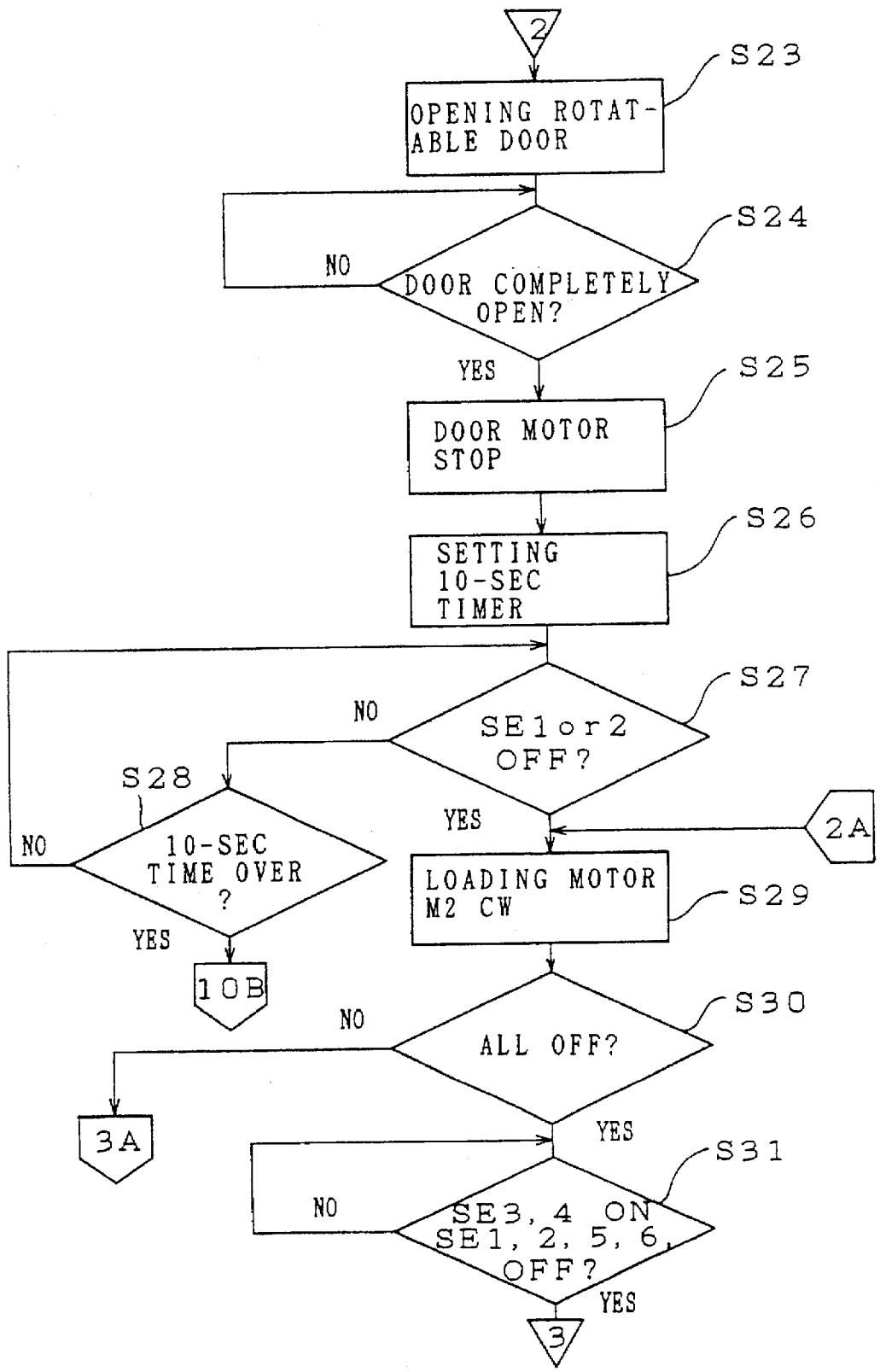
FIG. 40 is a flow chart of a procedure of opening the rotatable door to detecting passage of the 12-cm disc for disc loading.

The above flag as set to "1" is thereafter recognized, whereupon the door opening-closing motor M1 is driven in the door opening direction in step S23 of FIG. 40. The rotatable door fully opened is detected by a signal from the switch SW2 (S24), whereupon the motor M is stopped (S25).

In this stage, the user can place the disc into the disc insertion-discharge means 4.

Next, the microprocessor 200 sets a 10-second timer and inquires whether the first sensor SE1 or second sensor SE2 has become off, i.e., whether insertion of the disc has been started (S27). The 10-second timer is set to ensure that the processor will check whether the disc has passed.

When the inquiry is answered in the negative, whether the 10-second period is over is inquired (S28). When the answer to step S28 is "NO," the sequence returns to step S27. When the time is over, this is interpreted as indicating that the disc is left uninserted, and step S120 of FIG. 51 follows to close the door 41.

With further insertion of the disc between the rollers 61, 62 from the position D1 of FIG. 23, the inquiry of step S27 is answered in the affirmative, whereupon the loading motor M2 on the insertion-discharge side is rotated clockwise, i.e., in the direction of loading of the disc into the magazine 3 (S29).

An inquiry is thereafter made as to whether all the first to sixth sensors SE1 to SE6 have become off (S30). If any of the sensors is on, this is interpreted as indicating a disc insertion error, and step S32 of FIG. 41 to be described below follows.

With the advance of the disc to the position D2 of FIG. 23 by the operation of the rollers 61, 62, step S30 is answered in the affirmative. The sensors are checked as to whether the third and fourth SE3, SE4 are on and the first, second, fifth and sixth SE1, SE2, SE5, SE6 are off (S31). Advance of the disc to the position D3 of FIG. 23 gives the answer "YES" to the inquiry of step S31.

Figure 41:
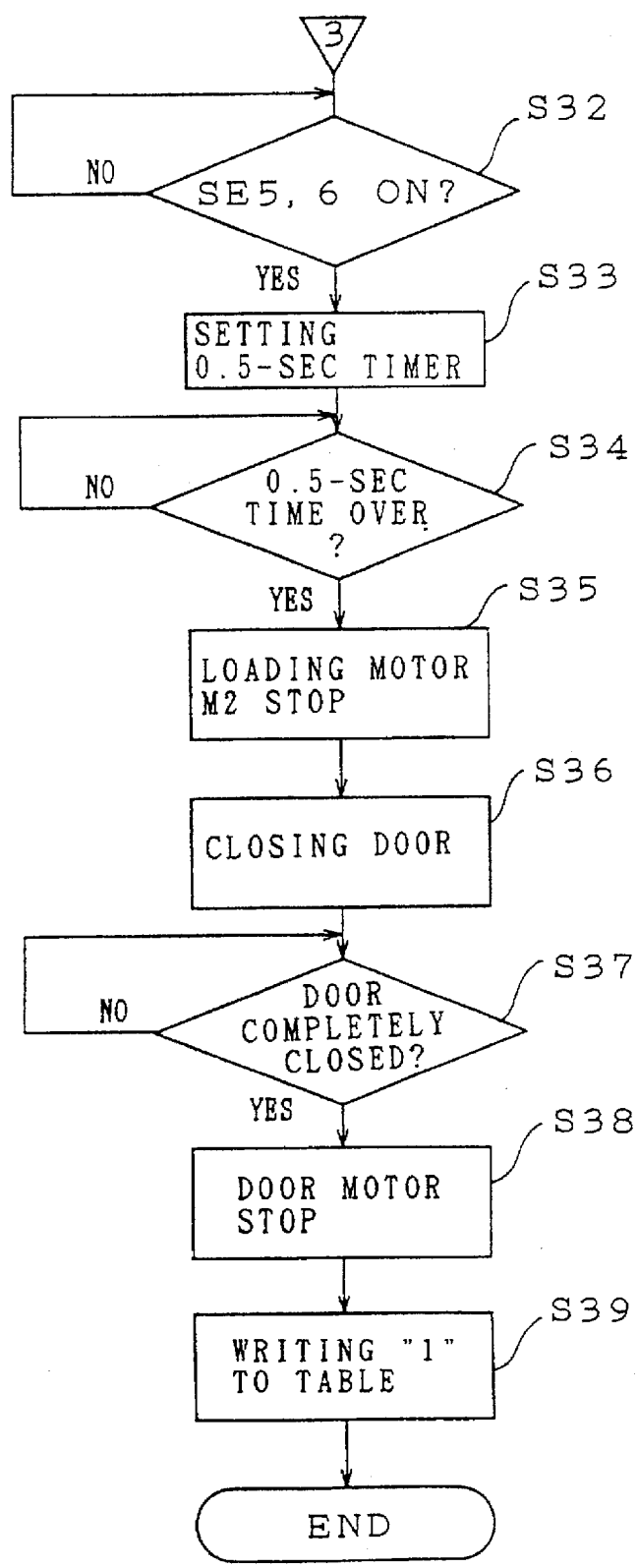
FIG. 41 is a flow chart of a procedure ending with closing of the door in disc loading.
Figure 42:
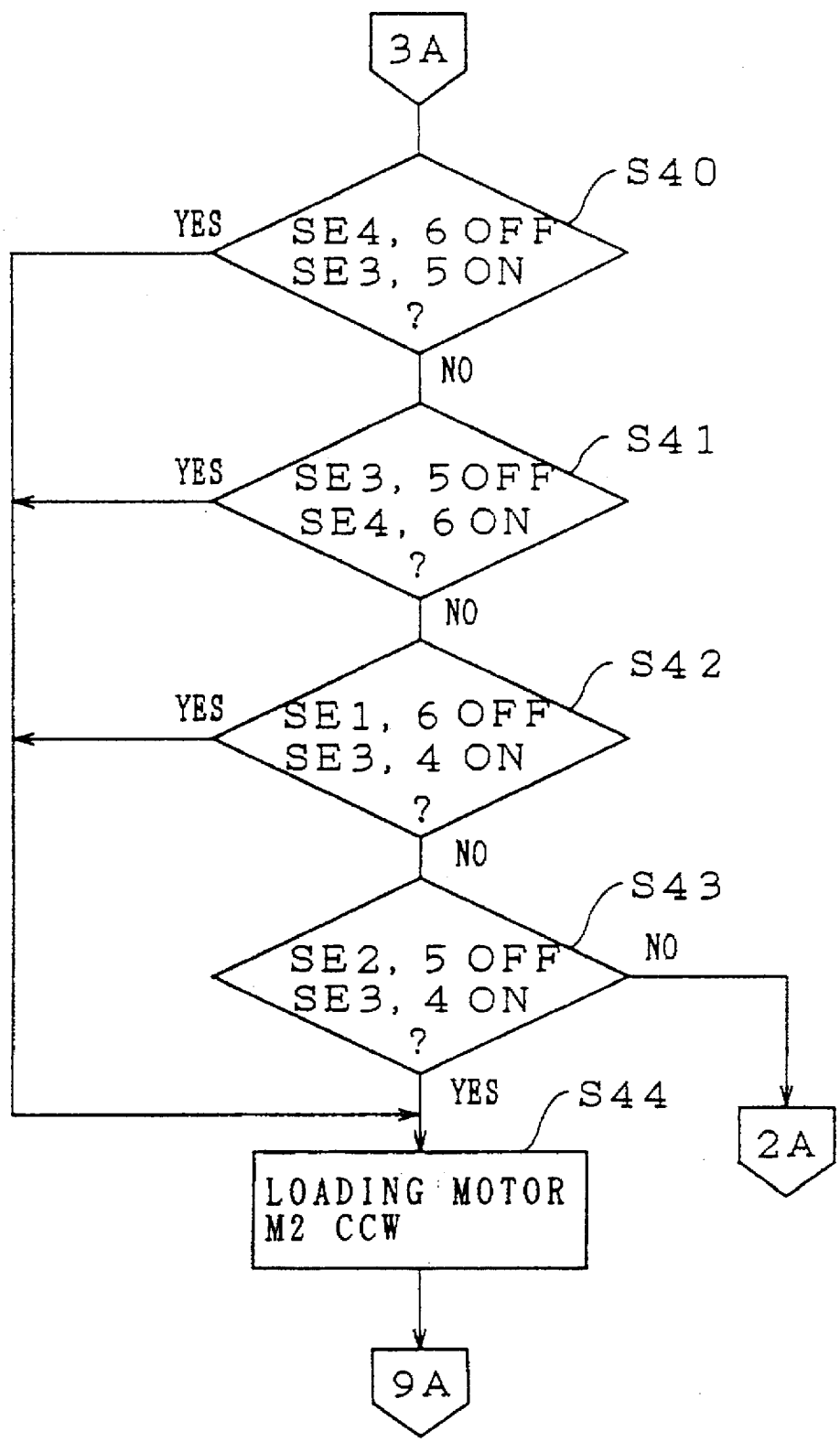
FIG. 42 is a flow chart of a procedure for discriminating the 8-cm disk in disc loading.

An inquiry is thereafter made in step S32 of FIG. 41 as to whether the fifth and sixth sensors SE5, SE6 have become on. With the advance of the disc to the position D4 of FIG. 23 for the disc to slide into the groove 31, the inquiry is answered with "YES." Subsequently, a 0.5-second timer is set (S33), lapse of the set time is detected (S34), and the loading motor M2 is then stopped (S35). The door opening-closing motor M1 is driven in the door closing direction (S36).

Thus, 0.5 second after the actuation of the fifth and sixth sensors SE5, SE6, the loading motor M2 on the insertion-discharge side is stopped, and the door opening-closing motor M1 is started. This obviates the likelihood that the rollers 61, 62 will stop rotating with the disc held between these rollers and engaged by the door 41, followed by the subsequent operation, in the event of slippage of the disc relative to these disc transporting rollers.

A signal from the switch SW1 thereafter indicates that the door 41 has been completely closed (S37), whereupon the door rotating motor is stopped (S38). Then, "1" which means presence of the disc is written to the table of FIG. 35 at the position of specified number (S39).

The disc is loaded in the position of the desired disc number in the magazine 3 by the procedure described.

Detection of Disc Insertion Error

When an 8-cm disc is inserted in error, the inquiry of step S20 of FIG. 40 is answered in the negative. In this case, the procedure shown in FIG. 42 follows.

When the 8-cm disc is inserted at the level d1 of FIG. 24, the fourth and sixth sensors SE4, SE6 become off, and the third and fifth sensors SE3, SE5 are turned on to give an affirmative answer in to step S40.

When the 8-cm disc is inserted at the level d2 of FIG. 24, the third and fifth sensors SE3, SE5 become off and the fourth and sixth sensors SE4, SE6 are turned on to give the answer "YES" in step S41.

When the 8-cm disc is inserted at the level d3 of FIG. 24, the first and sixth sensors SE1, SE6 are turned off, and the third and fourth sensors SE3, SE4 are turned on, giving the answer "YES" in step S42.

In the case where the 8-cm disc is inserted at the level d4 of FIG. 24, the second and fifth sensors SE2, SE5 are turned off, and the third and fourth sensors SE3, SE4 are turned on, giving an affirmative answer in step S43.

Figure 50:
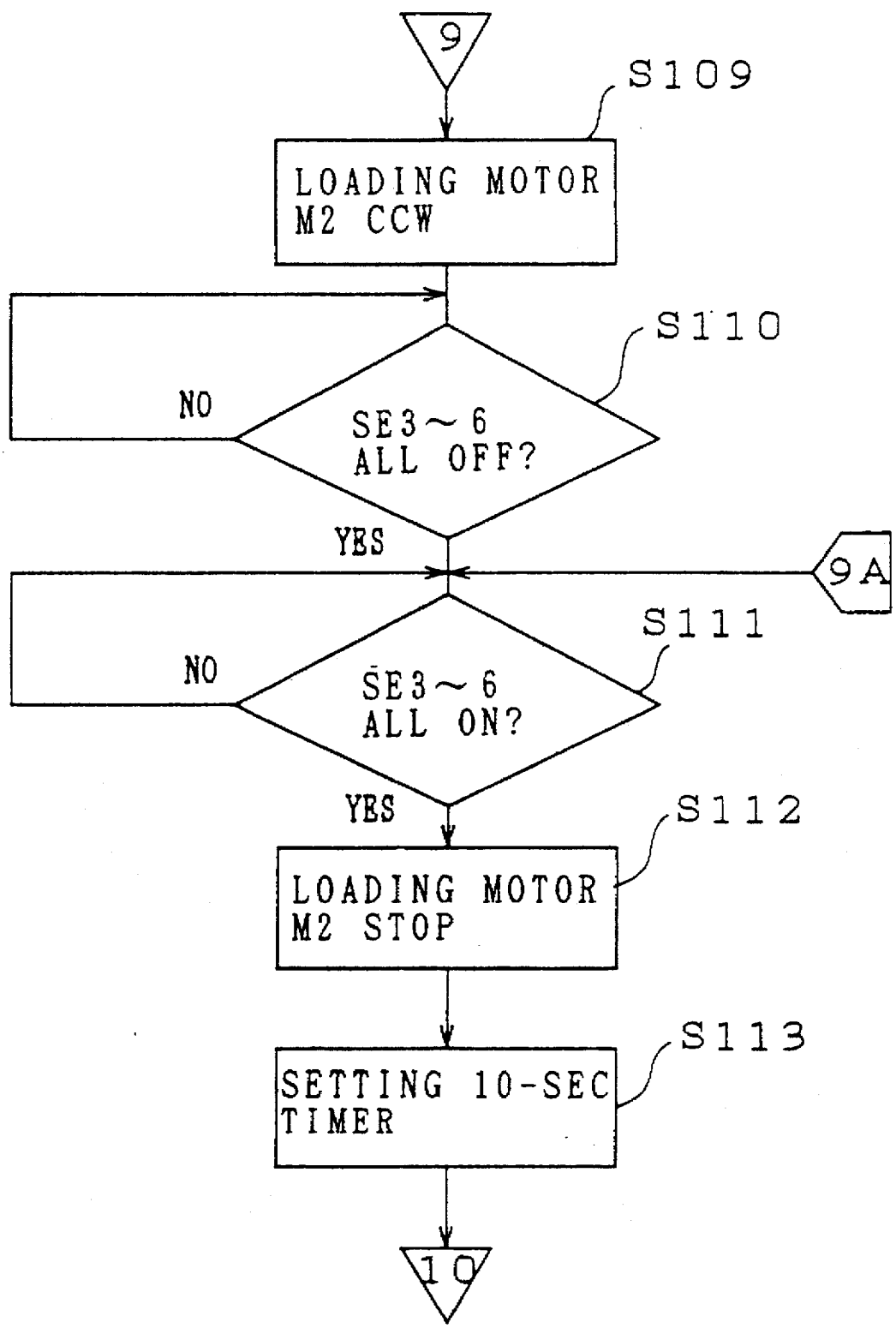
FIG. 50 is a flow chart of a procedure for rotating an insertion-discharge side loading motor in the direction of discharge of the disc for disc ejection.

When the insertion of the 8-cm disc is thus detected, the insertion-discharge side loading motor M2 is rotated counterclowise, i.e., in the direction of discharge of the disc from inside the magazine 3 to the insertion-discharge means 4 (S44), followed by disc ejection of FIG. 50.

In the disc ejection procedure of FIG. 50, the 8-cm disc is held nipped between the rollers 61, 62, as will be described later. If the user withdraws the disc from the rollers 61, 62 in this state, the door opening-closing motor M1 rotates to close the rotatable door 41.

Disc Playing (see FIGS. 43 to 46)

When the desired disc inside the magazine 3 is to be played, the number entry key arrangement 26 is manipulated to key in the desired disc number, and the PLAY button 23 is thereafter pressed.

Figure 43:
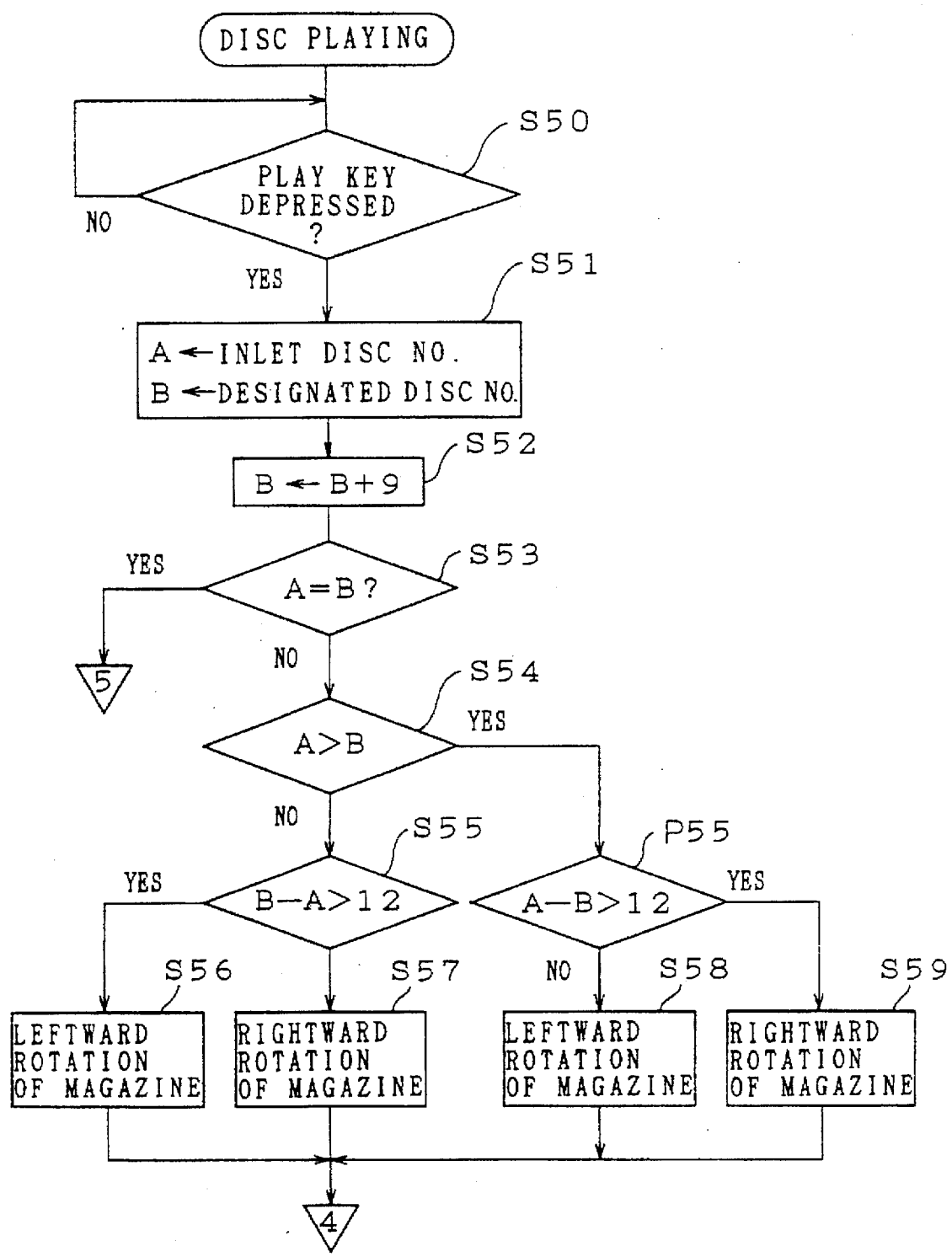
FIG. 43 is a flow chart of a procedure for determining the direction of rotation of the magazine for disc playing.

With reference to FIG. 43, the microprocessor 200 detects depression of the PLAY button 23 (S50), whereupon the processor stores the disc number positioned at the disc inlet in the storage area A of the nonvolatile memory 202 and the disc number specified by the ten-key arrangement in the storage area B (S51).

Figure 38:
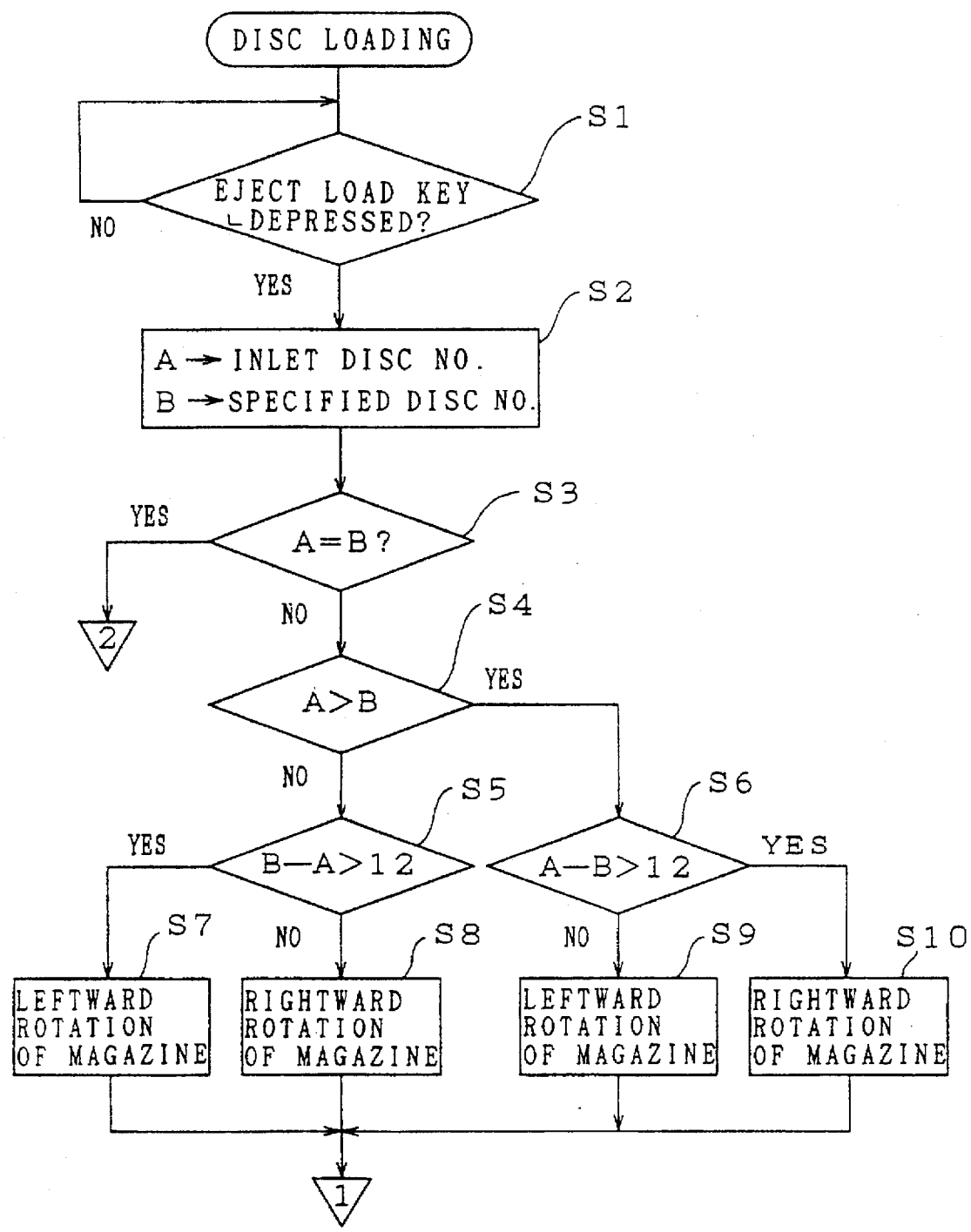
FIG. 38 is a flow chart of a procedure for determining the direction of rotation of the magazine for disc loading.
Figure 39:
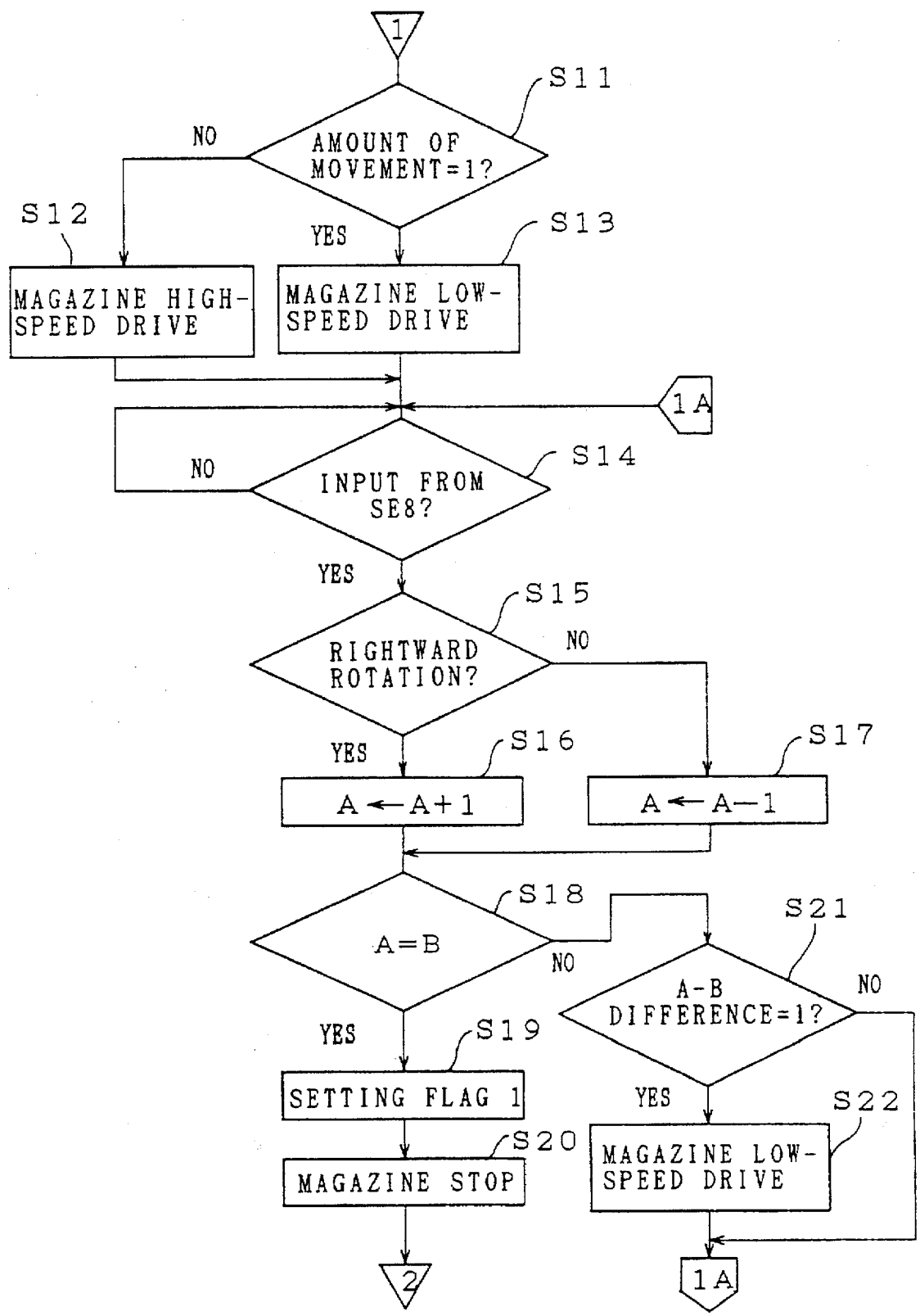
FIG. 39 is a flow chart of a, procedure for rotating the magazine for disc loading.

Subsequently, 9 is added to the value of B, and the sum is taken as a new value of B (S52) for the following reason. As previously stated, the disc insertion-discharge means 4 and the playing means 9 are away, that is, displaced, from each other by an angle of 135 degrees about the central axis of the magazine 3, i.e., by an amount corresponding to 9 groove with pitches of grooves 31. In judging the direction of rotation of the magazine 3 in which the angle of rotation thereof is smaller, 9 is therefore added to the value B so as to make it possible to use the same procedure as the procedure for judging the direction of rotation in the foregoing disc loading process (FIGS. 38 and 39).

Next, the value of A is compared with the value of B (S53, S54). When A=B, step 72 of FIG. 45 follows to rotate the clamping motor M5. If A<B, an inquiry is made as to whether the value (B−A) is greater than 12 (S55). When the answer is affirmative, the magazine 3 is set for leftward rotation (S56). If otherwise, the magazine 3 is set for right-ward rotation (S57). When A>B, an inquiry is made as to whether the value (A−B) is greater than 12 (P55). If the answer is negative, the magazine 3 is set for leftward rotation (S58). If otherwise, the magazine is set for right-ward rotation (S59).

Figure 44:
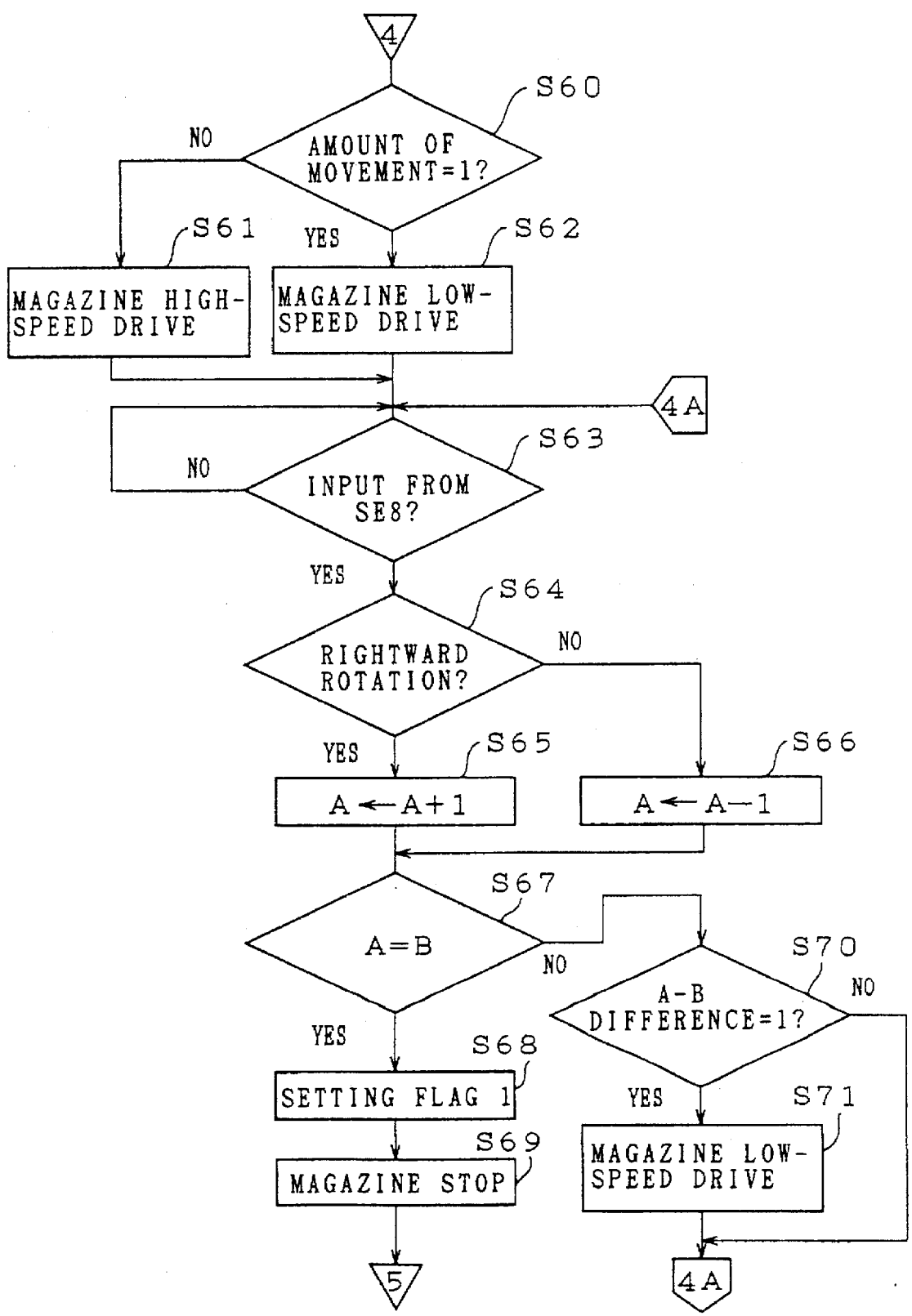
FIG. 44 is a flow chart of a procedure for rotating the magazine in disc playing.

Next with reference to FIG. 44, an inquiry is made as to whether the amount of movement of the position of specified disc number to the position opposed to the disc inlet corresponds to one pitch of disc holding grooves 31 of the magazine 3 (S60). When the answer is "NO," the magazine 3 is driven at a high speed by the magazine rotating motor M3 (S61). If the answer is "YES," it is driven at a low speed (S62).

In these steps, the magazine rotating motor M3 is started upon recognition that the door 41 is closed with reference to a signal from the switch SW1.

An inquiry is thereafter made as to whether an ON signal input is given by the magazine rotation count sensor SE8 (S63). When the answer is "YES," an inquiry is made as to whether the direction of rotation determined in the foregoing steps S56 to S59 is rightward (S64). If it is rightward, the value A is incremented by 1 (S65). If it is leftward, the value A is decremented by 1 (S66).

A and B are then compared (S67). When the values are found equal, a flag "1" is set which indicates that the position of a specified disc number has shifted to the position opposed to the playing means (S68), whereupon the magazine 3 is stopped (S69). If A and B are not found to match, on the other hand, an inquiry is made as to whether the difference therebetween is 1 (S70). If the answer is "YES," the speed of rotation of the magazine 3 is changed to low (S71), whereupon the sequence returns to step S63. If the answer is "NO," the sequence returns to step S63 without changing the speed of the magazine 3.

In the foregoing sequence in which the groove 31 of a specified disc number moves to the position one groove pitch before the position opposed to the playing means, a rapid movement is effected by the high-speed rotation of the magazine 3, and the groove is subsequently moved by one pitch by the low-speed rotation of the magazine 3 and thereby accurately positioned.

Figure 45:
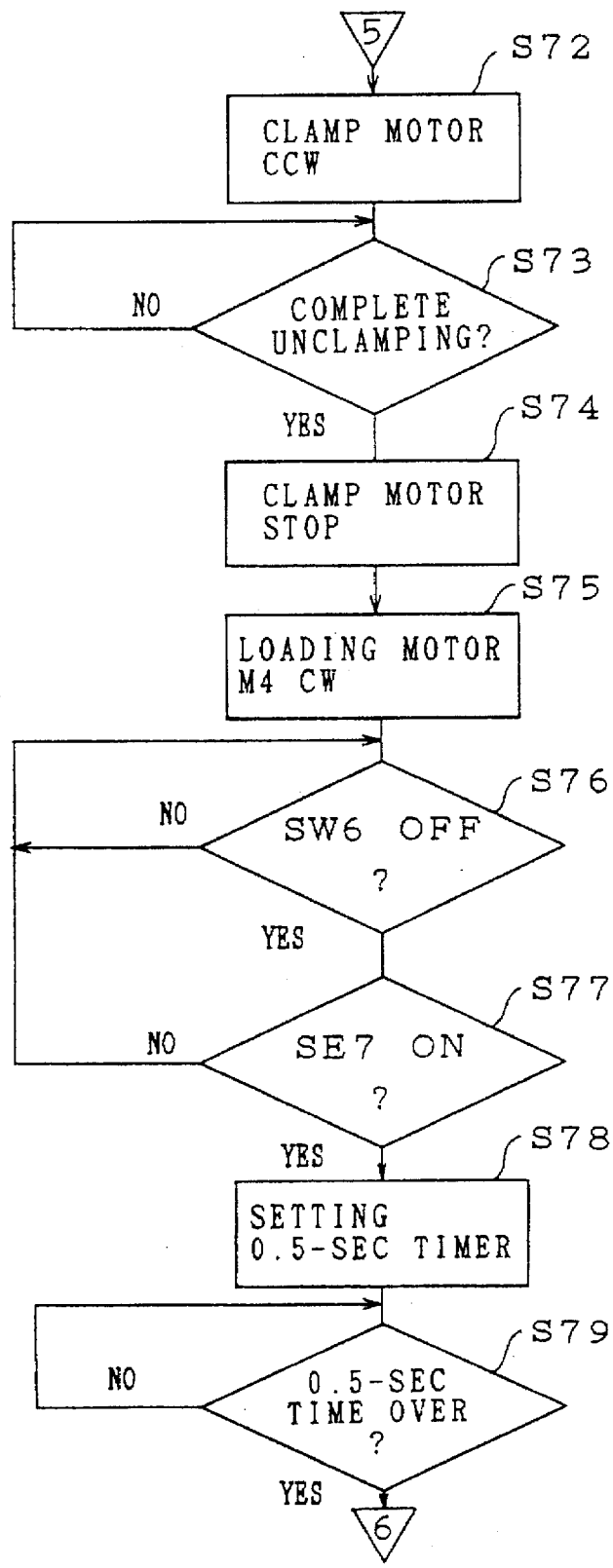
FIG. 45 is a flow chart of a procedure for clamping the disc for disc playing.

During the rotation of the magazine 3, the clamp 93 of the playing means 9 is held in its clamping position, so that the clamping motor M5 is rotated counterclockwise, namely, in an unclamping direction (S72), with the groove 31 of specified disc number opposed to the playing means 9, as seen in FIG. 45. After completion of unclamping is detected by a signal from the switch SW8 (S73), the clamping motor M5 is stopped (S74). The disc can be loaded in the playing means 9 in this state.

The playing side loading motor M4 is then rotated clockwise, i.e., in a direction to transport the disc into the playing means 9 (S75). The kick-out member 7a for the playing means 9 as located in its retracted position is detected by the sensor switch SW6 which is off (S76), and the seventh sensor SE7 for the playing means becoming on is detected (S77), whereupon a 0.5-second timer is set (S78). Upon lapse of 0.5 second (S79), the clamping operation of FIG. 46 follows. Thus, setting the 0.5-second timer adjusts the time lag involved in the transport of the disc to the playing means 9 after the disc moves past the seventh sensor SE7.

Figure 46:
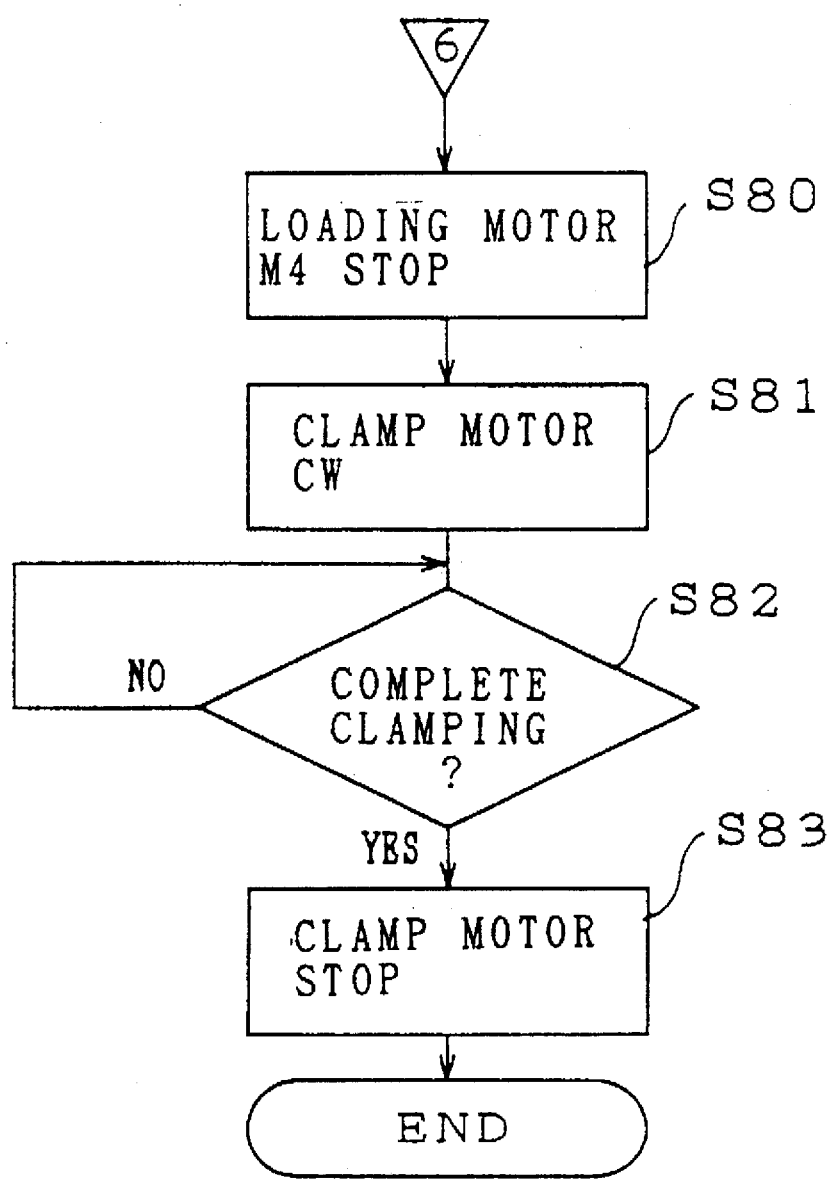
FIG. 46 is a flow chart of a procedure ending with stopping of a clamping motor in disc playing.

With reference to FIG. 46, the loading motor M4 is stopped (S80), and the clamping motor M5 is then rotated clockwise, i.e., in the disc clamping direction (S81) and thereafter stopped (S83) upon a signal from the switch SW7 indicating completion of clamping (S82).

The disc of a specified number is now set in the playing means 9, and the playing mode is completely set.

Disc Ejection (see FIGS. 47 to 52)

The OPEN/CLOSE button 25 is depressed to temporarily return a disc being played and further withdraw the disc from the playing device.

Figure 47:
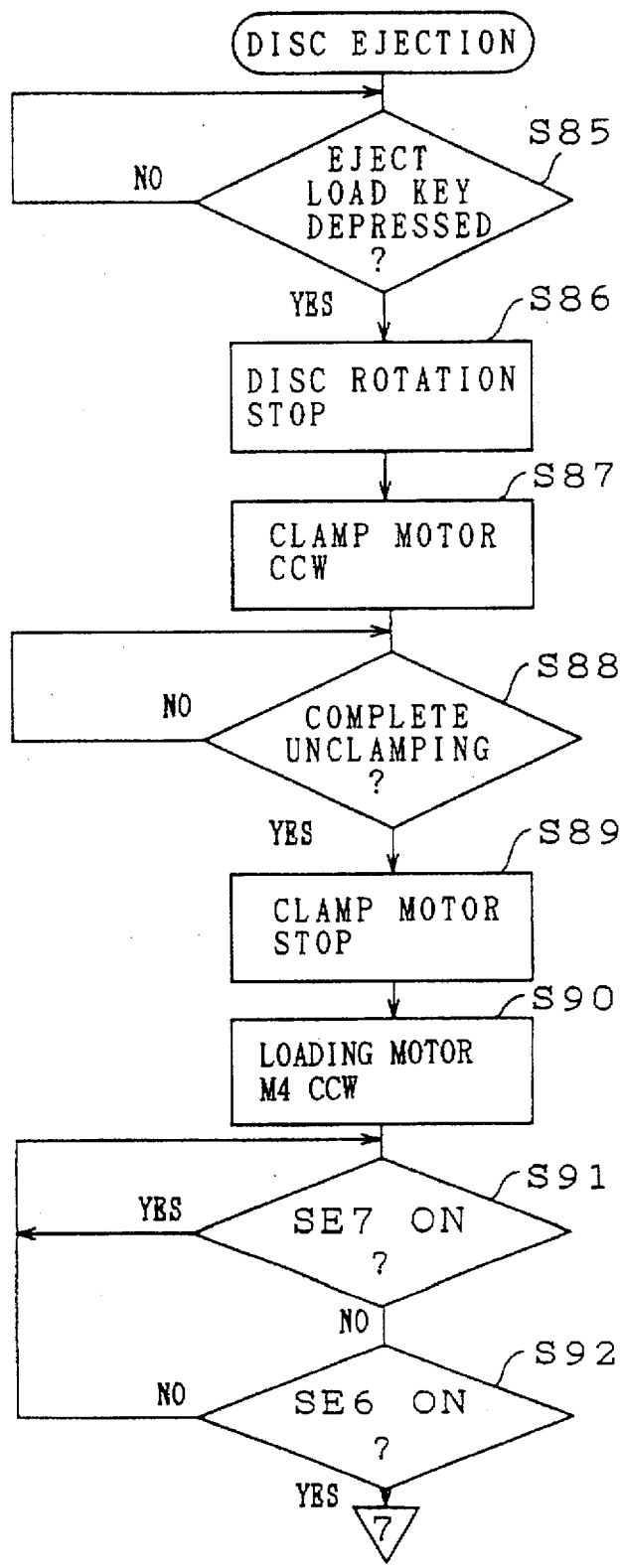
FIG. 47 is a flow chart of a procedure for unclamping the disc for disc ejection.

Since the disc is in rotation at this time, the disc rotating motor M6 is stopped (S86) after the depression of the button 25 is detected (S85) as seen in FIG. 47. The clamping motor M5 is then rotated (S87) counterclockwise, i.e., in the unclamping direction, complete unclamping is detected (S88) from a signal from the switch SW8, and the motor M5 is thereafter halted (S89). The disc is now movable to the magazine 3.

Figure 48:
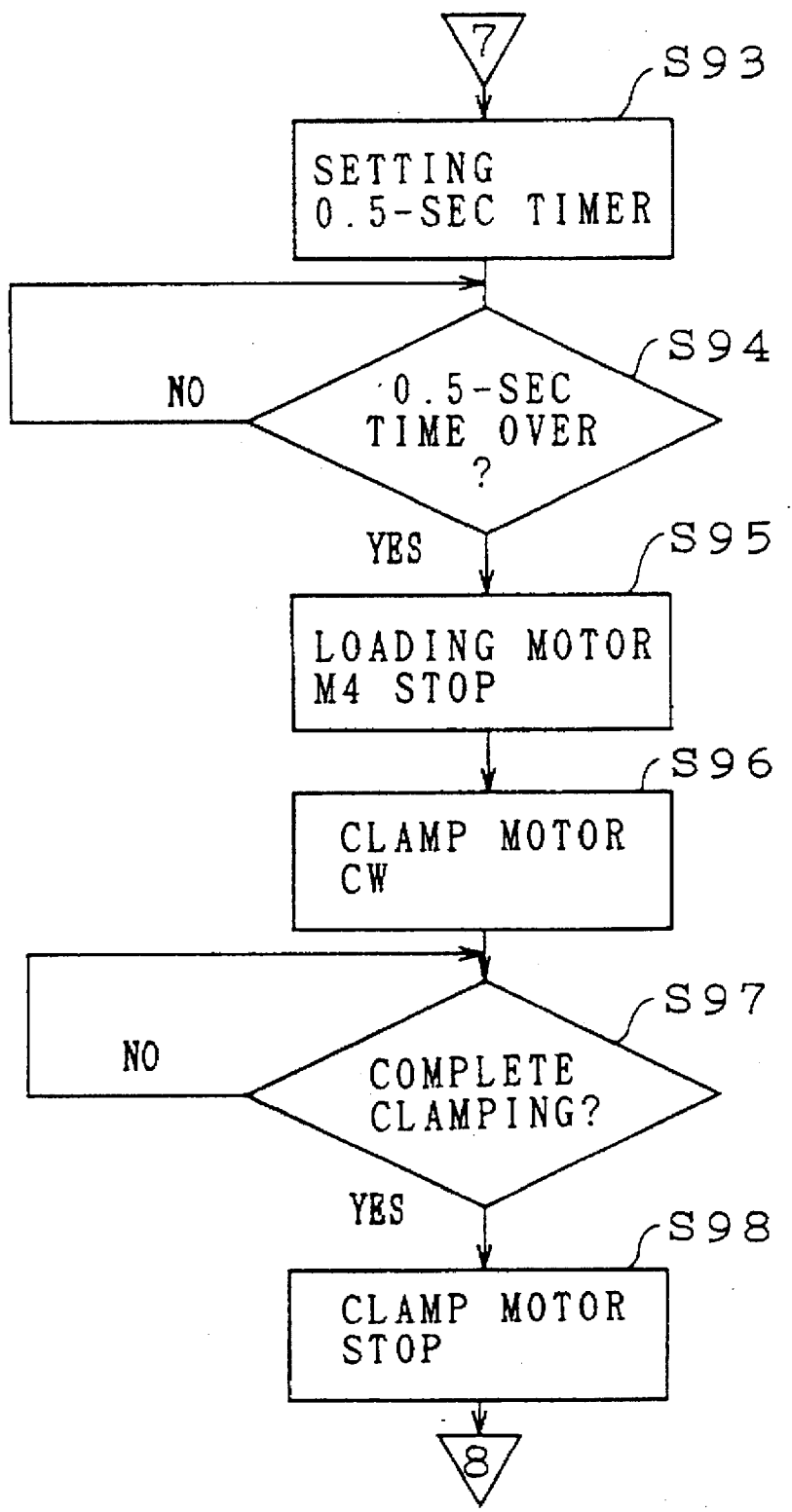
FIG. 48 is a flow chart of a procedure ending with stopping of the clamping motor for disc ejection.

Next, the loading motor M4 for the playing means is rotated counterclockwise, i.e., in a direction to collect the disc into the magazine 3 (S90). The disc moves into the magazine 3 by being nipped between the rollers 61a, 62a. The microprocessor thereafter detects the seventh sensor SE7 and the kick-out member retracted position detecting switch SW6 which are turned on (S91, S92), and then sets a 0.5-second timer (S93) as shown in FIG. 48.

Detection of lapse of 0.5 second (S94) is followed by stopping of the playing side loading motor M4 (S95). As previously stated, the 0.5-second timer is set in view of the slippage of the disc relative to the rollers 61a, 62a to ensure reliable return of the disc to the magazine 3.

Subsequently, the clamping motor M5 is rotated clockwise, i.e., in the disc clamping direction (S96), complete clamping is detected from a signal from the switch SW7 (S97), and the motor M5 is then deenergized (S98).

Figure 49:
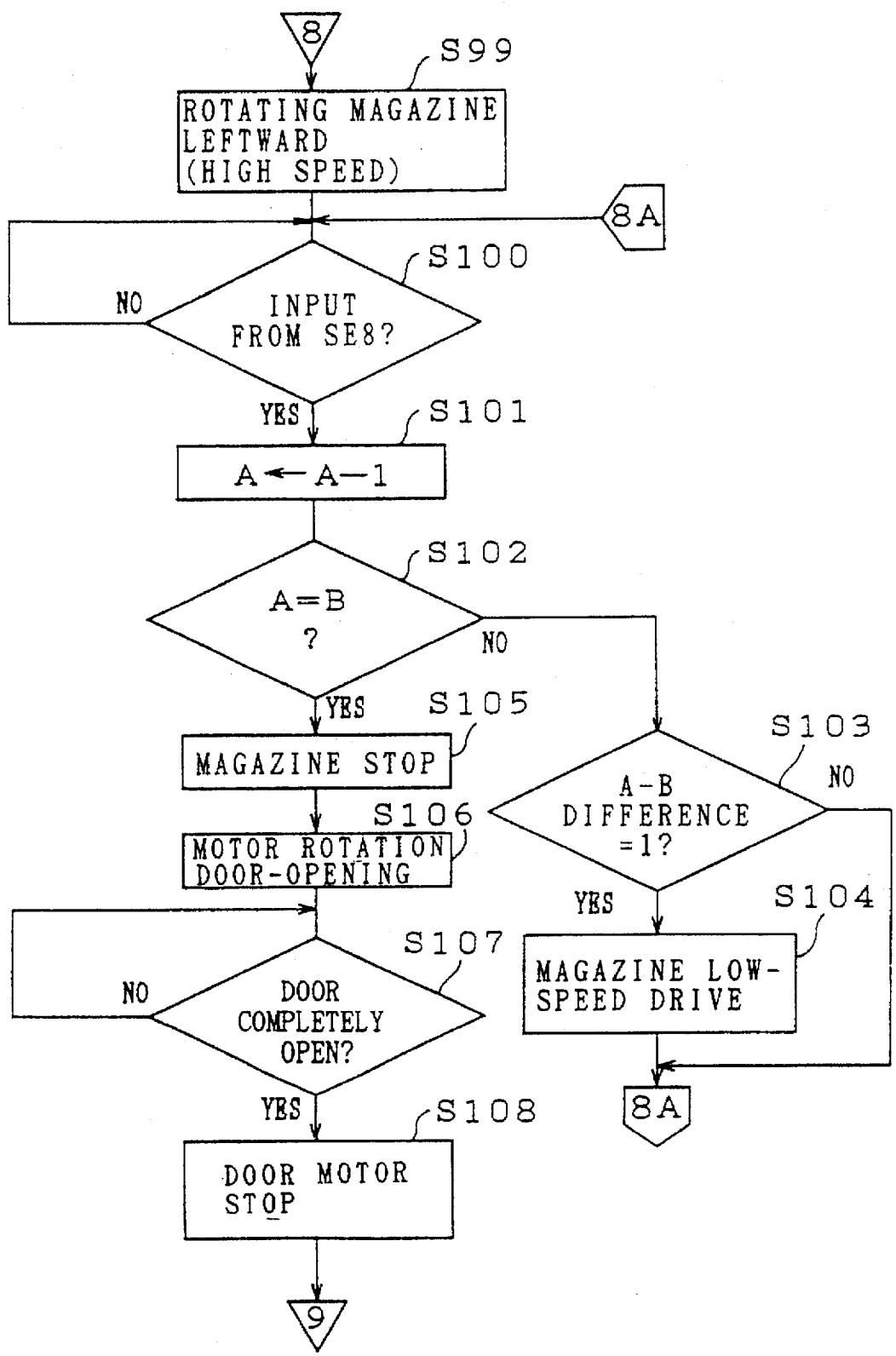
FIG. 49 is a flow chart of a procedure for rotating the magazine for disc ejection.

Next with reference to FIG. 49, the magazine rotating motor M3 is started to rotate the magazine 3 leftward at a high speed (S99). The disc can be transported from the playing means 9 to the disc insertion-discharge means by the rotation of smaller angle when the magazine is rotated leftward.

The count sensor SW8 thereafter outputs an ON signal (S100), whereupon the value of A is decremented (S101) and then compared with the value of B (S102). When the two values are not in match, the difference therebetween is checked as to whether it is greater than 1 (S103). If the answer is "YES," the magazine 3 is slowed down (S104), and the sequence returns to step S100. If the answer is "NO," step S100 follows without changing the speed of rotation of the magazine 3.

When the values of A and B are found to be in match in step S102, the magazine rotating motor M3 is stopped (S105), and the door opening-closing motor M1 is rotated in the door opening direction (S106). A signal from the switch SW2 then indicates that the door 41 is completely opened (S107), whereupon the door motor M1 is deenergized (S108).

The above sequence brings the disc in the magazine 3 to the position opposed to the disc inlet, and opens the door 41.

Next with reference to FIG. 50, the loading motor M2 for the insertion-discharge means is driven counterclockwise, i.e., in the direction of discharge of the disc toward the insertion-discharge means 4 (S109). Rotation of the rollers 61, 62 moves the disc to the means 4. Turning off of all the third to sixth sensors SE3 to SE6 is then detected (S110). Now the disc has advanced from the position D4 to the position D3 in FIG. 23.

Subsequently, the third to sixth sensors SE3 to SE6 all as turned on are detected (S111), whereupon the loading motor M2 is stopped (S112). The disc is now stopped with its forward end portion, closer to the means 4, projecting out beyond the means 4 and with its rear end portion held between the rollers 61, 62. The disc can therefore be withdrawn from the playing device. Furthermore, it is unlikely that the kick-out member 7 will advance to excess and fall off the insertion-discharge means 4.

Figure 51:
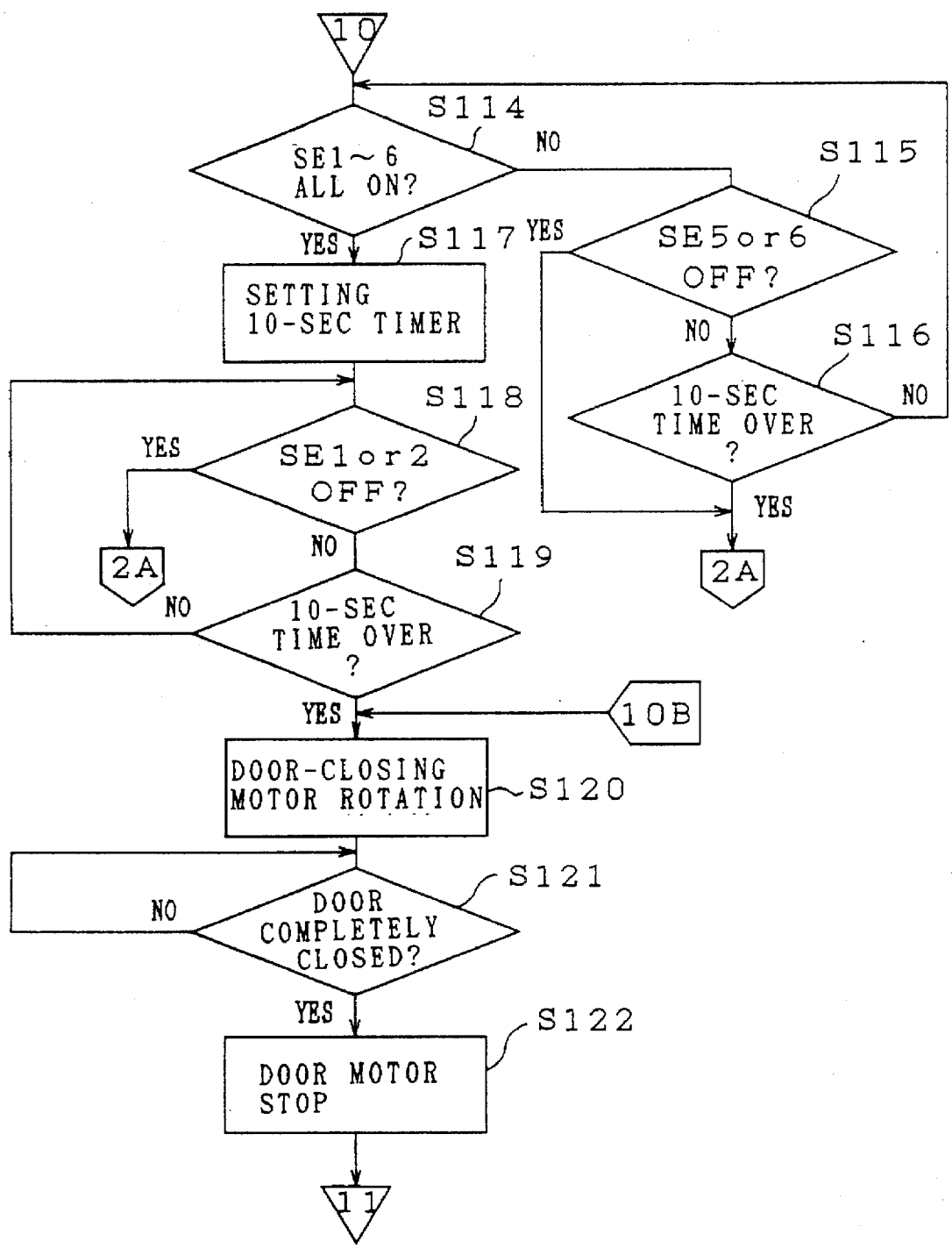
FIG. 51 is a flow chart of a procedure ending with closing of the door upon detection of delivery of the disc for disc ejection.

After the loading motor M2 is stopped, a 10-second timer is set (S113), and an inquiry is made as to whether the first to sixth sensors SE1 to SE6 are all turned on (S114), as shown in FIG. 51. When the disc is withdrawn, the inquiry is answered with "YES," whereupon the sequence proceeds to step S117.

If the disc is not withdrawn but is pushed into the playing device again, a negative answer is given to step S114, and the fifth or sixth sensor SE5 or SE6 as turned off is detected (S115). This is followed by the disc loading procedure of FIG. 40 to load the disc into the magazine 3 again.

In the case where the playing device is left as it is without withdrawal of the disc, lapse of 10 seconds is detected (S116), whereupon the disc loading procedure of FIG. 40 follows to accommodate the disc in the magazine 3 again.

When step S114 is answered with "YES," the 10-second timer is set again (S117). In the case where a new 12-cm disc is then placed into the insertion-discharge means 4, turning off of the first sensor SE1 or second sensor SE2 is detected (S118), and the sequence proceeds to the disc loading procedure of FIG. 4. The disc is loaded into the magazine 3.

When lapse of 10 seconds is detected without placement of any new disc into the insertion-discharge means 4 (S119), the door motor M1 is rotated in the door closing direction (S120) and subsequently stopped (S122) after the detection of complete closing of the door 41 from a signal from the switch SW1.

Accordingly, the door 41 remains open within 10 seconds after the removal of the discharged disc, and a new disc can be placed in during this period.

Figure 52:
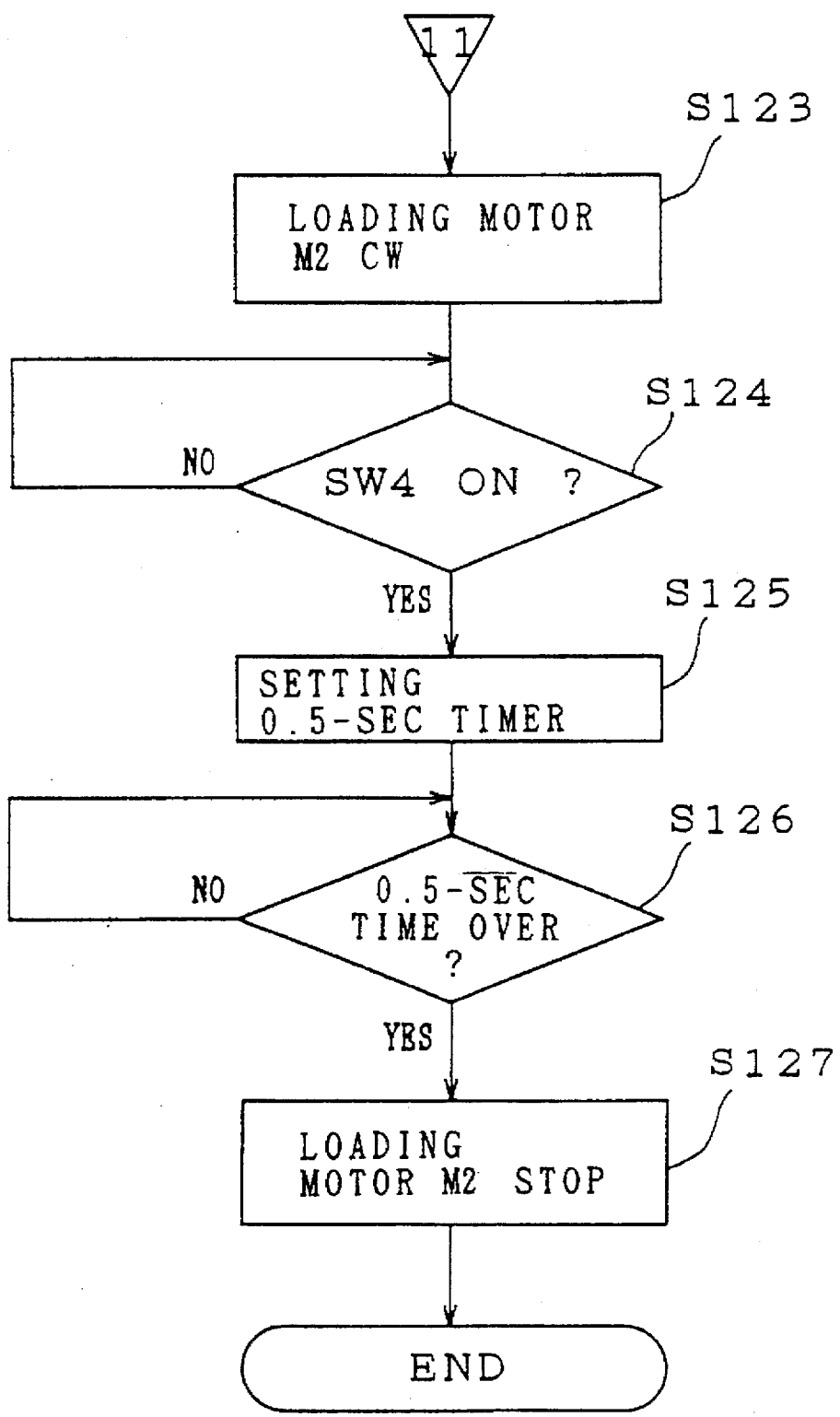
FIG. 52 is a flow chart of a procedure for retracting an insertion-discharge side kick-out member for disc ejection.

As shown in FIG. 52, steps S123 to S127 thereafter follow to rotate the loading motor M2 clockwise and move the insertion-discharge side kick-out member 7 to its retracted position for the completion of disc ejection. A 0.5-second period of time is set by steps S125, S126 so as to reliably bring the kick-out member to its retracted limit position.

Figure 53:
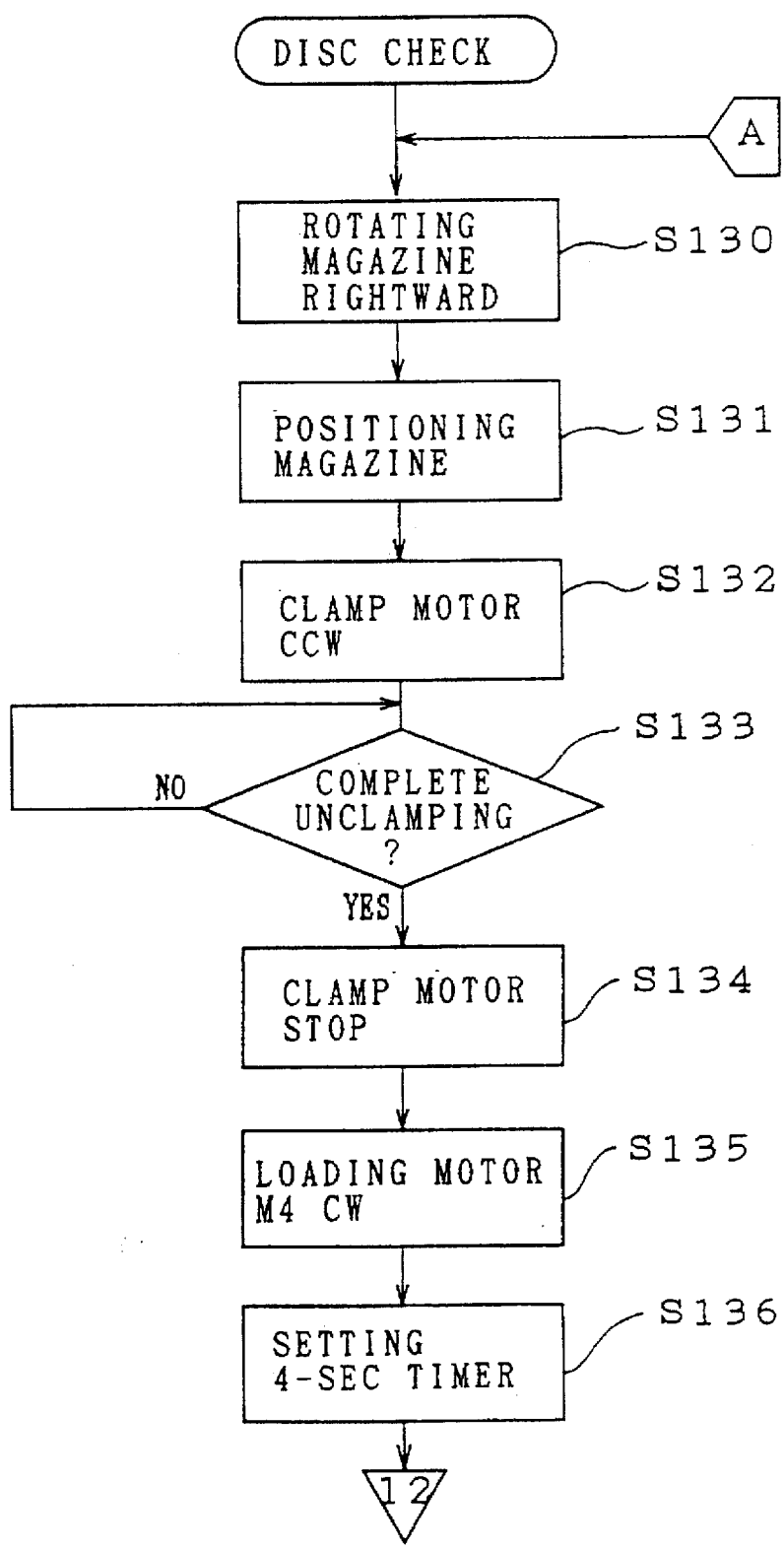
FIG. 53 is a flow chart of a procedure of rotating the magazine to rotating a playing side loading motor for disk checking.
Figure 54:
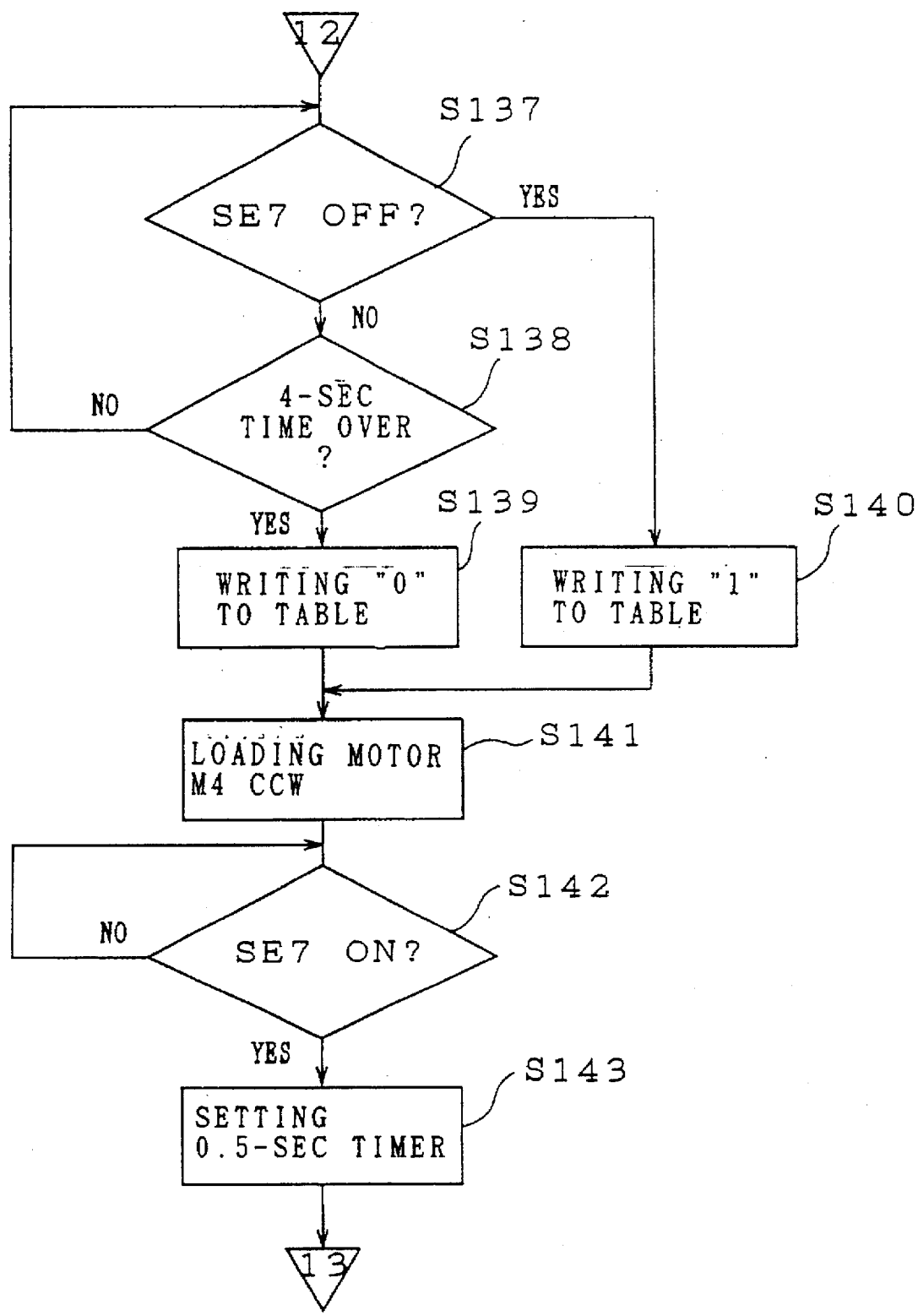
FIG. 54 is a flow chart of a procedure for writing presence or absence of the disc for disc checking.
Figure 55:
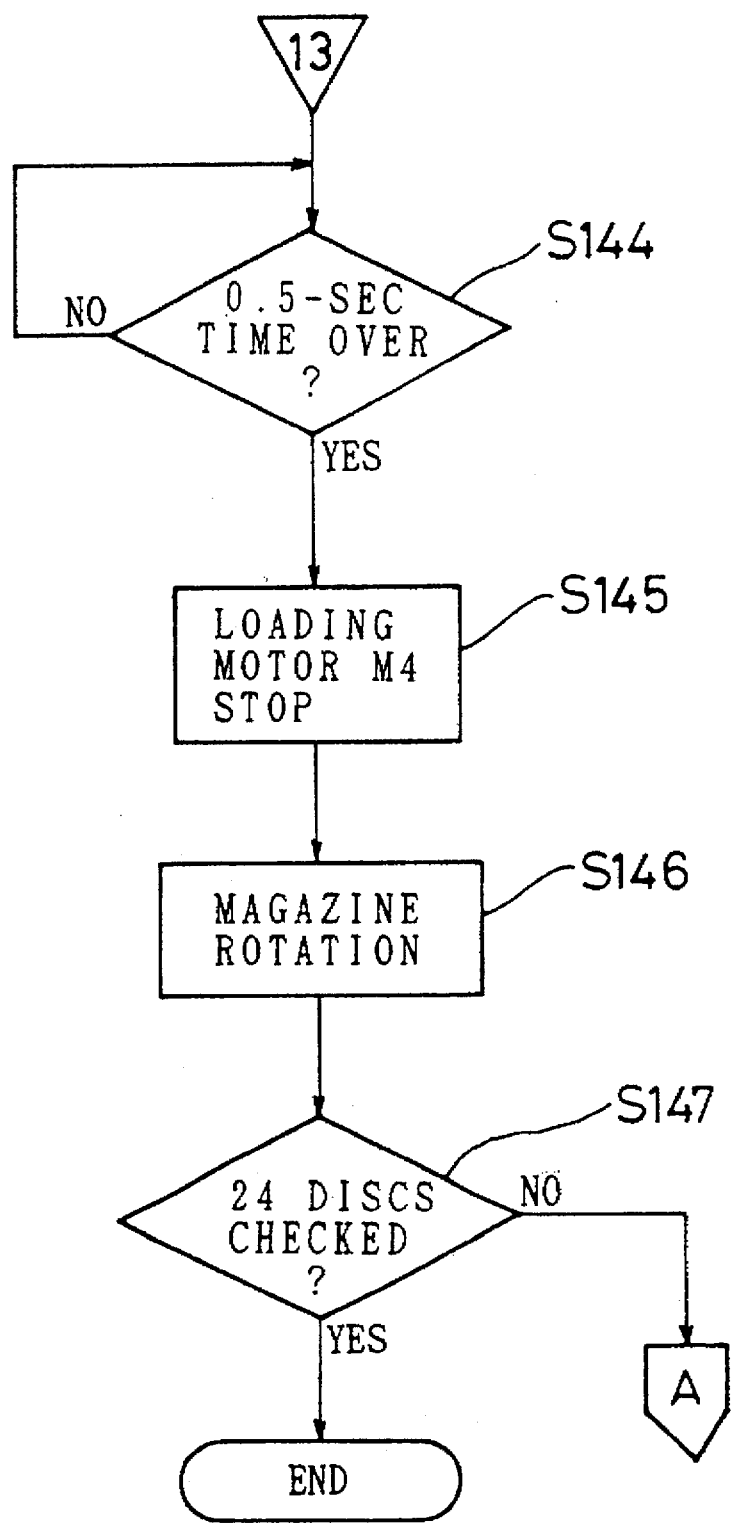
FIG. 55 is a flow chart of a procedure ending with stopping of the playing side loading motor for disc checking.
Figure 56:
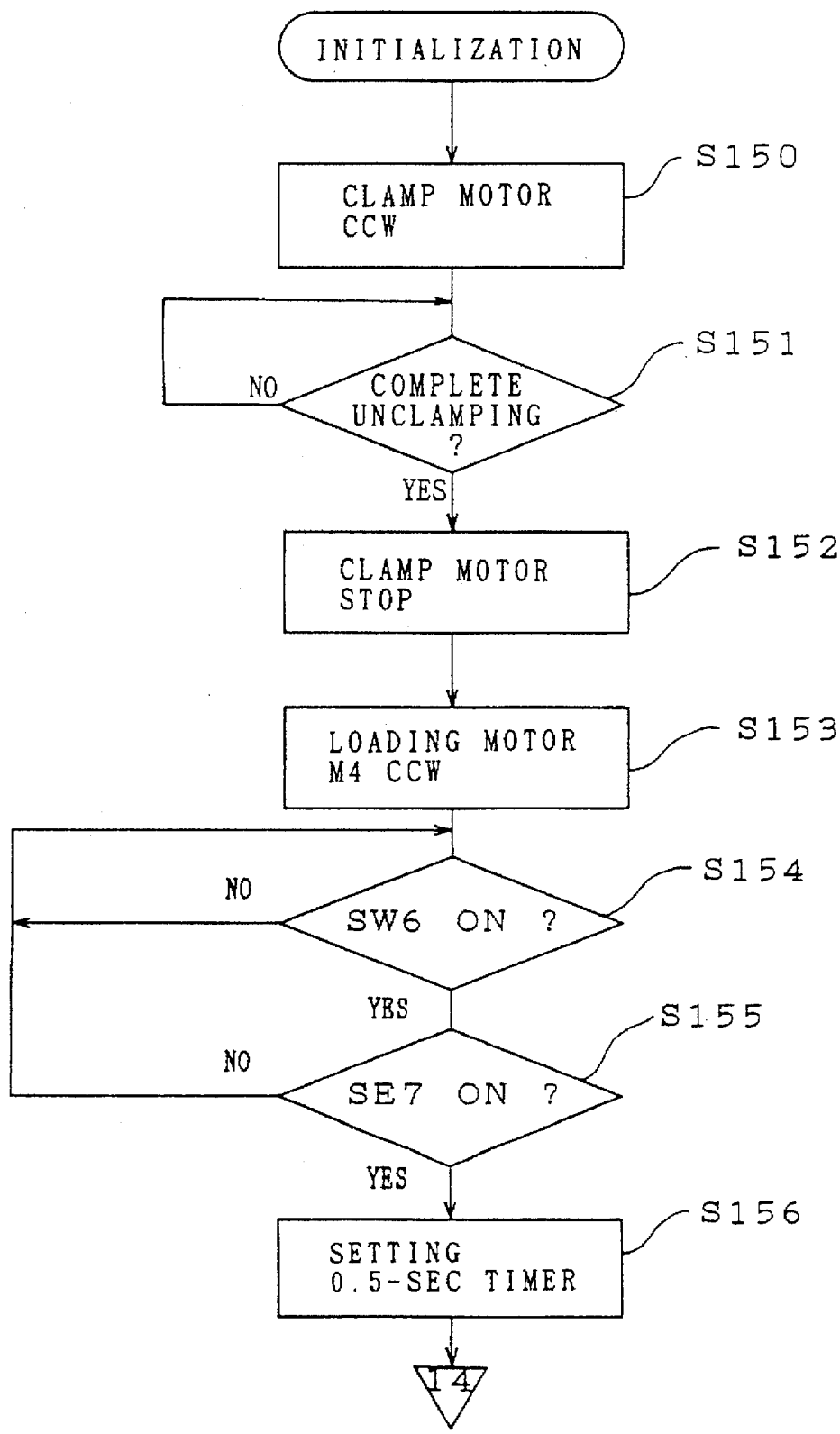
FIG. 56 is a flow chart of a procedure for unclamping and retracting a playing side kick-out member for initialization.

Disk Checking (see FIGS. 53 to 55)

As previously stated, whether a disc is present or absent in the magazine 3 is written in the non-volatile memory 210 of the microprocessor 200 for every number of disc holding groove 31, whereas if the data of the memory 201 is broken for one cause or another, problems will develop in the subsequent operation. Accordingly, when the disc playing device is turned on for power supply, whether the data in the nonvolatile memory 201 is normal is checked. If a fault is detected, the processor forcibly performs the following disc checking function to prepare new correct data and store the data in the memory 201.

To judge whether the data in the memory 201 is normal, a storage area for error detection data is provided in the nonvolatile memory 201 to check the error detection data for changes every time a disc is inserted or discharged.

If a change is found in the error detection data, each disc holding groove 31 is checked for the presence of a disc therein, and new data is prepared according to the following procedure.

First with reference to FIG. 53, the magazine rotating motor M3 is started to rotate the magazine rightward (S130). Based on signals from the count sensor SE8, the disc holding grooves 31 of the magazine 3 are thereafter brought one-by-one in the order of No. 1 to No. 25 to the position opposed to the playing means 9 (S131). The clamping motor M5 is rotated counterclockwise, i.e., in the unclamping direction (S132) and thereafter stopped (S134) upon detection of unclamping from a signal from the switch SW8 (S133).

Subsequently, the playing side loading motor M4 is rotated clockwise, i.e., in the direction of transport of the disc from the magazine 3 toward the playing means 9 (S135), and a 4-second timer is set (S136).

An inquiry is then made as to whether the seventh sensor SE7 is turned off (S137) as seen in FIG. 54. If the answer is negative, lapse of 4 seconds is checked (S138). When the answer to step S138 is "NO," the sequence returns to step S137. If a disc is found accommodated in the position opposed to the laying means 9, the disc is to move past the seventh sensor SE7, so that step S137 is answered with "YES." In this case, "1" which means presence of the disc is written to the table of FIG. 35 at the position of number of the groove 31 in which the disc was present (S140). Step S141 then follows.

In the case where no disc is found in the position opposed to the playing means 9, the seventh sensor SE7 does not become off, so that upon lapse of 4 seconds (S138), "0" meaning absence of disc is written to the table of FIG. 35 at the position of number of the groove 31 opposed to the playing means 9 (S139).

The playing side loading motor M4 is then rotated counterclockwise (S141), followed by recognition of the seventh sensor SE7 turned on (S142) and further by setting of the 0.5-second timer (S143).

With reference to FIG. 55, lapse of 0.5 second is then detected (S144), whereupon the motor M4 is deenergized (S145), whereby the disc which was accommodated in the groove 31 is returned to the magazine 3. The magazine 3 rotates intermittently by one groove pitch at a time (S146), and an inquiry is made as to whether 24 disc have been checked for presence with reference to the signal from the count sensor SE8 (S147). If the answer is "NO," the next groove 31 is thereafter checked.

Thus, for each disc holding groove 31, the motor M4 is rotated once to rotate the rollers 61a, 62a and for the seventh sensor SE7 to check the presence or absence of a disc, and the resulting data is stored in the storage area. When the disc is detected, the motor M4 is reversely rotated to completely draw the disc into the magazine 3. In this way, new data is registered in the non-volatile memory 201.

Initialization (see FIGS. 56 to 59)

For example, in the event of a power failure occurring during playing of the disc or during disc loading, or in the case where the electric plug is removed from the receptacle in error, it is likely that the operation of the disc playing device is discontinued in an abnormal state in which the disc remains as transported to the disc insertion-discharge means or the playing means 9. Further, while the device is de-energized, there arises the case in which the door 41 is manually opened, and a disc is inserted into the magazine 3 against the kick-out member 7.

Accordingly, whenever the power supply is turned on in the de-energized state, the following initialization procedure is executed to return the disc playing device to the normal initial state in preparation for the subsequent disc loading, playing or like operation mode.

First when the ON-OFF button 22 is depressed to turn on the power supply, the clamping motor M5 is rotated counterclockwise, i.e., in the unclamping direction (S150), and is thereafter stopped (S152) after complete unclamping is detected (S151) from a signal from the switch SW8.

Next, the playing side loading motor M4 is rotated counterclockwise., i.e., in the direction of collection of the disc into the magazine 3 (S153), followed by detection of the switch SW6 and the seventh sensor SE7 turned on (S154, S155) and then by setting of the 0.5-second timer (S156).

Figure 57:
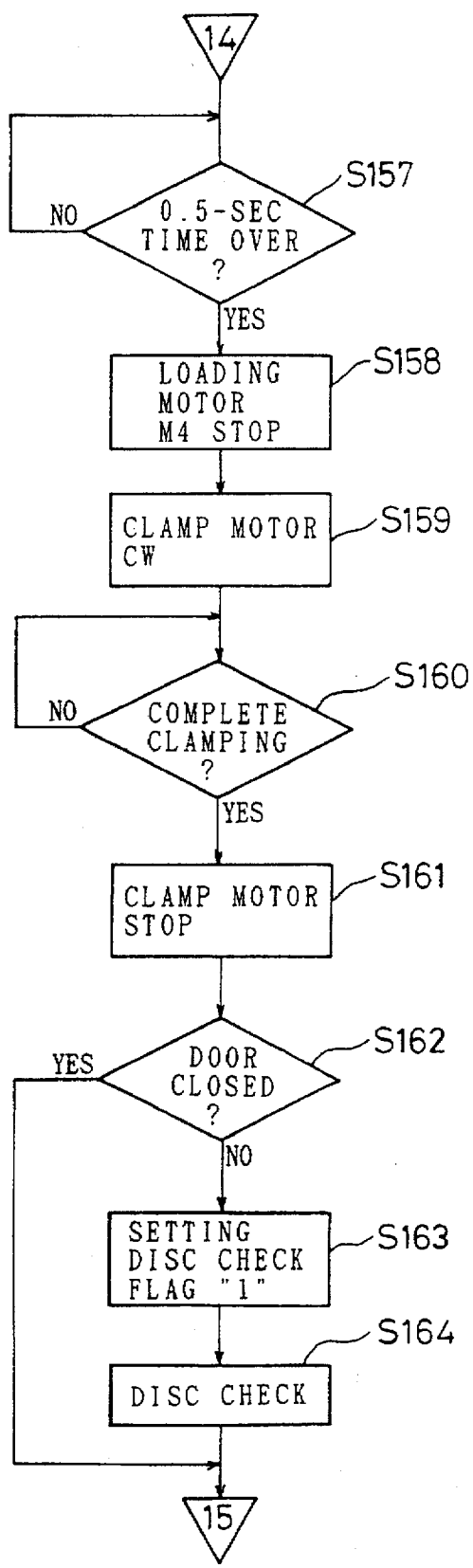
FIG. 57 is a flow chart of a procedure for closing the door for initialization.

Lapse of 0.5 second is then detected (S157), whereupon the motor M4 is stopped (S158) as shown in FIG. 57.

The disc which was positioned on the playing means 9 at the time of power failure as transported from the magazine 3 is returned to the magazine 3 by the above procedure.

The clamping motor M5 is then rotated clockwise, i.e., in the disc clamping direction. After complete clamping is detected (S160), the motor M5 is stopped (S161).

Consequently, the clamp 93 of the playing means is initially set in its disc clamping position.

Subsequently, in order to check whether the data in the non-volatile memory 201 is normal, for example, to check whether a disc has been forcibly inserted during a power failure, an inquiry is made as to whether the rotatable door 41 is completely closed with reference to the signal from the switch SW1 (S162). If the answer is "NO," a disc check flag "1" is set which indicates insertion of disc into the magazine 3 and a fault occurring in the data of the memory 201, followed by execution of the disc checking procedure described above with reference to the flow charts of FIGS. 53 to 55.

Consequently, when it has been found that the door 41 was manually opened and a disc inserted into the magazine 3 against the kick-out member 7 during the power failure, new data is prepared in the non-volatile memory 201.

Figure 58:
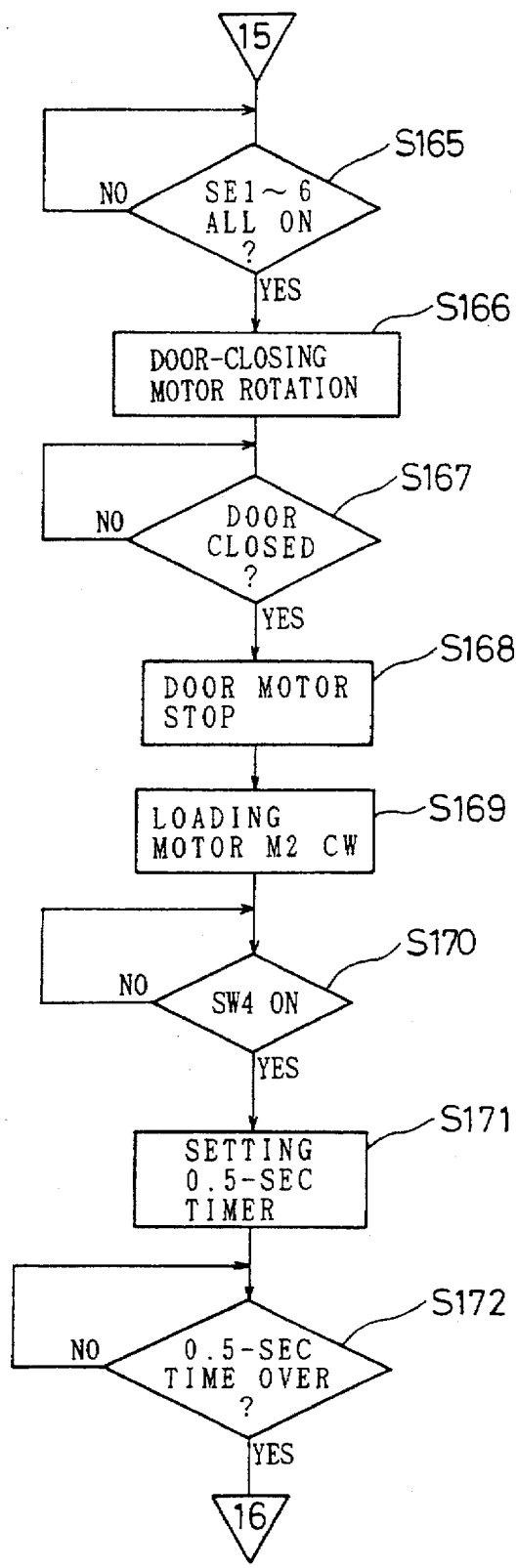
FIG. 58 is a flow chart of a procedure for retracting the insertion-discharge side kick-out member for initialization.

If the answer to step S162 is affirmative, that is, if the door 41 is completely closed, the first to sixth sensors SE1 to SE6 all turned on are recognized (S165), and the door motor M1 is rotated in the door closing direction (S166) as shown in FIG. 58. If the disc is present in the insertion-discharge means 4, one of the sensors is off, so that the door is to be closed only if no disc is present in the means 4.

After complete closing of the door 41 is detected (S167), the door opening-closing motor M1 is halted (S168).

Subsequently, the loading motor M2 for the means 4 is rotated clockwise, i.e., in the direction of transport of the disc into the magazine 3 (S169), followed by detection of the switch SW4 turned on (S170) and then by setting of the 0.5-second timer (S171).

Figure 59:
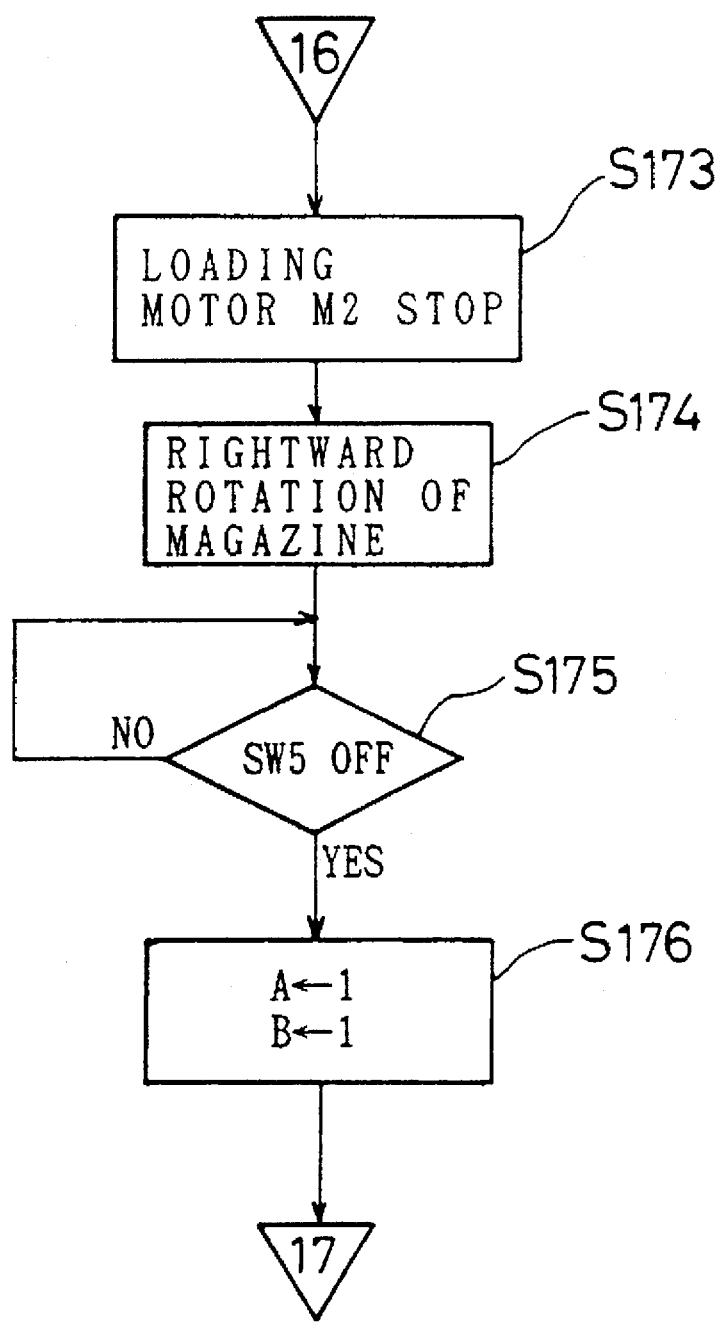
FIG. 59 is a flow chart of a procedure for rotating the magazine to the initial position for initialization.

Upon lapse of 0.5 second (S172), the loading motor M2 is stopped (S173) as seen in FIG. 59. The kick-out member 7 is thus brought to its retracted limit position, i.e., its initial position.

The magazine rotating motor M3 thereafter rotates to rotate the magazine 3 rightward (S174), followed by an inquiry as to whether the switch SW5 has become off (S175). When the magazine 3 rotates, bringing the disc holding groove 31, No. 1 to the position opposed to the disc insertion-discharge means 4, the switch SW5 is turned off, and the values of A and B in the volatile memory 202 are reset to "1" (S176).

(Recognition Procedure)

Figure 60:
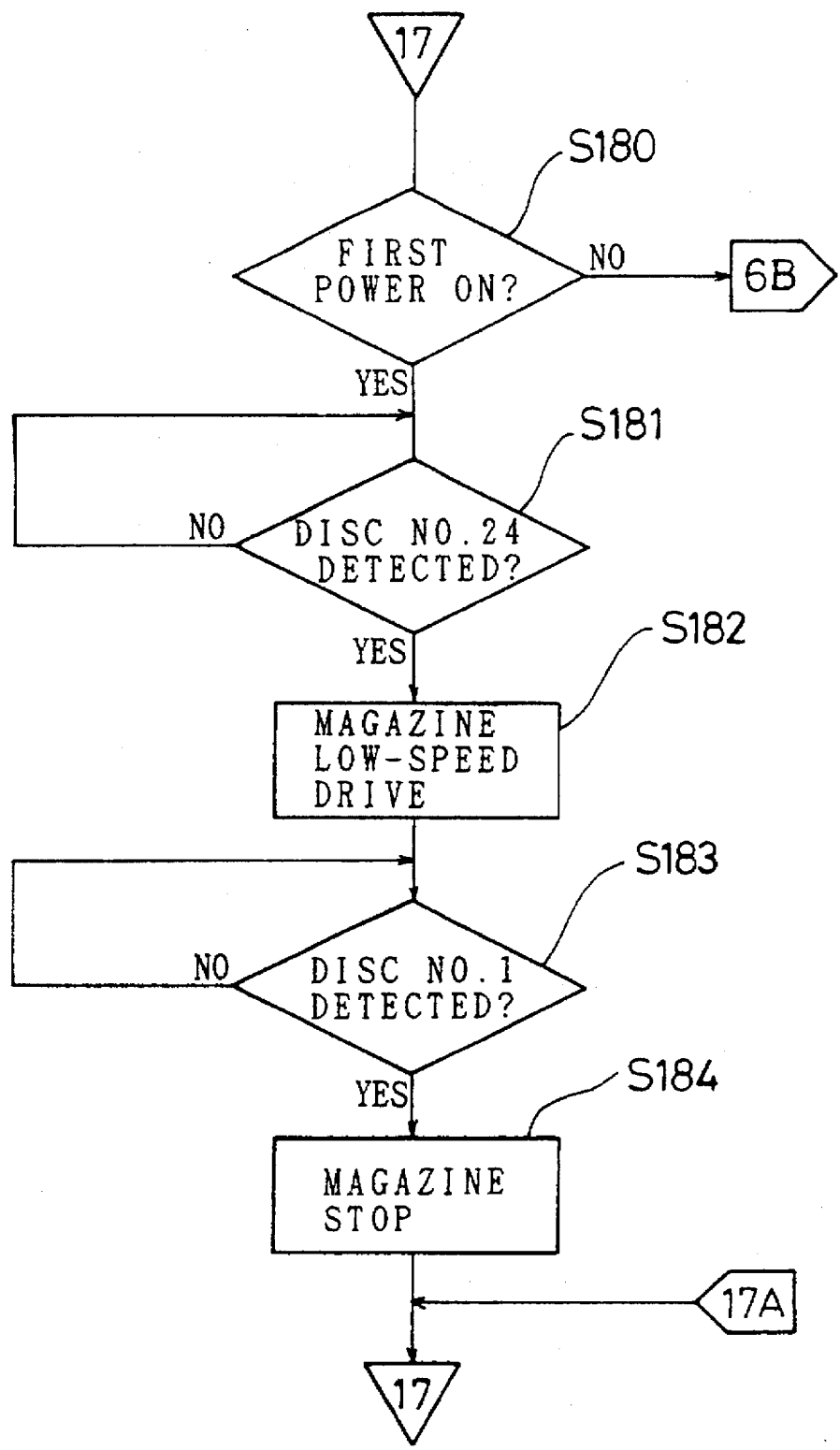
FIG. 60 is a flow chart showing a procedure for rotating the magazine upon first ON-OFF key manipulation after energization.
Figure 61:
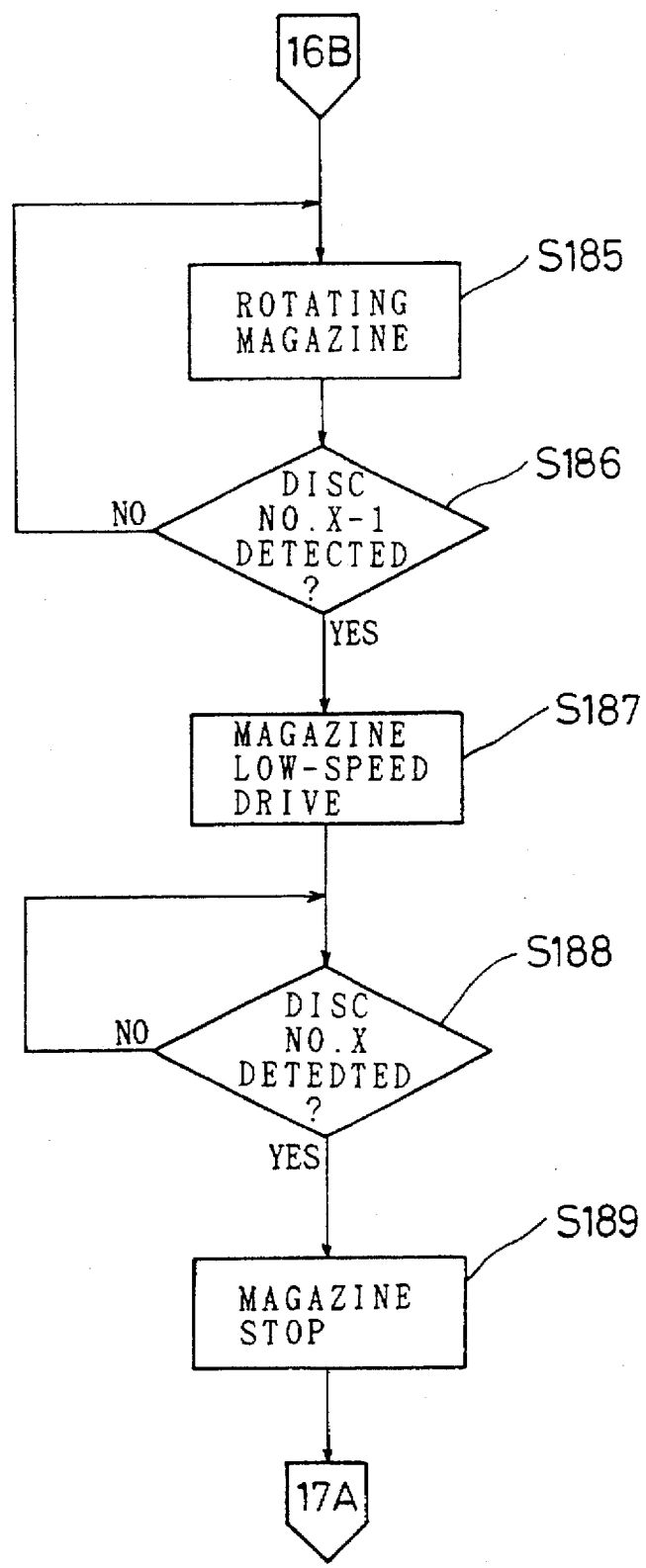
FIG. 61 is a flow chart of a procedure executed until the magazine is stopped upon the second or subsequent ON-OFF key manipulation after energization.

The procedure shown in FIG. 60 then follows. After the disc playing device is energized, an inquiry is made as to whether it is the first power-on action (S180). If the power supply is turned on the first time, the magazine 3 rotates about 1 turn. When the movement of the groove 31, No. 24 to the position opposed to the disc insertion-discharge means 4 is detected (S181), the speed of rotation of the magazine 3 is changed to the low speed (S182).

A signal from the count sensor SE8 then indicates that the groove 31, No. 1 has been brought to the position opposed to the means 4 (S183), whereupon the rotation of the magazine 3 stops (S184).

In the case where the first power-on action is recognized following energization of the disc playing device, the magazine 3 is thus rotated by one turn so as to ensure that the groove 31, No. 1 will be opposed to the means 4. In other words, when the switch SW5 has been turned off twice, the groove 31, No. 1 is reliably positioned as opposed to the means 4. In the case of the first manipulation of ON-OFF button 22 after energization, therefore, special care is thus taken in detecting the position of the disc holding groove 31.

In the case of the second or subsequent manipulation of ON-OFF button 22 after energization, the magazine 3 rotates (S185), whereby the groove 31 with No. X–1 which is 1 smaller than the disc number X stored before energization is brought to the position opposed to the means 4 as shown in FIG. 60.

Thus, the processor detects the groove 31, No. X–1 as brought to the position opposed to the means 4 by the rotation of the magazine 3 (S186). The magazine 3 is thereafter slowed down (S187), followed by detection of the groove 31 for the disc No. X as moved to the position opposed to the means 4 (S188), whereupon the magazine 3 is stopped (S189).

Figure 62:
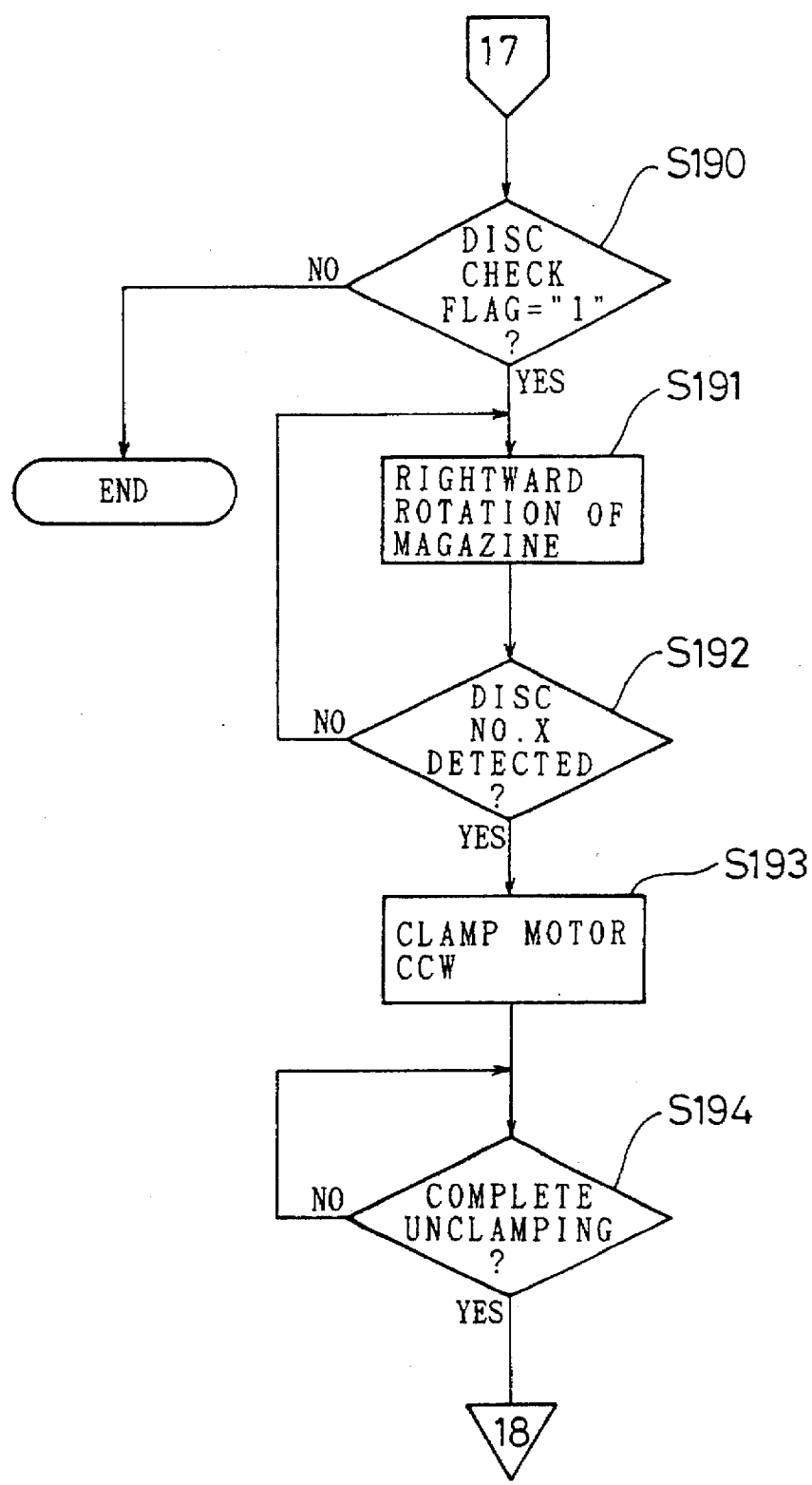
FIG. 62 is a flow chart of a disc detecting procedure executed upon the second or subsequent ON-OFF key manipulation after energization.

As seen in FIG. 62, the disc check flag is thereafter checked as to whether it is set to "1" (S190). If the answer is negative, that is, if no disc is found in the groove 31 with the disc No. X, the initialization procedure upon supply of power is completed.

When the disc check flag is found to be set to "1" in step S190, the magazine rotating motor M3 is started to rotate the magazine 3 rightward (S191).

A signal from the count sensor SE8 thereafter indicates that the groove 31 with the disc No. X,which was opposed to the means 4, is brought to the position opposed to the playing means 9 (S192).

Figure 63:
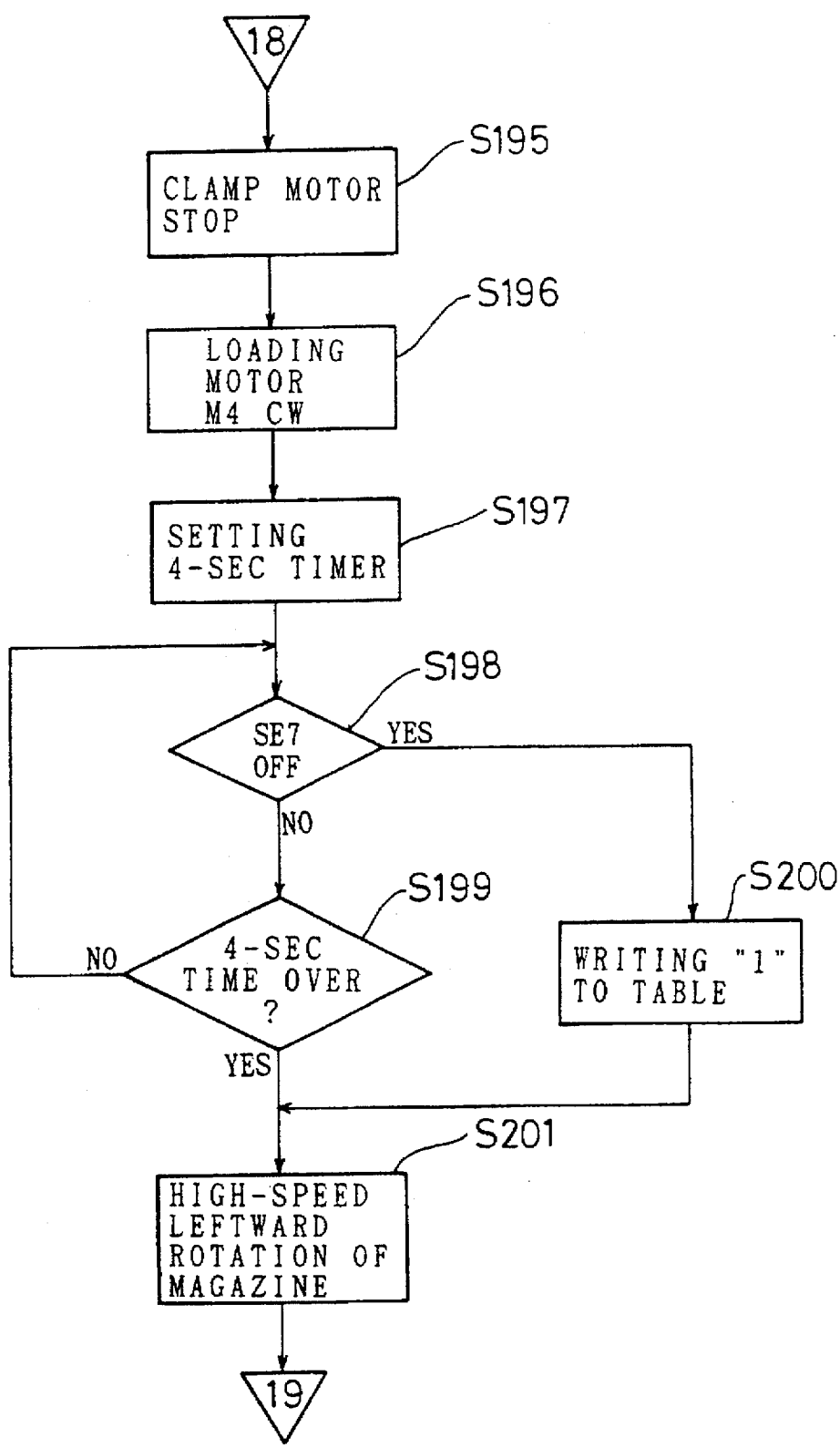
FIG. 63 is a flow chart of a procedure for rotating the magazine upon disc detection following the second or subsequent ON-OFF key manipulation after energization.

The clamping motor M5 is then rotated counterclockwise, i.e., in the unclamping direction (S193), followed by detection of unclamping (S194) and thereafter by stopping of the motor M5 (S195), as shown in FIG. 63.

Subsequently, the playing side loading motor M4 is rotated clockwise, i.e., in the direction of transport of the disc from the magazine 3 to the playing means 9 (S196), and the 4-second timer is set (S197). The timer is set for 4 seconds because 4 seconds is sufficient for the disc in the magazine 3 to move to the playing means 9.

Since the presence of the disc is detected in the foregoing step S190, the disc is present at the position opposed to the playing means 9. Accordingly, turning off of the seventh sensor SE7 is recognized (S198). If the sensor is on owing to slippage of the disc relative to the rollers 61a, 62a, lapse of the 4-second period is detected (S199). If otherwise, the sequence returns to step S198.

When the disc has moved past the seventh sensor SE7, step S198 is answered with "YES," and "1" meaning presence of disc is written to the table at the position of number of the groove 31 in which the disc was present (S200).

Figure 64:
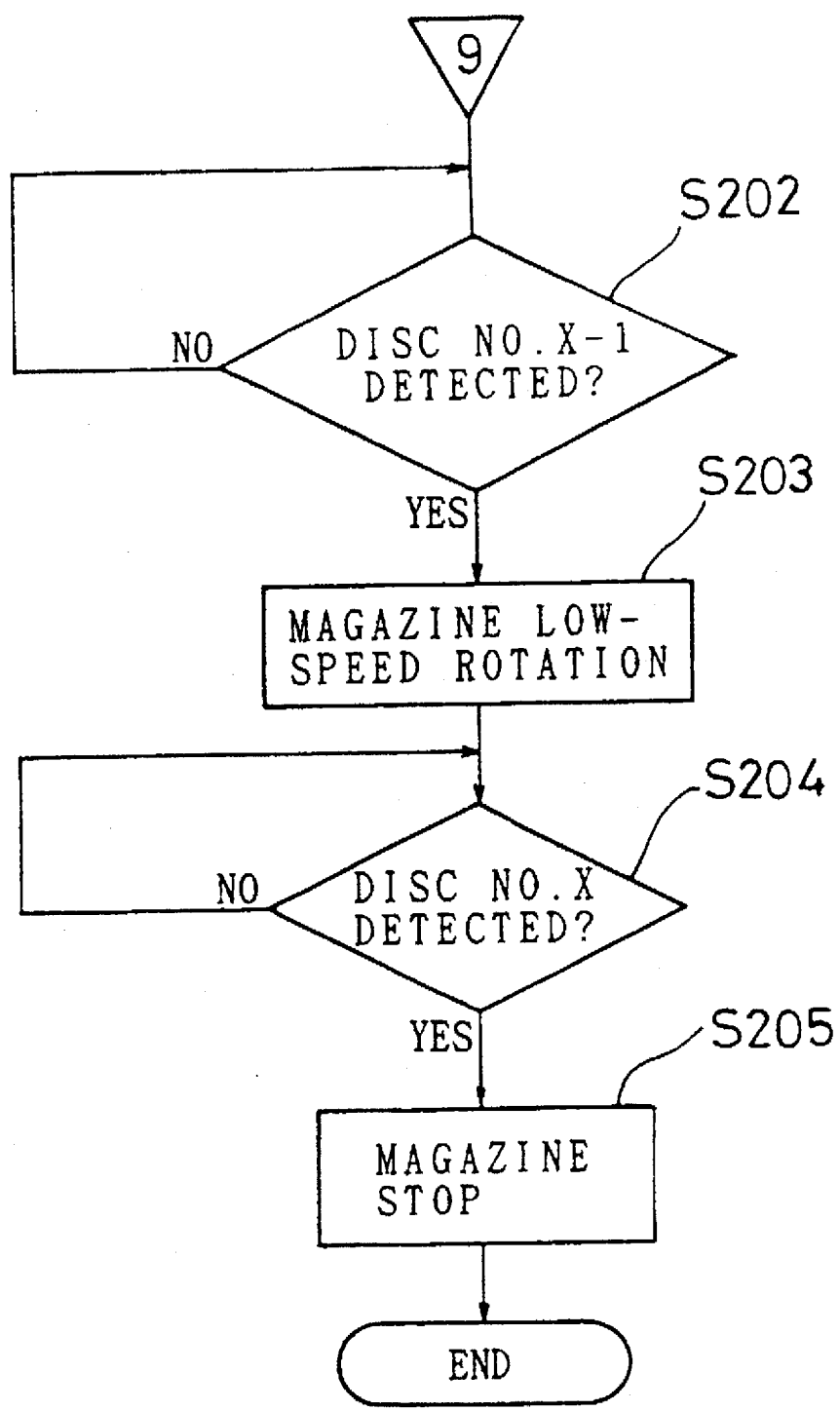
FIG. 64 is a flow chart of a procedure for stopping the magazine upon disc detection following the second or subsequent ON-OFF key manipulation.

The magazine rotating motor M3 is then driven to rotate the magazine leftward at the high speed (S201). A signal from the count sensor SE8 indicates that the groove 31 immediately before No. X is brought to the position opposed to the means 4 (S202), whereupon the magazine 3 is slowed down (S203) as shown in FIG. 64. The magazine 3 is stopped (S205) when the groove 31, No. X is positioned as opposed to the means 4 (S204).

In this way, the magazine is set in an initial position with the disc holding groove 31 for the disc No. X,newly inserted while the power supply is off, opposed to the insertion-discharge means 4, and made ready for the discharge of the disc from the groove 31, No. X. The disc can be discharged by the subsequent operation.

Indication Control of Display 28 (see FIGS. 65 to 68)

When the playing device is set in various operation modes as described above, the disc calendar indicator C of the display 28 shown in FIG. 38 is controlled in the following manner.

The disc number and the disc contour constituting the disc calendar is turned on, flickered and turned off to indicate the following meanings.

(1) Disc number and number surrounding disc contour on

This means that the disc of the number concerned is accommodated in the magazine.

(2) Disc number flicker and number surrounding disc contour on

This means that the disc of the number concerned is being handled, for example, for loading, playing or ejection.

(3) Disc number flicker and number surrounding disc contour off

This means that the disc holding groove 31 with the number concerned is in use for disc loading or unloading, with the rotatable door opened.

(4) Disc number off and disc contour flicker

This means that the disc is inserted as reversed and can not be played.

(5) Disc number flicker and number surrounding disc contour flicker

This means that the disc with the number concerned is inserted as reversed and is to be ejected.

1. Indication of Ejection

A description will be given of the disc No. 4 which is to be ejected from the magazine 3 as an example.

Figure 65:
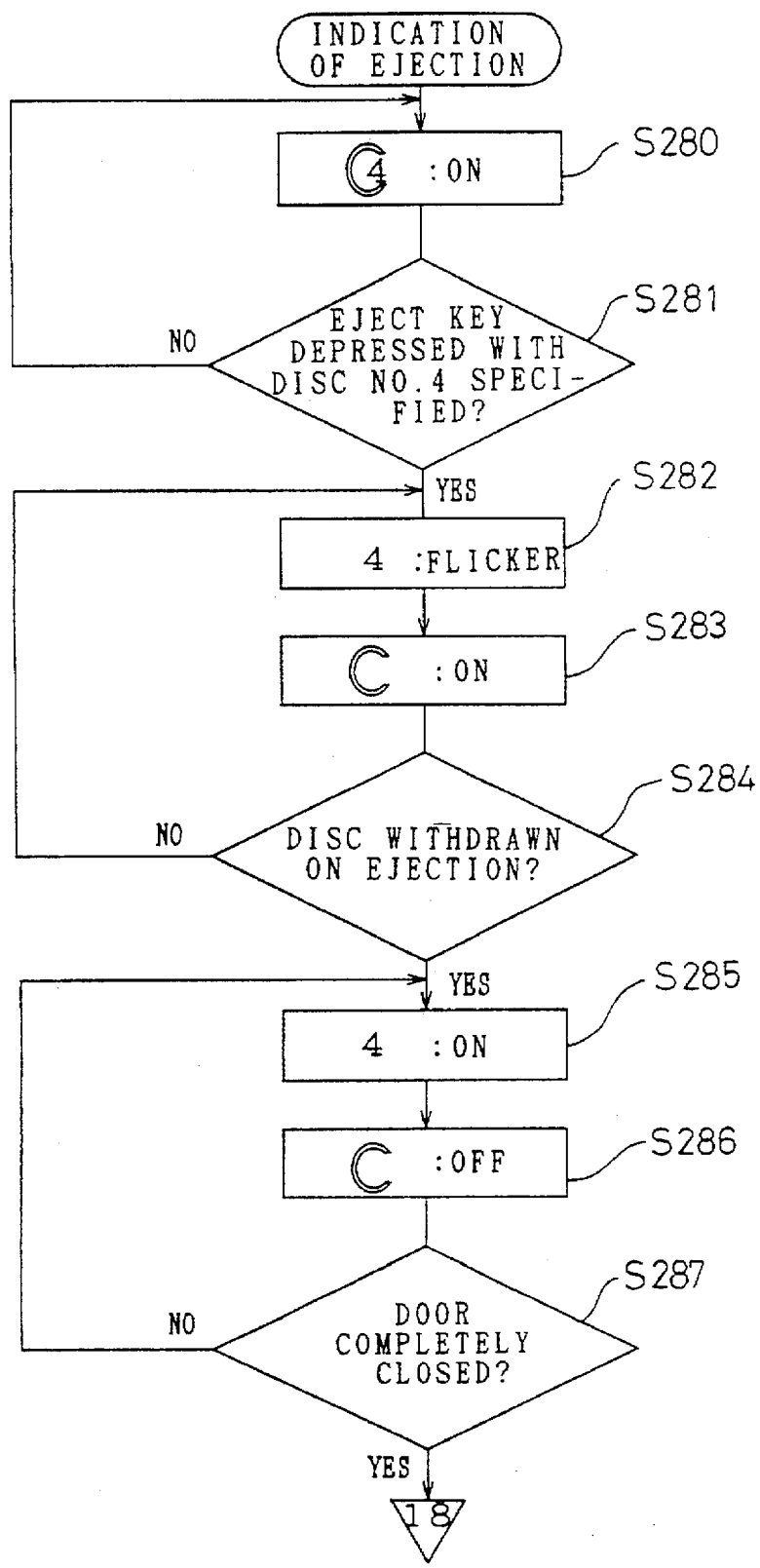
FIG. 65 is a flow chart showing indication control immediately following withdrawal of the disc for the indication of ejection.

Since the disc No. 4 is accommodated in the magazine 3 at this time, the microprocessor 200 holds the disc number 4 and the number surrounding disc contour turned on (S280) as shown in FIG. 65.

An inquiry is made as to whether the OPEN/CLOSE button 25 is depressed with the disc No. 4 specified (S281). When the answer is "YES," the disc number 4 is flickered (S282), and the disc contour surrounding the number is held on (S283). This enables the user to recognize that the disc No. 4 is being ejected.

Next, upon completion of disc ejection, whether the disc has been withdrawn is inquired (S284). When the answer is "YES," the disc number 4 is flickered (S285), and the disc contour surrounding the number is turned off (S286). This state is maintained until complete closing of the door 41 is detected (S287). This enables the user to recognize that the door 41 is open.

If the user loads a new disc onto the playing device or allows the device to stand as it is without insertion of disc in this stage, the door 41 is closed, as previously stated.

Figure 66:
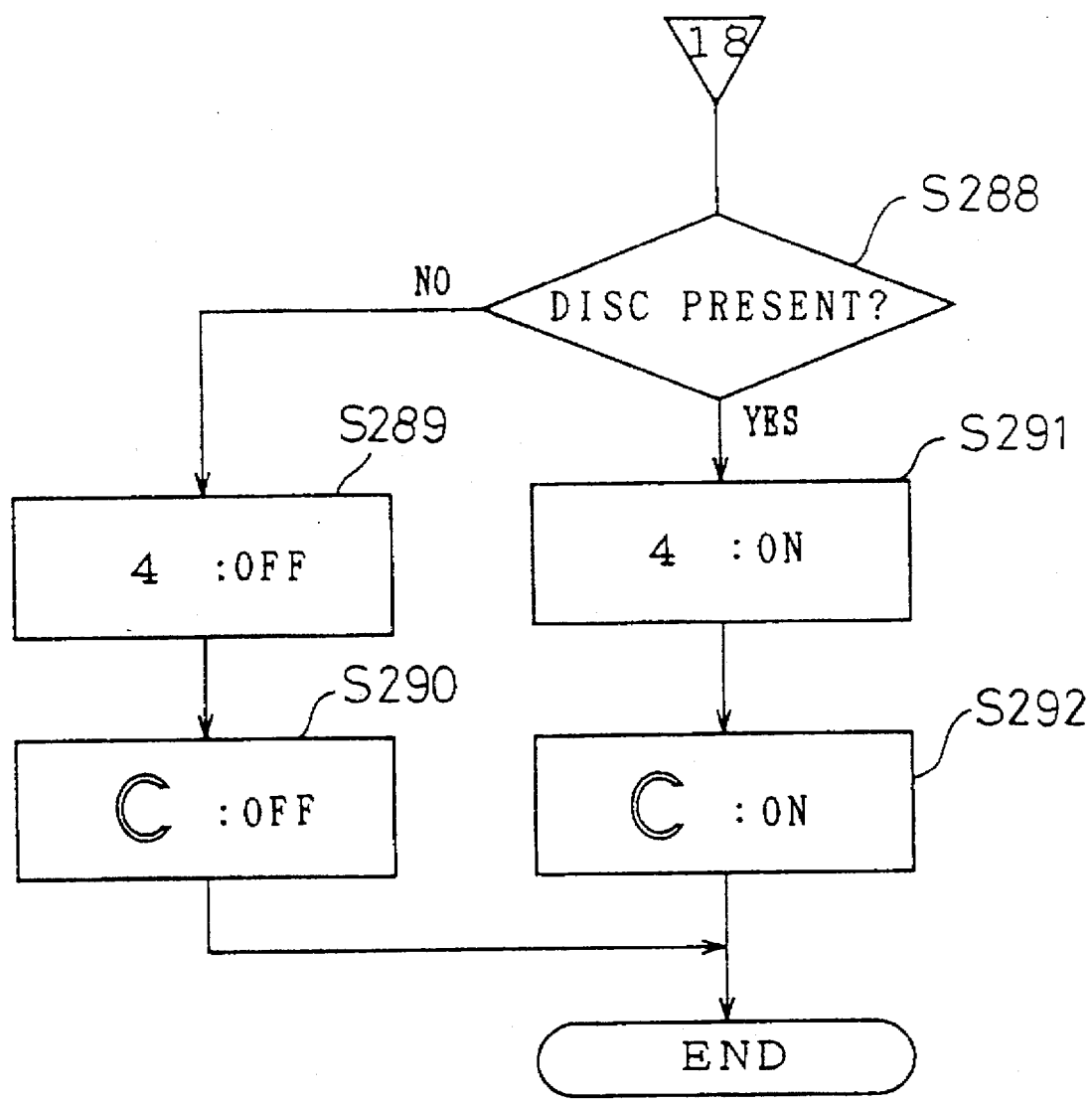
FIG. 66 is a flow chart showing indication control following closing of the rotatable door for the indication of ejection.

On complete closing of the door 41, an inquiry is made as to whether the disc is accommodated in the groove 31, No. 4 (S288) as shown in FIG. 66. If the answer is "NO," the disc number 4 and the disc contour surrounding the number are turned off (S289, S290). If the answer is "YES," the disc number and the disc contour surrounding the number are turned on (S291, S292), whereby the user can recognize presence of the disc No. 4.

The same indication procedure as above is executed in the case where discs with other numbers are ejected.

2. Indication of Playing

A description will be given of the case wherein the disc No. 7, for example, is played.

Figure 67:
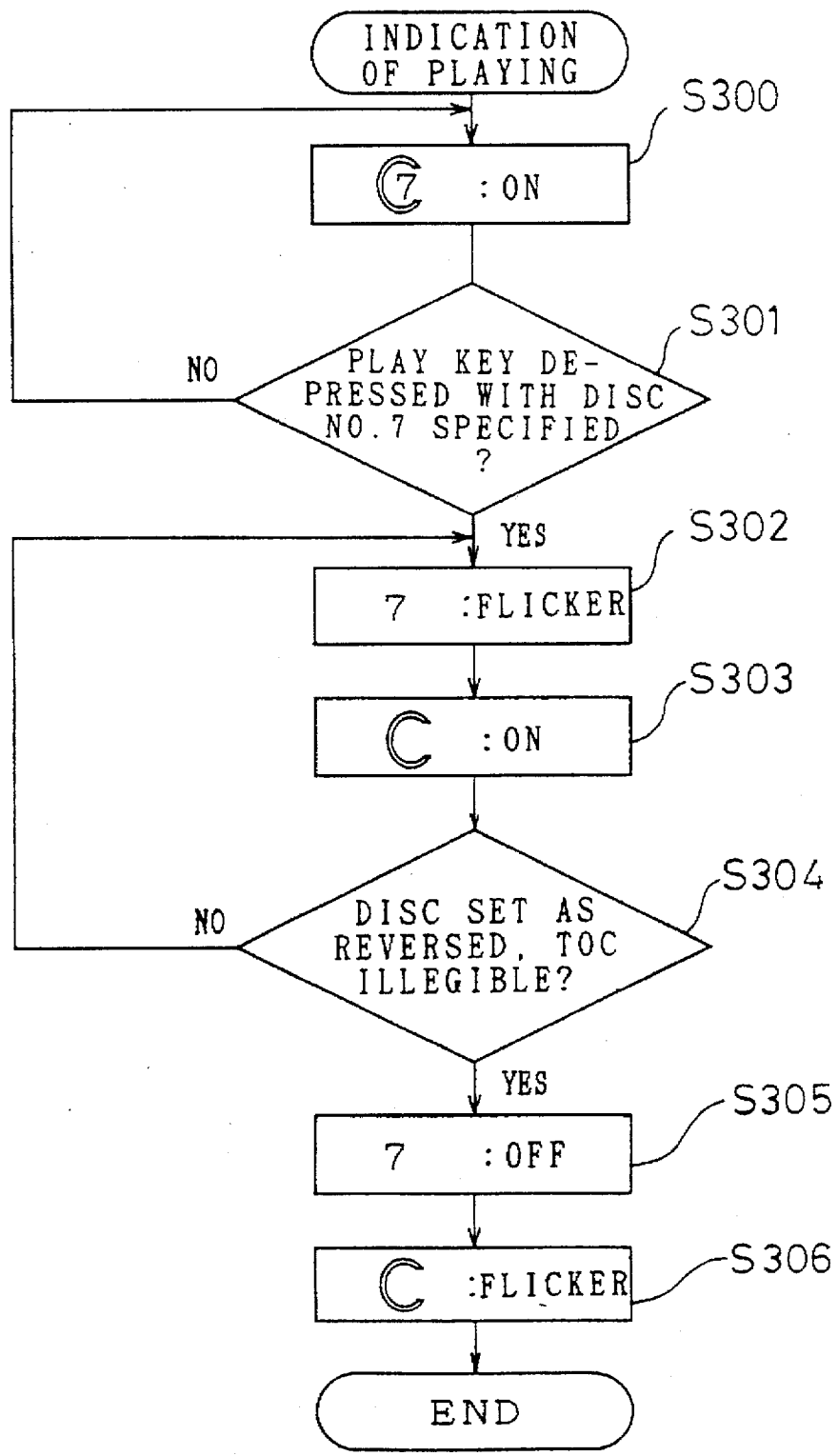
FIG. 67 is a flow chart showing control for the indication of playing.

Since the disc No. 7 is accommodated in the magazine 3 at this time, the disc number 7 and the disc contour surrounding the number are held turned on by the microprocessor 200 as shown in FIG. 67, S300.

An inquiry is made as to whether the PLAY button is depressed with the disc No. 7 specified (S301). When the answer is "YES," the disc number 7 is flickered (S302) and the disc contour surrounding the number is held on (S303). This enables the user to recognize that the disc No. 7 is being played.

Next when the microprocessor has found the TOC illegible (S304) because the disc is set as reversed (wrong side out) in error or is defaced, the disc number 7 is turned off (S305) and the disc contour surrounding the number is flickered (S306).

This enables the user to recognize that the disc No. 7 is loaded wrong side out.

The same indication procedure as above is executed in the case where discs with other numbers are played.

3. Indication of State Involved in Change from STOP to PLAY

The following indications are given, for example, when the PLAY button 23 is depressed in the state of STOP.

Figure 68:
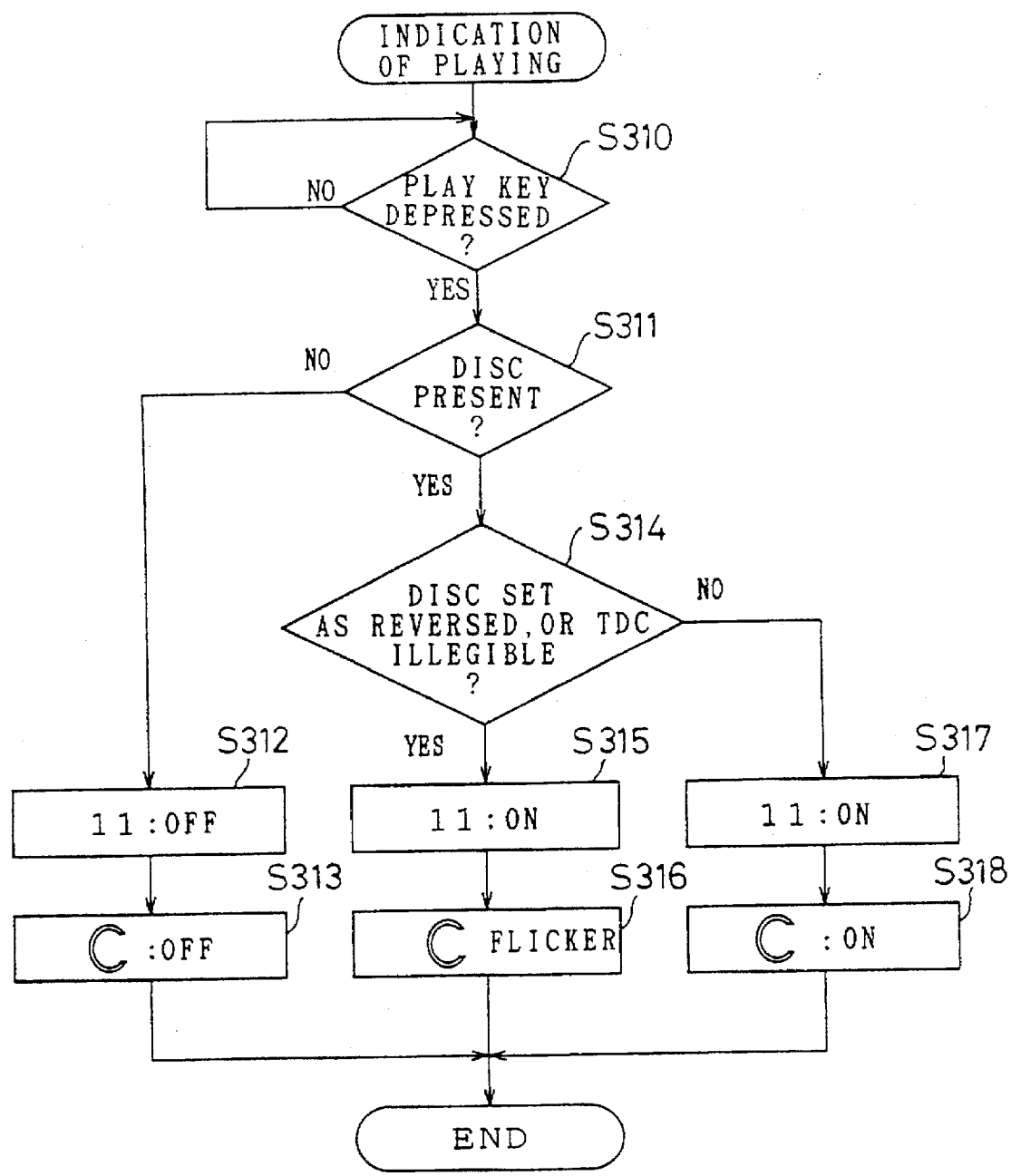
FIG. 68 is a flow chart showing control for stop indication.

With reference to FIG. 68, an inquiry is made as to whether a disc is accommodated in each disc holding groove 31 of the magazine 3 (S311) upon detection of depression of the PLAY button 23 (S310). For example, the groove 31, No. 11 is checked for the presence of disc No. 11 therein (S310). When the answer to the inquiry is negative, the disc number 11 and the disc contour surrounding the number go off (S312, S313). This enables the user to recognize that no disc is present in the groove 31, No. 11.

When the inquiry of step S311 is answered in the affirmative, that is, when the disc is found present in the groove 31, a further inquiry is made as to whether the disc is set as reversed or whether the TOC is illegible (S314). When the answer is "YES," the disc number 11 is turned on (S315), and the disc contour surrounding the number is flickered (S316). This enables the user to recognize that the disc No. 11 is loaded as reversed.

Alternatively if the inquiry of step S314 is answered in the negative, that is, if the disc is loaded normally, the disc number 11 and the surrounding disc contour are turned on (S317, S318). This enables the user to recognize that the disc No. 11 is accommodated in the magazine 3.

STOP indications similar to those described above are given on completion of successive playing of all the 24 discs accommodated in the magazine 3.

Features of the Embodiment

The disc playing device embodying the present invention and described above has various outstanding features, some of which are as follows.

1. The disc insertion-discharge slit 21 of the front panel 2, the slit 42 of the door and the insertion guide opening 510 of the insertion guide member 500 have a width decreasing upward and downward from the center of the height and are gradually widened toward the disc inlet side, so that the disc can be prevented from becoming damaged by the frictional contact of the disc recorded portion with the wall defining the slit 21 or 42 or the opening 510 when the disc is inserted.

The slit 21 of the front panel is automatically closed except when the disc is to be inserted or discharged to prevent ingress of extraneous matter through the slit.

2. The door 41 for opening and closing the slit 21 of the front panel 2 is closed by the spring 47 and opened by the slider 410 via the torsion spring 440, so that the door 41 does not rotate even if the slider 410 is moved in the closing direction with the disc held in the slit 42 of the door 41, whereby the disc is prevented from becoming damaged. Even if the fully closed door sensor switch SW1 detects the slider 410 as moved in the door closing direction to the limit position of closing, the subsequent operation can not be effected while the door 41 as fully opened is detected by the disc engagement sensor switch SW3. This provides a double measure for preventing damage to the disc.

3. The size of discs can be detected by the first sensor SE1 to the sixth sensor SE6 to preclude the insertion of the disc other than the discs of specified size and to avoid the trouble that would occur due to the insertion of the disc of different size into the magazine.

4. The magazine 3 rotates in the direction in which the angle of rotation needed is smaller. This shortens the setting time.

5. The disc upper portion guide member 5 is partially removable, so that the disc therein are removable without removing the entire guide member when the device is carried to the repair shop, hence convenience.

6. Each holding groove 31 of the magazine 3 is made to have a width for accommodating a single disc D to prevent insertion of two discs, while the groove 31 has an intermediate portion with a bottom lower than the outer end bottom portion at the outer periphery of the magazine 3. With this simple construction, the magazine 3 is rotatable with good stability, with the disc prevented from jumping out inadvertently.

7. Over the entire length of the groove 31, the groove is tapered toward the bottom and also toward the center of rotation of the magazine 3. The width of groove bottom is made slightly larger than the thickness of the disc D. The outer peripheral portion of the disc can therefore be supported almost without any backlash, while the recorded area of the disc can be held out of contact with the groove-defining wall.

8. The annular elastic member 30 is fitted to the central tubular portion 39 of the magazine where the holding groove 31 has its inner end. The member 30 prevents the impulsive noise that would otherwise occur when the disc D falls into the groove 31.

9. The upper end edge defining the groove 31 is higher than the lowest portion of the groove bottom for supporting the disc by an amount corresponding to the radius of the disc. The edge of the disc can be held between the adjacent edges of the grooved portion at its upper end, whereby the disc can be supported with good stability.

10. Since the disc D is played as partly positioned in the magazine D, the device can be made smaller in size than playing devices wherein the disc is played as completely withdrawn from the magazine.

11. In the playing means 9, the disc D is handed for delivery with the following timing. The transport rollers 61a, 62a deliver the disc D to the case 91, and the disc is completely clamped by the turntable 922 and the clamp 93, whereupon the rollers 61a, 62a are moved away from each other to release the disc from the pressure. When the disc D is to be returned from the playing means 9 to the magazine 3 after playing, the rollers 61a, 62a are moved toward each other to hold the disc, and the disc D is thereafter released from the turntable 922 and the clamp 93. Accordingly, the disc is held between the rollers 61a, 62a or between the turntable 922 and the clamp 93 always when to be delivered. Thus, the disc can be delivered reliable without falling even if the playing device is inclined during delivery.

12. The rollers 61a, 62a are moved toward or away from each other, and the disc is clamped by the turntable 922 and the clamp 93 and released therefrom by the sliding movement of a single slide plate 8. This ensures a reliable operation free of trouble that would otherwise occur due to timing differences.

13. When a disc is to be played, a value stored in the storage area A of the nonvolatile memory 201 is compared with a number specified by the user with the number entry key arrangement 26 to determine the direction of rotation of the magazine 3. Accordingly, the groove 31 accommodating the desired disc can be quickly positioned as opposed to the playing means 9.

14. In the case where the playing device is set for the disc playing mode after disc loading, a signal from the switch SW1 indicates closing of the rotatable door 41 in the disc loading mode, whereupon the disc playing mode is executed. This eliminates the likelihood that the magazine 3 will start rotation with the disc engaged by the door 41 in the disc playing mode.

The present invention is not limited to the construction of the foregoing embodiments but can be modified variously without departing from the scope defined in the appended claims.

What is claimed is:

1. A control system for controlling the operation of a disc playing device comprising:

a rotatable magazine having a plurality of disc holding grooves, the grooves being formed generally radially around a central axis;

a mechanism for drivingly rotating the magazine;

disc insertion-discharge means and playing means which are provided alongside the path of rotation of the magazine and arranged away from each other at separate locations alongside the path of rotation;

a first delivery device for transferring discs between the disc insertion-discharge means and the magazine;

a second delivery device for transferring the discs between the playing means and the magazine;

an openable and closable door provided for the disc insertion-discharge means having a vertically elongated hollow cylinder with a vertically elongated slit for the discs to pass therethrough, and rotated by a motor between a first position which allows the discs to pass through the slit and a second position which does not allow the discs to pass through the slit;

means for detecting closing of the door; and means for permitting rotation of the magazine only when closing of the door has been detected by the door closing detecting means.

2. A control system as recited in claim 1, further comprising:

memory means for storing data as to the presence or absence of the discs in each of the disc holding grooves;

input means to be manipulated for the user to specify a desired one of the disc holding grooves when a selected one of the discs is to be loaded into the desired groove or to be discharged from the desired groove through the door;

magazine rotation control means for rotating the magazine until the desired disc holding groove specified by manipulating the input means is positioned opposed to the disc insertion-discharge means;

door operating means for opening the door in response to a manipulation signal from the input means; and disc discharging means for checking whether the selected disc is accommodated in the desired disc holding groove specified by the input means with reference to the data stored in the memory means and discharging the selected disc to the disc insertion-discharge means by controlling the first delivery device when the selected disc is accommodated in the specified groove.

3. A control system as recited in claim 2, further comprising:

flag means for indicating cessation of rotation of the magazine and wherein the door operating means opens the door after recognizing the cessation of rotation of the magazine with reference to the flag means.

4. A control system as recited in claim 1, further comprising:

timer means for measuring a predetermined period of time after the door is opened;

disc sensor means for detecting presence of a selected one of the discs moving from the disc insertion-discharge means to the magazine; and door control means for closing the door when the time set by the timer means is elapsed before detection of the selected disc by the disc sensor means.

* * * * *